US011196636B2

(12) United States Patent
Rieke et al.

(10) Patent No.: US 11,196,636 B2
(45) Date of Patent: Dec. 7, 2021

(54) SYSTEMS AND METHODS FOR NETWORK DATA FLOW AGGREGATION

(71) Applicant: Catbird Networks, Inc., Scotts Valley, CA (US)

(72) Inventors: Malcolm Rieke, Santa Cruz, CA (US); James Sebastian Dennis, Scotts Valley, CA (US); Shane Robert Thorson, Warren, UT (US)

(73) Assignee: Catbird Networks, Inc., Scotts Valley, CA (US)

( * ) Notice: Subject to any disclaimer, the term of this patent is extended or adjusted under 35 U.S.C. 154(b) by 91 days.

(21) Appl. No.: 14/974,378

(22) Filed: Dec. 18, 2015

(65) Prior Publication Data

US 2016/0205002 A1 Jul. 14, 2016

Related U.S. Application Data

(60) Provisional application No. 62/137,590, filed on Mar. 24, 2015, provisional application No. 62/103,496, filed on Jan. 14, 2015.

(51) Int. Cl.
*H04L 12/24* (2006.01)
*H04L 29/06* (2006.01)
*H04L 12/26* (2006.01)

(52) U.S. Cl.
CPC ............ *H04L 41/142* (2013.01); *H04L 41/22* (2013.01); *H04L 43/04* (2013.01); *H04L 43/067* (2013.01); *H04L 63/00* (2013.01); *H04L 63/101* (2013.01)

(58) Field of Classification Search
CPC ....... H04L 41/142; H04L 41/22; H04L 43/04; H04L 43/06; H04L 42/067; H04L 63/00; H04L 63/101

USPC .......................................................... 709/224
See application file for complete search history.

(56) References Cited

U.S. PATENT DOCUMENTS

| 5,657,470 | A | 8/1997 | Fisherman et al. |
| 6,278,694 | B1 * | 8/2001 | Wolf ...................... H04L 43/06 370/253 |
| 7,668,925 | B1 | 2/2010 | Liao et al. |
| 7,711,979 | B2 | 5/2010 | Salli |

(Continued)

FOREIGN PATENT DOCUMENTS

| EP | 0973350 | 1/2000 |
| EP | 2753069 | 7/2014 |

(Continued)

OTHER PUBLICATIONS

Fangfang Zhou, Ronghua Shi, Ying Zhao, Yezi Huang, and Xing Liang (NetSecRadar: A Visualization System for Network Security Situational Awareness—Cyberspace Safety and Security Symposium 2013, p. 403-416, Nov. 13-15, 2013).*

(Continued)

*Primary Examiner* — Thomas J Dailey
(74) *Attorney, Agent, or Firm* — Greenberg Traurig

(57) ABSTRACT

Embodiments of the present disclosure can aggregate network flow data over various periods of time, and present a graphical representation of the network flow information based on the aggregated data instead of (or in addition to) the raw network flow data. Among other things, embodiments of the present disclosure are able to present historical network flow data for relatively long periods of time without having to store large volumes of raw network flow data.

20 Claims, 35 Drawing Sheets

(56) References Cited

U.S. PATENT DOCUMENTS

| | | | |
|---|---|---|---|
| 7,779,226 B2 | 8/2010 | Kita | |
| 7,849,497 B1 | 12/2010 | Hurst et al. | |
| 7,886,351 B2 | 2/2011 | Dadhia et al. | |
| 7,890,869 B1 | 2/2011 | Mayer et al. | |
| 8,116,226 B1 | 2/2012 | Liao et al. | |
| 8,166,554 B2 | 4/2012 | John | |
| 8,205,035 B2 | 6/2012 | Reddy et al. | |
| 8,214,889 B2 | 7/2012 | Bahl et al. | |
| 8,321,944 B1 | 11/2012 | Mayer et al. | |
| 8,478,723 B2 | 7/2013 | Rousseau | |
| 8,509,231 B2 | 8/2013 | Hoole et al. | |
| 8,683,560 B1 | 3/2014 | Brooker et al. | |
| 8,832,835 B1 | 9/2014 | Chen et al. | |
| 8,949,931 B2 | 2/2015 | Ermagan et al. | |
| 8,959,513 B1 | 2/2015 | Swaminathan | |
| 9,009,319 B2 | 4/2015 | Carlin et al. | |
| 9,049,105 B1 | 6/2015 | Feinstein et al. | |
| 9,058,198 B2 | 6/2015 | McGrath et al. | |
| 9,088,541 B2 | 7/2015 | Rieke et al. | |
| 9,189,395 B2 | 11/2015 | Na | |
| 9,195,484 B1 | 11/2015 | Ward, Jr. | |
| 9,485,279 B2 | 11/2016 | Kirner et al. | |
| 9,503,475 B2 | 11/2016 | Fadida et al. | |
| 9,507,540 B1 | 11/2016 | Adogla et al. | |
| 9,509,574 B2 | 11/2016 | Kirner et al. | |
| 9,509,660 B2 | 11/2016 | Rieke et al. | |
| 9,553,768 B2 | 1/2017 | Scott et al. | |
| 9,712,551 B2 | 7/2017 | Grubel et al. | |
| 9,749,351 B2 | 8/2017 | Rieke et al. | |
| 9,769,174 B2 | 9/2017 | Rieke et al. | |
| 9,804,890 B1 | 10/2017 | Pai et al. | |
| 9,912,549 B2 | 3/2018 | Rieke | |
| 9,923,909 B2 | 3/2018 | Lietz et al. | |
| 10,205,736 B2 | 2/2019 | Rieke et al. | |
| 10,356,121 B2 | 7/2019 | Rieke et al. | |
| 10,666,673 B2 | 5/2020 | Rieke et al. | |
| 10,728,251 B2 | 7/2020 | Rieke et al. | |
| 10,862,920 B2 | 12/2020 | Rieke et al. | |
| 2003/0220940 A1 | 11/2003 | Futoransky et al. | |
| 2004/0075675 A1 | 4/2004 | Raivisto et al. | |
| 2004/0078105 A1 | 4/2004 | Moon et al. | |
| 2004/0243707 A1 | 12/2004 | Watkinson | |
| 2004/0255269 A1 | 12/2004 | Santori et al. | |
| 2005/0050351 A1 | 3/2005 | Cain | |
| 2005/0125389 A1 | 6/2005 | Hazzard et al. | |
| 2005/0138413 A1* | 6/2005 | Lippmann | G06F 21/577 726/4 |
| 2005/0193430 A1 | 9/2005 | Cohen et al. | |
| 2005/0223092 A1* | 10/2005 | Sapiro | H04L 41/0631 709/224 |
| 2005/0268335 A1 | 12/2005 | Le et al. | |
| 2006/0021034 A1 | 1/2006 | Cook | |
| 2006/0041936 A1 | 2/2006 | Anderson et al. | |
| 2006/0242322 A1 | 10/2006 | Williams et al. | |
| 2007/0079307 A1 | 4/2007 | Dhawan et al. | |
| 2007/0118909 A1 | 5/2007 | Hertzog et al. | |
| 2007/0143827 A1 | 6/2007 | Nicodemus et al. | |
| 2008/0005784 A1 | 1/2008 | Miliefsky | |
| 2008/0134286 A1 | 6/2008 | Amdur et al. | |
| 2008/0201458 A1 | 8/2008 | Salli | |
| 2008/0259815 A1 | 10/2008 | Gorman | |
| 2008/0270606 A1 | 10/2008 | Gooch et al. | |
| 2008/0301765 A1 | 12/2008 | Nicol et al. | |
| 2009/0007269 A1 | 1/2009 | Bianco | |
| 2009/0049553 A1 | 2/2009 | Vasudeva | |
| 2009/0199298 A1 | 8/2009 | Miliefsky | |
| 2009/0267946 A1 | 10/2009 | Agutter et al. | |
| 2009/0288135 A1 | 11/2009 | Chang et al. | |
| 2009/0327903 A1* | 12/2009 | Smith | H04L 41/12 715/737 |
| 2010/0043067 A1 | 2/2010 | Varadhan et al. | |
| 2010/0057667 A1 | 3/2010 | Gotoh et al. | |
| 2010/0058456 A1 | 3/2010 | Jajodia et al. | |
| 2010/0138925 A1 | 6/2010 | Barai et al. | |
| 2010/0257580 A1 | 10/2010 | Zhao | |
| 2010/0333165 A1 | 12/2010 | Basak et al. | |
| 2011/0126288 A1 | 5/2011 | Schloegel et al. | |
| 2011/0197278 A1 | 8/2011 | Chow et al. | |
| 2011/0202847 A1 | 8/2011 | Dimitrov | |
| 2011/0277034 A1 | 11/2011 | Hanson | |
| 2012/0260331 A1 | 10/2012 | Aaron | |
| 2013/0019277 A1 | 1/2013 | Chang et al. | |
| 2013/0067044 A1 | 3/2013 | Levy-Yurista et al. | |
| 2013/0097662 A1 | 4/2013 | Pearcy et al. | |
| 2013/0276053 A1 | 10/2013 | Hugard, IV et al. | |
| 2013/0347068 A1 | 12/2013 | Elleboe et al. | |
| 2014/0109168 A1 | 4/2014 | Ashley et al. | |
| 2014/0122669 A1* | 5/2014 | Ennis, Jr. | H04L 41/0853 709/220 |
| 2014/0165204 A1 | 6/2014 | Williams et al. | |
| 2014/0165207 A1 | 6/2014 | Engel et al. | |
| 2014/0173742 A1 | 6/2014 | Gluck et al. | |
| 2014/0213371 A1 | 7/2014 | Jain | |
| 2014/0215630 A1 | 7/2014 | Raz et al. | |
| 2014/0317677 A1 | 10/2014 | Vaidya et al. | |
| 2014/0351415 A1 | 11/2014 | Harrigan et al. | |
| 2014/0359749 A1 | 12/2014 | Rieke et al. | |
| 2015/0149611 A1 | 5/2015 | Lissack | |
| 2015/0244594 A1* | 8/2015 | Kay | H04L 43/045 370/252 |
| 2015/0264012 A1 | 9/2015 | Rieke et al. | |
| 2015/0295948 A1* | 10/2015 | Hassell | H04L 63/1433 726/25 |
| 2016/0072815 A1 | 3/2016 | Rieke et al. | |
| 2016/0072831 A1 | 3/2016 | Rieke | |
| 2016/0241595 A1 | 8/2016 | Molloy et al. | |
| 2017/0048268 A1 | 2/2017 | Rieke et al. | |
| 2018/0020019 A1 | 1/2018 | Rieke et al. | |
| 2018/0069865 A1 | 3/2018 | Rieke et al. | |
| 2018/0191578 A1 | 7/2018 | Rieke | |
| 2018/0219833 A1 | 8/2018 | Reddy | |
| 2018/0248899 A1 | 8/2018 | Rieke | |
| 2018/0248901 A1 | 8/2018 | Rieke | |
| 2019/0334944 A1 | 10/2019 | Rieke et al. | |

FOREIGN PATENT DOCUMENTS

| | | |
|---|---|---|
| WO | 2007005638 | 11/2007 |
| WO | 2016036485 | 3/2016 |

OTHER PUBLICATIONS

Zhou et al., "NetSecRadar: A Visualization System for Network Security Situational Awareness", 2013, Springer International Publishing Switzerland, p. 401-416 (Year: 2013).*

"Bulk loading to partition table", Oct. 2013, StackExchange, https://dba.stackexchange.com/questions/51793/bulk-loading-to-partitioned-table (Year: 2013).*

PosgreSQL Global Develepment Group, "PostgreSQL 8.4.22 Documentation", 2014, p. 71-75 (Year: 2014).*

Fangfang Zhou, Ronghua Shi, Ying Zhao, Yezi Huang, Xing Liang; NetSecRadar—A Visualization System for Network Security Situational Awareness, Cyberspace Safety and Security Symposium 2013, p. 403-416, LNCS (Nov. 13-15, 2013).

H. Shiravi, A. Shiravi and A. A. Ghorbani, "A Survey of Visualization Systems for Network Security," in IEEE Transactions on Visualization and Computer Graphics, vol. 18, No. 8, pp. 1313-1329 (Aug. 23, 2011).

International Patent Application PCT/US2015/044865, International Search Report and Written Opinion, dated Dec. 21, 2015.

International Patent Application PCT/US2015/047964, International Search Report and Written Opinion, dated Dec. 11, 2015.

International Application No. PCT/US2017/038024, International Search Report and Written Opinion, dated Nov. 15, 2017.

Harrison et al., NV: Vulnerability Visualization for the Web. VizSec '12 Proceedings of the Ninth International Symposium on Visualization for Cyber Security, pp. 25-32 [retrieved on Apr. 27, 2017]. Retrieved from the Internet: < URL: http: // di .acm .org/citation. cfm?id=2379694 >.

(56) References Cited

OTHER PUBLICATIONS

European Patent Application 15838627.6, Extended Search Report, dated Jul. 12, 2018.
Russian Patent Application 2017127710, Search Report, dated Jul. 11, 2018.
Extended European Search Report, EP Application No. 15838576.5, dated Jun. 20, 2018.
U.S. Appl. No. 15/336,691, filed Oct. 27, 2016, Malcolm Rieke, et al, Notice of Allowance Mailed—Application Received in Office of Publications dated May 8, 2017.
U.S. Appl. No. 15/677,954, filed Aug. 15, 2017, Malcolm Rieke, et al, Docketed New Case—Ready for Examination, Oct. 24, 2017.
U.S. Appl. No. 14/523,624, filed Oct. 24, 2014, Malcolm Rieke, Notice of Allowance Mailed—Application Received in Office of Publications, dated Nov. 13, 2017.
U.S. Appl. No. 14/821,103, filed Aug. 7, 2015, Malcolm Rieke, et al, Notice of Allowance Mailed—Application Received in Office of Publications, dated Jun. 5, 2017.
U.S. Appl. No. 15/707,989, filed Sep. 18, 2017, Malcolm Rieke, et al, Application Undergoing Preexam Processing, Sep. 18, 2017.
U.S. Appl. No. 15/443,857, filed Feb. 27, 2017, Malcolm Rieke, Docketed New Case—Ready for Examination, Aug. 7, 2017.
U.S. Appl. No. 15/667,526, filed Aug. 2, 2017, Malcolm Rieke, Application Undergoing Preexam Processing, Aug. 2, 2017.
U.S. Appl. No. 15/336,691, filed Oct. 27, 2016, Malcolm Rieke, et al, Docketed New Case—Ready for Examination, Jan. 30, 2017.
U.S. Appl. No. 14/523,624, filed Oct. 24, 2014, Malcolm Rieke, Final Rejection Mailed, dated Jan. 24, 2017.
U.S. Appl. No. 14/821,103, filed Aug. 7, 2015, Malcolm Rieke, et al, Non Final Action Mailed, dated Nov. 23, 2016.
U.S. Appl. No. 15/443,857, Malcolm Rieke, Application Undergoing Preexam Processing, Feb. 27, 2017.
U.S. Appl. No. 13/918,633, filed Jun. 14, 2013, Malcolm Rieke, et al, U.S. Pat. No. 9,088,541, Jul. 21, 2015.
U.S. Appl. No. 14/727,623, filed Jun. 1, 2015, Malcolm Rieke, et al, U.S. Pat. No. 9,509,660, Nov. 29, 2016.
U.S. Appl. No. 15/336,691, filed Oct. 27, 2016, Malcolm Rieke, et al, U.S. Pat. No. 9,749,351, Aug. 29, 2017.
U.S. Appl. No. 15/677,954, filed Aug. 15, 2017, Malcolm Rieke, et al, Allowed—Notice of Allowance Not Yet Mailed, dated Mar. 17, 2019.
U.S. Appl. No. 16/508,147, filed Jul. 10, 2019, Malcolm Rieke, et al, Docketed New Case—Ready for Examination, Jul. 26, 2019.
U.S. Appl. No. 14/523,624, filed Oct. 24, 2014, Malcolm Rieke, U.S. Pat. No. 9,912,549, Mar. 6, 2018.
U.S. Appl. No. 15/910,862, filed Mar. 2, 2018, Malcolm Rieke, Docketed New Case—Ready for Examination, Jul. 13, 2019.
U.S. Appl. No. 14/821,103, filed Aug. 7, 2015, Malcolm Rieke, et al, U.S. Pat. No. 9,769,174, Sep. 19, 2017.
U.S. Appl. No. 15/707,989, filed Sep. 18, 2017, Malcolm Rieke, et al, Docketed New Case—Ready for Examination, Feb. 5, 2019.
U.S. Appl. No. 15/443,857, filed Feb. 27, 2017, Malcolm Rieke, et al, U.S Pat. No. 1,020,5736, Feb. 12, 2019.
U.S. Appl. No. 15/667,526, filed Aug. 2, 2017, Malcolm Rieke, Docketed New Case—Ready for Examination, Jan. 30, 2018.

\* cited by examiner

| ZACL | Network Objects | Flow Information | | | | | | | | |
|---|---|---|---|---|---|---|---|---|---|---|
| |◁ Page 1 Of 1 ▷ ▷| ↻ Clear Filters | | | | | | | | | |

| Timestamp | Type | Source Asset Name | Signature ID | Source IP | Source Port | Destination IP | Destination Port | Port Group Name | ESX Host | ZACL Rule ID |
|---|---|---|---|---|---|---|---|---|---|---|
| | ∨ | ∨ | | | | | | | | |
| 04/21/2014 16:39:31 | ZACL Allow Flow | Vma-att1-34-esx2-vSw2-2 | ZACL Rule | 192.168.9.88 | 123 | 192.168.11.225 | 123 | vSw... | esx2.catbird.local | 1 |
| 04/21/2014 16:39:31 | ZACL Allow Flow | Vma-att1-34-esx2-vSw2-2 | ZACL Rule | 192.168.9.88 | 123 | 192.168.11.225 | 123 | vSw... | esx2.catbird.local | 1 |
| 04/21/2014 16:39:31 | ZACL Allow Flow | 192.168.9.6 [VLAN 0] | ZACL Rule | 192.168.9.6 | 50431 | 192.168.9.31 | 22 | | | 1 |
| 04/21/2014 16:39:31 | ZACL Allow Flow | Vma-att1-34-esx1-vSw1-4 | ZACL Rule | 192.168.9.89 | 48223 | 192.168.9.2 | 443 | vSw... | esx1.catbird.local | 1 |
| 04/21/2014 16:39:31 | ZACL Allow Flow | 192.168.9.6 [VLAN 0] | ZACL Rule | 192.168.9.6 | 50409 | 192.168.9.31 | 22 | | | 1 |
| 04/21/2014 16:39:31 | ZACL Allow Flow | Vma-att1-34-esx1-vSw1-4 | ZACL Rule | 192.168.9.89 | 123 | 192.168.11.225 | 123 | vSw... | esx1.catbird.local | 1 |
| 04/21/2014 16:39:32 | ZACL Allow Flow | Vma-att1-34-esx2-vSw2-2 | ZACL Rule | 192.168.9.88 | 123 | 192.168.11.225 | 123 | vSw... | esx2.catbird.local | 1 |
| 04/21/2014 16:39:32 | ZACL Allow Flow | Vma-att1-34-esx1-vSw1-4 | ZACL Rule | 192.168.9.89 | 48223 | 192.168.9.2 | 443 | vSw... | esx1.catbird.local | 1 |
| 04/21/2014 16:39:32 | ZACL Allow Flow | Vma-att1-34-esx1-vSw1-4 | ZACL Rule | 192.168.9.89 | 32788 | 192.168.9.6 | 443 | vSw... | esx1.catbird.local | 1 |
| 04/21/2014 16:39:32 | ZACL Allow Flow | Vma-att1-34-esx2-vSw2-2 | ZACL Rule | 192.168.9.88 | 123 | 192.168.11.225 | 123 | vSw... | esx2.catbird.local | 1 |
| 04/21/2014 16:39:32 | ZACL Allow Flow | Vma-att1-34-esx2-vSw2-2 | ZACL Rule | 192.168.9.88 | 123 | 192.168.11.225 | 123 | vSw... | esx2.catbird.local | 1 |
| 04/21/2014 16:39:32 | ZACL Allow Flow | Vma-att1-34-esx2-vSw2-2 | ZACL Rule | 192.168.9.88 | 123 | 192.168.11.225 | 123 | vSw... | esx2.catbird.local | 1 |
| 04/21/2014 16:39:39 | ZACL Deny Flow | 192.168.9.2 [VLAN 0] | ZACL Rule | 192.168.9.2 | 54129 | 192.168.9.3 | 443 | | | 2 |
| 04/21/2014 16:39:39 | ZACL Deny Flow | 192.168.9.2 [VLAN 0] | ZACL Rule | 192.168.9.2 | 52693 | 192.168.9.3 | 443 | | | 2 |

FIG. 11

SYSTEMS AND METHODS FOR NETWORK DATA FLOW AGGREGATION

CROSS-REFERENCE TO RELATED APPLICATION

This application claims priority to U.S. Provisional Patent Application No. 62/137,590, filed Mar. 24, 2015 and entitled "SYSTEMS AND METHODS FOR CREATING AND MODIFYING ACCESS CONTROL LISTS," and to U.S. Provisional Patent Application No. 62/103,496, filed Jan. 14, 2015 and entitled "SYSTEMS AND METHODS FOR CREATING ACCESS CONTROL LISTS FROM KNOWN FLOWS," the content of which is incorporated by reference in its entirety.

This application is related to U.S. Nonprovisional patent application Ser. No. 14/821,103, filed Aug. 7, 2015 and entitled "SYSTEMS AND METHODS FOR CREATING AND MODIFYING ACCESS CONTROL LISTS," and to U.S. Nonprovisional patent application Ser. No. 13/918,633, filed Jun. 14, 2013 and entitled "SYSTEMS AND METHODS FOR DYNAMIC NETWORK SECURITY CONTROL AND CONFIGURATION," and to U.S. Nonprovisional patent application Ser. No. 14/523,624, filed Oct. 24, 2014 and entitled "SYSTEMS AND METHODS FOR NETWORK ANALYSIS AND REPORTING," the content of which is incorporated by reference in its entirety.

BACKGROUND

Exemplary embodiments described herein relate to systems and methods for network security control.

Information security architects and security operators, as well as governance, risk and compliance (GRC) personnel all face various challenges with respect to validating that security technical controls are in place and functioning for an asset or a group of assets within the corporate computing environment. Furthermore, conventional systems for network monitoring and control typically have limited or no ability to contextualize security and compliance-relevant data from various components of systems for computing, security control, and/or management. Such challenges can be particularly difficult in distributed computing, virtualized computing systems, or "cloud computing" systems, where the components and environment of such systems may change frequently and rapidly.

Additionally, conventional systems for network monitoring and control typically only use data from a single source, or only one type of data (such as network flow data), thereby excluding potential sources of important context-supporting data and providing a one-dimensional, network-protocol-centric view of information flow between networked systems.

Furthermore, conventional systems often do not provide users (such as network administrators, operators, and security architects) with comprehensive and actionable information upon which to base decisions such as whether to permit or deny a particular asset access to services hosted by another asset on the network.

Network monitoring systems also must contend with the processing and storage of large amounts of data. In many cases, particularly large network deployments, the large volume of raw network flow data can only be stored for a relatively short amount of time, thus limiting the scope and usefulness of any presentation of such data.

Embodiments of the present disclosure help to address such challenges.

SUMMARY

Embodiments of the present disclosure can aggregate network flow data over various periods of time, and present a graphical representation of the network flow information based on the aggregated data instead of (or in addition to) the raw network flow data. Among other things, embodiments of the present disclosure are able to present historical network flow data for relatively long periods of time without having to store large volumes of raw network flow data.

A computer-implemented method according to one embodiment of the present disclosure includes collecting, by a computer system, data from a plurality of different types of sources on a network; identifying, by the computer system based the collected data, a plurality of network assets and connections between the plurality of network assets; generating, by the computer system, an aggregation of the collected data that includes a subset of the collected data over a predetermined period of time; and presenting, by the computer system based on the aggregation of the collected data, a graphical representation that includes the plurality of network assets and the connections between the plurality of network assets, wherein the graphical representation is presented via a display of a user interface in communication with the computer system.

The present disclosure includes various apparatuses which may perform the methods described herein, including computer systems. The present disclosure also includes computer readable media containing instructions that, when executed by one or more computer systems, cause the computer system(s) to perform the methods disclosed herein.

Other features will be apparent from the accompanying drawings and from the detailed description which follows.

BRIEF DESCRIPTION OF THE DRAWINGS

A more complete understanding of certain embodiments may be derived by referring to the detailed description and claims when considered in connection with the following illustrative figures.

FIG. 11 is an exemplary data table according to various aspects of the present disclosure.

DETAILED DESCRIPTION OF EXEMPLARY EMBODIMENTS

Figure 1:
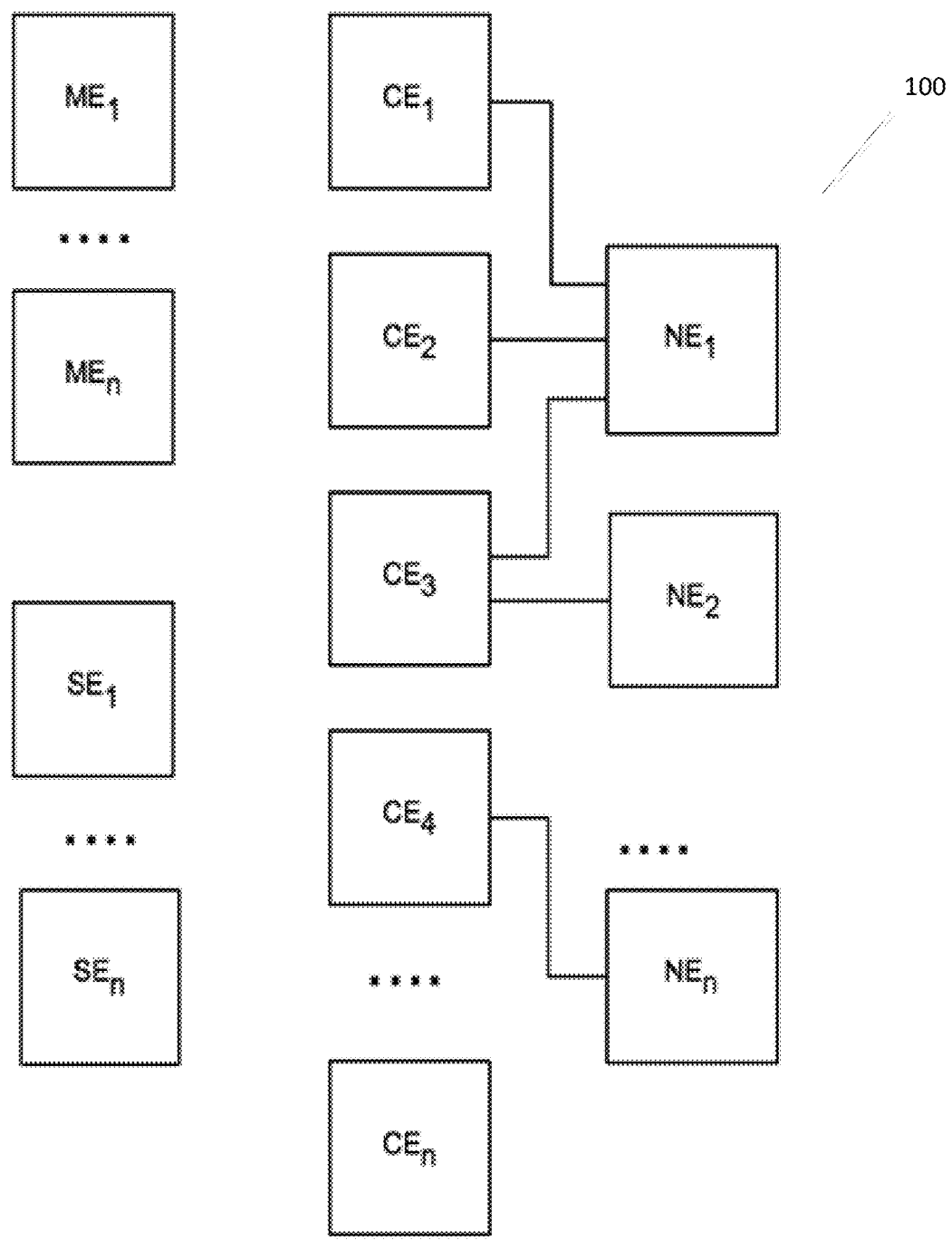
FIG. 1 depicts an exemplary computing environment that may be used in conjunction with various embodiments of the present disclosure.

Systems, methods and computer program products are provided. In the detailed description herein, references to "various embodiments," "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements including, for example, event streams such as IPFIX data feeds, data channels, direct network inspection (such as in an intrusion detection system), log feeds, log inspection, and/or programmatic interactions such as those utilizing an application programming interface. It should be noted that many alternative or additional functional relationships or physical connections may be present in a practical system.

The present disclosure may reference the following terms defined in the list below. The definitions in this list are exemplary only. Changes, modifications, and variations based on different definitions of the terms, as well as different terms, are intended to be included within the scope of the present disclosure.

Asset—a discrete hardware based on virtualized computing system that processes data in the data center, a virtualized computer or virtual machine. Assets may become a member of a TrustZone either through automated methods as expressed in membership polices or manually through a user action.

Asset attribute—a property of an asset including but not limited to any operating system configuration setting, data processing application deployed on the asset, application configuration setting, hardware based or virtualized system component including network interface, memory, disk, networking component interconnection, unique identifier, name, or any discrete data component or label associated with an asset, an asset configuration, or the asset's position within the physical or virtualized datacenter system.

Security technical control—a device, technology, software program, or a configuration or attribute of an element that performs a security function or changes the security posture or state of an element including but not limited to: firewalling, intrusion detection and prevention, vulnerability scanning, vulnerability management and mitigation, anti-malware, host based intrusion detection and prevention, file integrity monitoring, authentication-authorization-auditing, encryption in motion, encryption at rest, encryption key and token management, user entitlement management, network access control, password length specification, configuration settings that dictate the operation of a system or element in one or another context of various security levels.

Policy—a policy is a rule, set of rules, and or set of data used to guide the operation or behavior of a system or system component/element. Specifically a body of data associated with a security technical control that dictates the behavior and function of that control.

Logical zone—an arbitrary grouping of assets that may or may not have common attributes associated with a set of policies.

Hypervisor—a piece of computer software, firmware or hardware that creates and runs virtual machines.

Virtual Switch—a piece of software that provides for the network interconnection of virtual machines on a hypervisor.

Firewall—a software or hardware based security technical control that controls network traffic passing through it by analyzing the traffic components (packets) and making a decision to pass or block the traffic based on a set of rules.

Intrusion Prevention System (IPS)—a software or hardware based security technical control that inspects network connections for the purpose of detecting and disrupting undesirable network traffic based on signatures or behavior modeling.

Vulnerability Scanner—a software or hardware based security technical control that assesses the vulnerability state of assets on the network through the process of connecting to the asset over the network or running the asset as a process and assessing the asset based on known vulnerability signatures, vulnerability indicators, observed behaviors of the asset, programs running on the asset, and/or operational attributes of the asset.

Compliance Framework—a structured set of guidelines, processes and procedures published for the purpose of defining accordance with established regulations, specifications, or legislation.

Catbird TrustZone—a logical zoning construct consisting of collection of policies that include control configuration policies, membership policies, and a collection of methods that implement dynamic control reconfiguration in response to changes in the computing environment.

GRC—Governance Risk and Compliance, a generalize grouping of three related functions within an organization that respectively deal with corporate governance, enterprise risk management (ERM) and corporate compliance with applicable laws and regulation.

Embodiments of the present disclosure may monitor all asset attribute changes (i.e., those assets within or outside of a TrustZone), computing environment changes, network component changes, security control events, management component events, asset events, and/or network events. Such events, which may be referred to collectively as "environmental events" herein, can be monitored within the context of all control configuration policies such that any control configuration policy can be dynamically modified to assure that the control is still in effect for any asset in a respective TrustZone.

Environmental events within the context of TrustZone members and membership policy can be monitored such that different sets of security control policies may be dynamically assigned to, or changed for, any asset in a TrustZone by moving the asset from one TrustZone to another or by changing a policy or policies for a TrustZone of which that asset is a member. Such changes may be applied to multiple assets by simultaneously performing the same move action on multiple assets, particularly in the case of a TrustZone membership change.

Referring now to FIG. 1, an exemplary computing environment 100 that may operate in conjunction with embodiments of the present disclosure is depicted. The components of environment 100 may be implemented using any desired combination of hardware and software components, and may be hosted by, for example, host computing system 810 depicted in FIG. 8. Alternatively, or additionally, system 800 (or any portion thereof) may be included in environment 100. In the example shown in FIG. 1, the environment 100 includes four different types of components: computing elements (CE), networking elements (NE), management elements (ME), and security elements (SE). Embodiments of the present disclosure may interact with any number of such components, as well as other components. Each individual component may represent computers or virtual machines including any desired physical or virtualized hardware computing resources, such as processors, memories, switches, routers, load balancers, operating systems, software applications, and/or configuration elements (files, processes, policies, programs). Any element or derivative thereof depicted in FIG. 1 may be implemented using any desired combination of physical and virtual components. Virtualized elements may be bound to physical hardware using any desired hypervisor software, such as VMware ESXi, Microsoft Hyper-V, and/or OpenStack.

Computing elements are characterized by their function as application platforms dedicated to the processing of data and to providing computer services in the form of applications to a user population of various privilege levels. One example of a computing element may include a physical or virtualized Microsoft Windows server or Linux server running an application.

Network elements are characterized by their function of providing for the interconnectivity (in part or in whole) of various elements within the computing environment with networking technology and protocols and to providing for the transportation of data between computing environment elements. Examples of network elements may include routers, switches, virtualized switches, networks, VLANs, and/or software defined networking components including virtual extensible LANs (VXLANS).

Management elements are characterized by their function as hosting applications that are dedicated to the management and operation of the computing environment, the processing of data, and providing management and operational services in the form of management and operation applications to a user population of privileged administrative users. Management elements may manage other elements including computing elements, network elements or other management elements. One example of a management element may include a Microsoft Windows server running VMware vSphere Server software that is managing hypervisors in the computing environment.

Security elements are characterized by their function of providing implementations of various technical security controls either at the network, host, virtual machine, asset, program, or process level. Security elements may have hierarchical deployment architectures that include any desired number of network elements, management elements, computing elements, programs, processes, and methods implemented in a physical and/or virtualized format. Examples of security elements may include a firewall appliance and its management element or software, anti-virus software and its management and update mechanisms, a vulnerability scanner, and/or a centralized public key infrastructure utilized for access or user entitlements.

Figure 2:
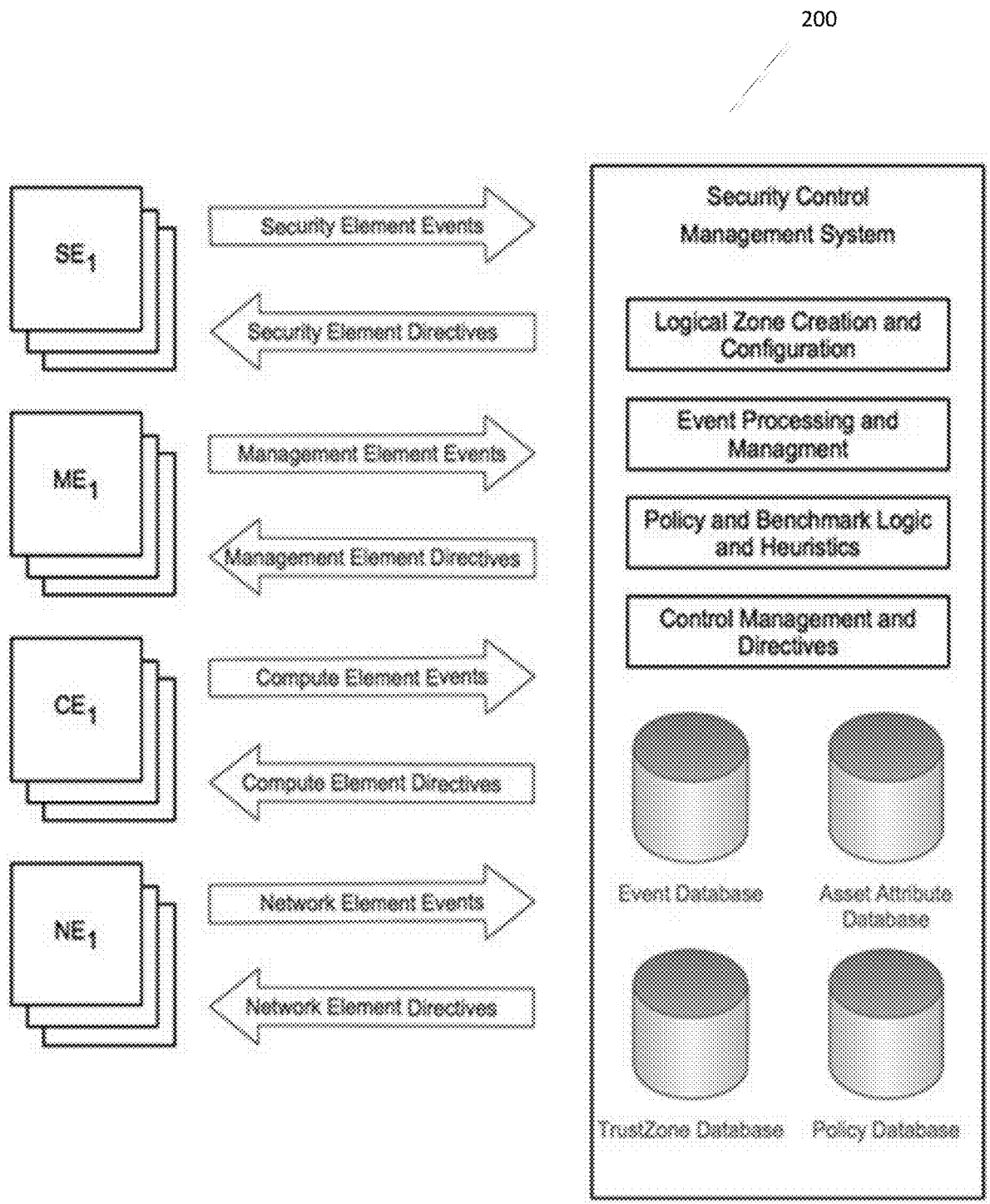
FIG. 2 depicts exemplary security control and management components according to various embodiments of the present disclosure.

FIG. 2 depicts components and programmatic inputs and outputs of a Security Control Management System (SCMS) 200 in accordance with an embodiment of the present disclosure. This embodiment may include various hardware and software components, software algorithms, data structures, and databases to implement various functions of the SCMS 200. Alternate SCMS's may have more, fewer, or different components and functionality.

In the exemplary embodiment depicted in FIG. 2, The SCMS 200 interacts with the computing environment through programmatic messaging mechanisms implemented via one or more standardized and/or proprietary interfaces or Application Programming Interfaces (APIs). The interface may utilize Secure Socket Layer (SSL) encryption, as well as any other desired encryption techniques to assure privacy and integrity of messages, events, directives and commands. Encryption techniques utilized by embodiments of the present disclosure may include mutual authentication for the sending and receiving elements. Programmatic messaging mechanisms may be implemented in any suitable manner by exemplary embodiments of the present disclosure such as via APIs, command line interface integrations, database queries, programmatic collection of display data (i.e., screen scraping), inter process communication methods, file system access, and others.

Through the programmatic messaging mechanisms, the SCMS 200 discovers information about the computing environment. Such information may include information related to individual elements, combinations of elements, or all elements. The discovered information may be used by the SCMS 200 for any desired purpose, such as to identify elements to be secured by the system and/or to heuristically determine element attributes for configuring security technical controls. The discovered information may also be used for evaluating compliance with governmental or industry regulations, security posture, security control function, security control efficacy, security control coverage, and/or security control operation.

The programmatic messaging mechanisms may include (where supported by the element or elements) the exchange between the element or elements and the SCMS 200, element related messages, logs, telemetry, configuration settings, data generated by programs or processes including or not including the SCMS 200, element attributes, data reflecting the current state and configuration of the element, and any other data relevant to the security technical controls, policies or benchmarks, either relative to the element itself or as available from the element or other elements in the computing environment, all of which may be collectively referred to herein as "events."

The programmatic messaging mechanisms may also include a command and/or configuration interface for reconfiguring the element in terms of configuration settings, policies, configuration files, the starting and stopping of element components including programs and processes, and/or to issue commands directly to the element for the purpose of changing the operational state of the element or to initiate reconfigurations performed through the same mechanism, all of which may be collectively referred to herein as "directives."

In the exemplary embodiment depicted in FIG. 2, the various components may include any desired combination of hardware and/or software components to perform various functions. For example, the Event Processing and Management component may normalize or transform such events for archiving and further processing by other components. Normalizations and transformations may include asset attribute substitution or addition through the addition of asset relevant identifiers for the purpose of associating the events with an information asset, the removal of data from the event for space reduction for archival purposes, the addition of attributes determined by the system to be relative to the originating element through events or algorithmic output from the system generated from events originating from other elements. Event processing may include extracting, from the event, streams of data and information relevant for the creation, maintenance and execution of policies, asset identification, configuration of security technical controls, and data relevant to the element and the state of the element relative to benchmarks or baselines consistent with and impacting the level of compliance with said benchmarks or baselines.

The Logical Zone Creation and Configuration performs the tasks related to TrustZone creation and configuration. This component deals with the mapping of information assets to logical zones (TrustZones) and provides the association of security technical control policies to the information asset.

The Policy and Benchmark Logic and Heuristics component performs the analysis of the policies and configurations of the security technical controls, relevant to and within the context of logical zones and the information assets within them within the context of the element events streams. This component measures data contained in events for the purpose of validating controls that are still in place and maps those control validations to various compliance frameworks such as PCI DSS 2.0, HIPAA, COBIT 4.1, DIACAP, and/or FISMA, as well as arbitrary frameworks, such as those devised at the discretion of an operator through the specification of various combinations of: policies, technical controls, asset attributes, required interactions with the SCMS verified by events, and/or attributes of elements of various types, such as those depicted in FIG. 1. This logic evaluates changes in security technical control configuration and asset attributes and performs security technical control policy reconfigurations based on those asset attribute changes for the purpose of maintaining the policy and application of the security technical controls and compliance with the benchmark. This logic evaluates various policy settings and takes the appropriate actions in response to asset attribute changes and asset TrustZone membership changes.

The Control Management and Directives component performs the construction of directives and initiates the delivery of directives to the computing environment elements to affect the appropriate action or actions from the elements including: the generation of events, transfer of configuration and process data in either direction, the starting and stopping of a security technical control, the reconfiguration of the security technical control with an updated policy, the reconfiguration of an element of any type, the starting and stopping of a program or process, the change of a configuration or attribute affecting a configuration, and the validation that the control is applied to any information asset as qualified by configuration data supplied through the events or directives.

The Event Database is a database used for the storage, retrieval, and management of events from any and all elements including the security control software itself. This database is used to store and subsequently query events for asset attribute data, security control configuration data, policy data and event data for the purposes of the various logic blocks and heuristics implemented in other components.

The Asset/Attribute Database is used for the storage, retrieval, and management of assets and asset attribute data. This database is used to store and subsequently query asset and asset attribute data for the purposes of the various logic blocks and heuristics implemented in other components.

The TrustZone Database is a database component used for the storage, retrieval, and management of logical zones (TrustZones). This component is used to store and subsequently query, update, modify TrustZones, information assets within a TrustZone, security technical control policies associated with the TrustZone for the purposes of the various logic blocks and heuristics implemented in other components.

The Policy Database is a database component used for the storage, retrieval, querying, and management of policies for the security technical controls, assets, software implementing embodiments of the present disclosure (or portions thereof), and the environment.

Figure 3:
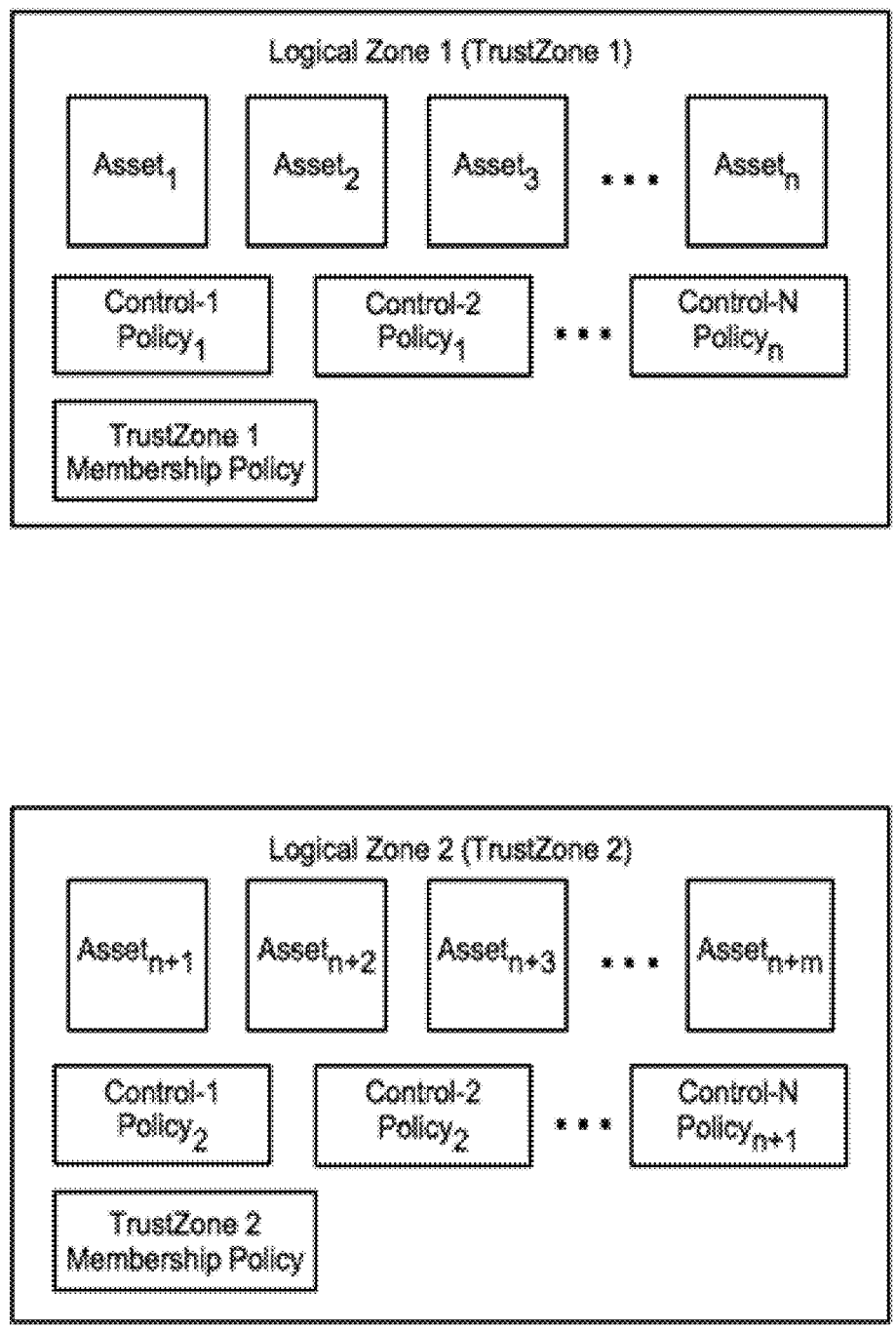
FIG. 3 depicts a logical representation of various logical zones according to various embodiments of the present disclosure.

FIG. 3 depicts the logical representation of Logical Zones, also referred to herein as TrustZones. This configuration construct, with its associated data structures, binds assets and groups of assets through the application of policies that dictate the function and behavior of the security technical controls. TrustZones can have arbitrary numbers of assets and security technical control policies. Different security technical controls may have policy constructs that allow for hierarchical or logical inheritance from/with other policies so the depiction of a Control-N policy represents the collection of all security technical control configuration policies, files, data, configuration settings that specify the specific operation of the security technical control at any time, stored as a unit for security technical control N.

Whereas the number of control policies may be contingent on the number of supported security technical controls, new controls may be integrated with embodiments of the present disclosure as such controls are developed and become available, and can result from the combination of control functional data and events from multiple security technical controls. Accordingly, the number of control policies may vary based on the security requirements for the computing environment and the technical security controls available and configured.

TrustZone membership policies may dictate how assets are automatically placed into one or more TrustZones based on asset attributes and events originating from any element as collected by the SCMS. Each asset can be assessed, as events indicating an asset attribute has changed are received by the security control software, within the context of all TrustZone membership policies so as to affect a TrustZone membership change by moving the asset from one TrustZone to another or adding the asset to another TrustZone.

Any combination and/or subset of the elements of the methods depicted herein may be practiced in any suitable order and in conjunction with any suitable system, device, and/or process. The methods described and depicted herein can be implemented in any suitable manner, such as through security control software operating on one or more computer systems, including host system 810 depicted in FIG. 8. The security control software may comprise computer-readable instructions stored in a tangible computer-readable medium (such as the memory 814 of host computer system 810) and can be executed by one or more processors (such as processor 812 of host computer system 810) to perform the methods of various embodiments.

Figure 4:
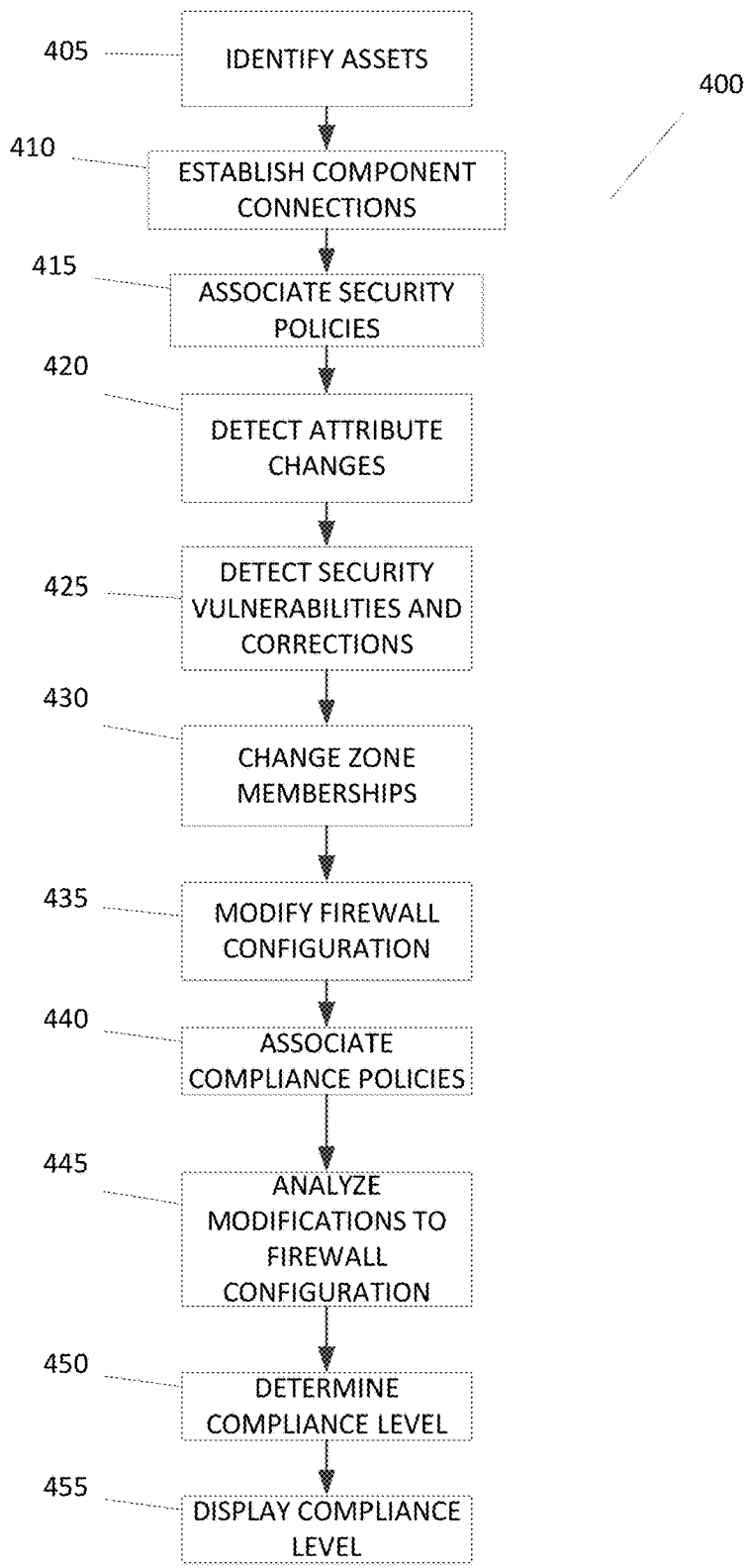
FIG. 4 is a flow diagram of an exemplary method according to various aspects of the present disclosure.

FIG. 4 depicts an exemplary process according to various embodiments of the present disclosure. In FIG. 4, method 400 includes identifying one or more assets associated with one or more logical zones (405), establishing connections with one or more components (410), associating one or more security policies with one or more logical zones (415), detecting changes in one or more attributes for one or more assets (420), detecting security vulnerabilities and corrections thereto (425), changing zone memberships for one or more assets (430), modifying one or more firewall configuration settings (435), associating one or more compliance policies with one or more logical zones (440), analyzing modifications to the firewall configuration settings (445), determining one or more compliance levels (450), and displaying one or more compliance levels (455). The steps of method 400 may be implemented (in whole or in part, and in any desired order) by software operating on a computer system, such as the exemplary host computing system 810 depicted in FIG. 8.

Embodiments of the present disclosure may identify any number of different assets (405) associated with any number of different logical zones, such as the assets in Logical Zones 1 and 2 depicted in FIG. 2. As discussed above, such assets may include any combination of physical and virtual components.

Connections may be established (410) with any number of different software and hardware components. Embodiments of the present disclosure may operate in conjunction with various programmatic messaging mechanisms that help bind the SCMS with the security technical controls within the environment. The logical zones, or TrustZones, may be created in any suitable manner, such as through interactions with logical components not depicted, policies placed on one or more logical zones that are relevant to the security technical controls bound to the SCMS.

Computing environment events may be received via programmatic messaging mechanisms that provide various information about the environment, including the assets to be protected by the security technical controls and/or the state of the security technical controls. Connections between the security control software and various components (such as management components) may be made to send and receive information, detect changes in the attributes of various assets, and to control and configure various systems, such as a firewall protecting one or more assets or logical zones.

In one embodiment, security control software implementing features of the present disclosure establishes connections via programmatic messaging mechanisms (as described above) between itself and the management element or asset management component of a virtualized infrastructure, such as a VMware vSphere server, and between itself and the management element for a virtualized firewall implemented on the same virtualized infrastructure, such as a VMware vCNS App firewall. Changes in an attribute of an asset may be detected via a communication with the management element and the security control software.

Assets, and changes in the attributes of assets, may be detected by periodically querying the management element or other hardware or software components. For example, a security technical control, referred to herein as a Virtual Infrastructure Monitor (VIM), may use the connection to the vSphere server to identify and enumerate all virtualized computing elements (i.e., virtual machines) and all virtual switches. Through the API interface with vSphere, the security control software implementing the features of the present disclosure may periodically query and re-enumerate the configured virtual machines and virtual switches, thus determining the creation of new assets (such as virtual machines and virtual switches) or changes to the attributes of existing assets by comparing the results of subsequent queries with the previous query. The attributes for a plurality of different assets controlled by an asset management component can be monitored by querying the asset management component, as well as via communications originated by the asset management component to the security control software.

The VIM is also capable of querying various virtual machine configurations and settings such as the virtual infrastructure Universally Unique Identifier (UUID) for the virtual machine, the virtual network interface cards, virtual machine interface card Internet Protocol (IP) address, current position of the virtual machine interface card within the virtual switch or switches, and many more configuration settings, which may be referred to herein collectively as "attributes of the virtual machine." Through the processing of events generated by VIM, the SCMS "incepts" each virtual machine as an information asset within the SCMS, storing the asset data including attributes in the Asset/Attribute database.

In the present exemplary embodiment, the availability of a management element that provides the API interface to enumerate assets and asset attributes makes this process programmatically simplified when the computing environment includes a predominantly virtualized infrastructure. Alternate embodiments could collect and/or create the same or similar data relative to physical computing elements through the establishment of programmatic messaging mechanisms with a variety or combination of management elements, other technical security controls (such as network scanners), and with the physical computing elements themselves. Thus, embodiments of the present disclosure may operate with any combination of physical and virtual components.

The system may instantiate another connection with the management element for the virtualized firewall (i.e., a firewall management component) implemented on the same virtualized infrastructure. This connection need not necessarily include a technical security control in of itself, but rather a programmatic interface to the firewall (a technical security control). The functionality of the firewall can be managed via a communication between the security control software and the firewall management component. In exemplary embodiments, the programmatic interface or API enables the SCMS to fully control the firewall, the firewall operation and firewall policies expressed in configuration settings and access control lists (ACLs), through a combination of issued directives and collected events to and from the firewall management element. This connection and API constitutes an orchestrated security technical control relative to the SCMS.

Various security policies may be associated with different assets and/or logical zones (415) in any suitable manner. For example, an operator of the SCMS, as well as the software control software itself, may create and configure various logical zones, and security policies for such zones, expressed as a sequence of rules. In one exemplary embodiment, the rules may have the form:

Source_TrustZoneA Destination_TrustZoneB protocol port [allow, deny]

In this example, each rule is a Zone Access Control rule, and the set of all configured Zone Access Control rules may be referred to herein as a Zone Access Control List or ZACL. In the example above, the source TrustZone is named TrustZoneA and the destination TrustZone is named TrustZoneB. By providing this abstraction, embodiments of the present disclosure help to simplify the management of what are known to practitioners of network security as Access Control Lists, which typically consist of source and destination IP addresses. While complex and disassociated asset attributes like IP address are used within conventional ACLs, in the ZACLs utilized by embodiments of the present disclosure, the source and destination are logical zones which have human readable names that are more identifiable relative to the information the assets in the ZACLs are protecting with the firewall security technical control. Referring again to FIG. 3, each TrustZone may be associated with a policy (415) for the firewall security technical control as the TrustZone is placed in the ZACL (e.g., via adding a Zone Access Control rule containing the TrustZone to the ZACL), whereby changes in the configuration to the firewall are performed in accordance with the policy. The security policy can also be edited or replaced for any TrustZone already placed in the ZACL, by for example, modifying the Zone Access Control rule.

The security control software can monitor changes (420) for all virtual machines and physical components within one or more logical zones. Event data may be analyzed and processed, and security technical controls configured or reconfigured (435) via the modification of policies. Modification of the configuration settings for the firewall may be made based on a change in a single attribute of a single asset, as well as based on an analysis of multiple attribute changes for multiple assets. For example, referring again to FIG. 3, in a case where the logical zone memberships for an asset in Logical Zone 1 and an asset in Logical Zone 2 are swapped, the security control software may analyze the change in zone membership for both assets and make a single change to the configuration settings for the firewall in accordance with the analysis. Among other things, considering multiple attribute changes (such as the swap in zone membership above) together can help embodiments of the present disclosure avoid repetitive and spurious modifications to the firewall.

Continuing with the example above, when an operator or software places an asset (Asset1) into TrustZoneA the security control software detects the change in the attributes of the asset (420), namely the change in TrustZone membership, and modifies the firewall configuration (435) accordingly. In this example, as a result of the TrustZone change, the security control software evaluates the asset attribute IP address for Asset1 and then implements an ACL on the firewall in the firewalls native form (ACL), through a formulated directive to the firewall. If a second asset (Asset2) is placed into TrustZoneB, the security control software detects the change (420), evaluates the asset attribute IP address for Asset2, and then implements an ACL on the firewall (435) in the firewall's native form (ACL) through a formulated directive to the firewall. At this point, assuming it is desired that all Transmission Control Protocol (TCP) connections between TrustZoneA and TrustZoneB be denied, the native firewall rule (ACL) may appear as:

Asset1_IP address Asset2_IP address TCP any deny

And the ZACL may appear as:

TrustZoneA TrustZoneB TCP any deny

For each asset added to either TrustZoneA or TrustZoneB, the system may continue building the native firewall ACL through subsequent directives, configuring the firewall automatically as the operator populates the TrustZones with assets.

Embodiments of the present disclosure may operate to detect any desired change in the attributes of an asset, such as the asset's internet protocol (IP) address. For example, if a Dynamic Host Configuration Protocol (DHCP) IP address lease expires and Asset1 receives a different IP address upon renewal of the lease; or Asset1 receives a different IP address through DHCP after being powered off for a period of time; or a hacker changes the IP address in an effort to bypass the network access controls; or an administrator accidently assigns the wrong IP address (mis-typing)—in all cases, the IP address of Asset1 changes. Because the security control software of the present disclosure is monitoring the asset attributes of all assets (e.g., through VIM), when an asset attribute change is detected (420), the security control software can formulate and send a directive (435) to modify the ACL on the firewall to reflect the new IP address.

Now consider a third TrustZone, TrustZoneC, from which the operator wants to allow all TCP connections to TrustZoneB. The ZACL for these policies would look like this:

TrustZoneA TrustZoneB TCP any deny

TrustZoneC TrustZoneB TCP any allow

In an example using these TrustZones, consider that, as a result of an architectural change, Asset1 (currently in TrustZoneA) now needs to be allowed to make any TCP connection to Asset2 (currently in TrustZoneB). Asset1 can be moved from TrustZoneA to TrustZoneC. The system, through it's monitoring of the asset attributes, detects the move (420) and can formulate a directive to the firewall (435) to remove Asset1's IP address from the deny ACL and add Asset1's IP address to the allow ACL. This may result in completely changing the firewall policy for both Asset1 and Asset2, and can be performed automatically, with minimal operator effort, and without the need to manipulate complex numerical ACLs on the firewall. In this manner, the configuration settings of the firewall can be modified in response to detecting the move an asset from one logical zone to another to allow or prevent communication between the moved asset and another asset or component.

Among other things, logical zoning with TrustZones helps maintain, for the security technical control firewall, the policy and the integrity of the policy when asset attributes that impact the operation of the firewall are changed for natural, accidental, or malicious reasons. Additionally, embodiments of the present disclosure are equally effective in reconfiguring the settings of a firewall when an asset (such as a physical hardware component) physically moves locations, or is simply reassigned from one logical zone to another without physically moving the asset. Furthermore, the movement of virtualized assets between the management of one management element to another management element (e.g., a vMotion event, or migration from one virtual infrastructure to another) can be tracked, as may the location of physical assets, via the connections between the security control software and various asset management components.

Embodiments of the present disclosure can move an asset (i.e., change its logical zone membership) from one TrustZone to another (430) as desired, such as when the asset attribute VM name changes. In other embodiments, different attributes or combinations of attributes for the asset, other assets, or any element could be monitored for change and affect the same TrustZone change behavior for an asset. Accordingly, as illustrated above, the firewall policy may be maintained or changed (in whole or in part) based on the nature of the attribute changes detected by the security control software implementing features of the present disclosure.

Embodiments of the present disclosure have significant utility when considering asset attributes derived from the operation of other security technical controls like a vulnerability scanner or malware detection. New vulnerabilities and viruses are constantly being discovered, so the embodiments of the disclosure can help facilitate pre-planning and pre-configuration of counter measures for these events by allowing the architect to configure TrustZones with more limited network access or no network access at all.

Referring again to FIG. 4, upon detection of a security vulnerability (such as a virus or other malware, or a defect in hardware or software) on an asset (425), security control software of the present disclosure could automatically limit or terminate network access by moving the asset (430) to a predefined TrustZone until other automated security technical controls update the vulnerability software or remove the virus. Such quarantine could be automatically removed in response to detecting the asset attribute condition that initiated the automated movement of the asset being cleared (420), or from the security control software receiving another indication that the security vulnerability has been addressed. Once the security vulnerability is addressed, the asset may be automatically moved back to the original TrustZone and the original network access policies (as expressed in the ZACL) automatically restored.

For various compliance frameworks, the security control software of the present disclosure may perform a logical mapping between the compliance controls in the framework and various security technical controls (technical controls). Administrative controls may also be mapped to the compliance controls in the frameworks, through (for example) events that are generated by the security control software and that indicate the completion of specific operator interactions with the security control software, that indicate the completion of a workflow (a process or procedure that must be completed), and/or that meets the administrative control as defined in the framework. This mapping is referred to as a compliance mapping and, in one embodiment of the disclosure, is implemented within the Policy and Benchmark Logic and Heuristics components, and the Policy Database (see FIG. 2).

Referring again to FIG. 1, one or more compliance control policies may be associated with one or more logical zones and/or assets (440). When the technical controls required by the compliance control are validated as being place for an asset in a logical zone, the security control software, using the compliance mapping, may adjust the compliance level for that compliance control accordingly.

For security technical controls, the validation of the application of the security technical control to any one asset may be performed by the security control software of the present disclosure based on the logical zoning mechanisms and membership in a TrustZone with the appropriate policies for the security technical control as described above for firewall. Any additional security technical controls may be validated as well (e.g. IPS, Vulnerability Scanner, flow auditing), such as through various interactions with the management elements for various technical controls.

For administrative controls, SCMS events that indicate that a sequence of operations invoked by the operator within the security control software's user interface have been completed validate that the administrative control has been satisfied. An example of an administrative control is the production and sharing of reports. In such an example, the operator schedules a report and designates a contact list to receive the report. Upon completion of the scheduling, an event is generated indicating the report is scheduled for delivery, thus satisfying any administrative control that requires the collaboration or sharing of information contained in any report available. Alternate embodiments could implement events for any sequence of interactions (e.g. Configuration Wizards) for any process or procedure and validate any number of processes and procedures related to the operation and configuration of the security technical controls, administrative controls, management elements, security elements, network elements, and computing elements in the computing environment, thus providing validation of compliance controls that are procedural in nature.

When adherence to a particular compliance framework is desirable, the operator can, through the Logical Zone Creation and Configuration components (see FIG. 2), select a compliance framework for any TrustZone or TrustZones. Once a compliance framework setting is applied to a TrustZone, the policies and configurations of all technical security controls and performed administrative controls are evaluated within the context of the compliance mapping for the compliance framework selected.

The security control software may analyze one or more modifications to the firewall configuration settings (445). As each control is configured, the security control software, using the compliance mapping, generates a compliance level (450) for each compliance control that is supported by the security technical controls and administrative control sequences.

Compliance mappings may combine validated technical controls where information from one technical control or policy is not sufficient to assure compliance with compliance controls. For instance, in the above example, the firewall implementation of the access control, the ACL, is only sufficient to assure the asset is protected by the firewall, when the asset attribute IP address remains the same as the one configured in the firewall ACL. Examples above demonstrate that for any asset, the attribute IP address can and will change. Through the combination of the VIM control that monitors the asset attribute changes for virtualized information assets (VMs), including asset attribute IP address changes, the compliance mapping (which combines these controls for this purpose) of the present disclosure provides more robust assertion of compliance, than conventional methods of monitoring of the firewall ACLs alone. This specific combination of the VIM control and the firewall can be generalized to any combination of VIM with any network security technical control that depends on the asset attribute IP address to function correctly. The combination of different technical and administrative security controls can be further generalized to improve the assertion of compliance controls through, for example, the use of logical zoning that allows for the application and validation of multiple security control policies in a validated manner.

Figure 5:
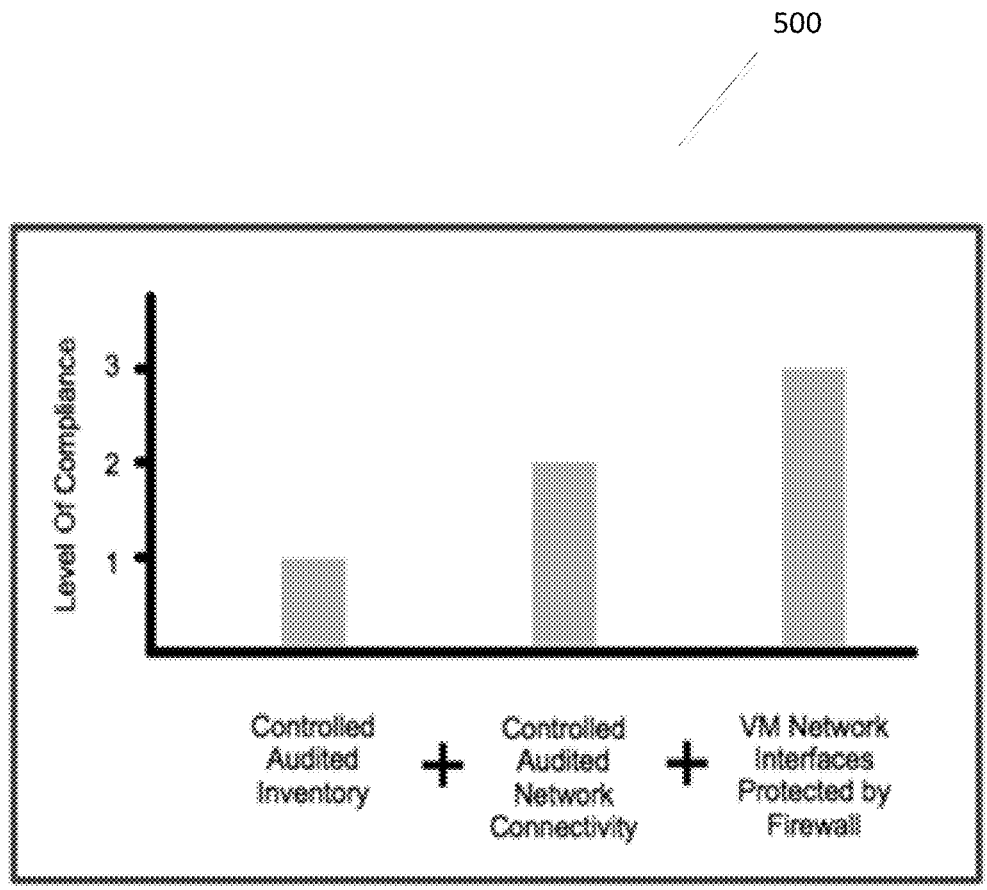
FIGS. 5-7 illustrate the calculation and display of compliance levels according to various aspects of the present disclosure.

As described above, embodiments of the present disclosure may update policies for firewalls automatically in response to IP address changes, thus maintaining compliance. This scenario illustrates why evaluating multiple technical controls may sometimes be desirable to help maintain compliance with compliance frameworks, and demonstrates the advantageous capabilities of the embodiments of the present disclosure. Although this example of combined security technical control for compliance mapping utilizes only two security technical controls, the number of security technical controls and/or events that may be combined for compliance mapping is not bounded, and combinations of arbitrary numbers may be utilized in embodiments of the present disclosure. In FIG. 5, for example, chart 500 illustrates three technical controls along the x-axis, with the contributed level of compliance to a compliance control along the y-axis.

Figure 7:
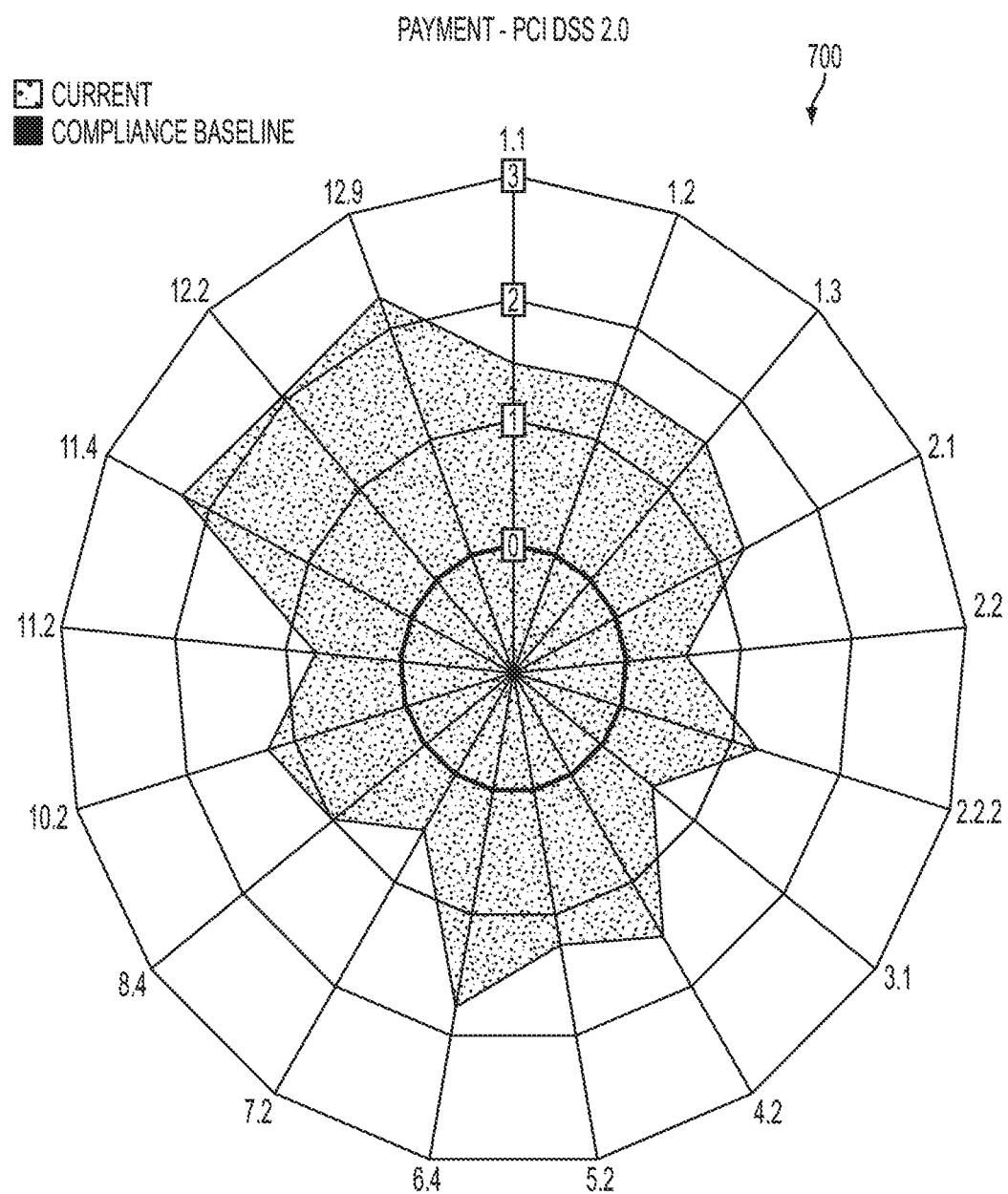

The application of firewall controls as described above may be validated by the logical zoning for any asset in a TrustZone with a ZACL listing. For any compliance control that requires the implementation of network base access controls enforced by a firewall, the security control software may utilize the instantiated compliance mapping in combination with other validated security technical controls to calculate the current compliance level for each supported compliance control. Each security technical control in a combination, as expressed in the mapping, may contribute a normalized portion of a defined compliance level measurement. These levels may be represented numerically, such as a level between 0 and 3, and that level displayed graphically (455) in real time or near-real time as shown in FIG. 7. Compliance levels (such as numerical scores) may be generated for any number of logical zones, assets, or other hardware and software components (such as the firewall) and may be simultaneously evaluated against multiple compliance frameworks through alternate compliance mappings.

Compliance frameworks are generally configured to protect data, such as cardholder data in the case of the Payment Card Industry (PCI) Data Security Standard. Generally, the number of individual elements in the computing environment that process data subject to any compliance framework is greater than one and is typically many. The sum total of all elements or assets that process the data subject to a compliance framework is referred to as the compliance scope. The compliance level of the computing environment, relevant to any framework, may only be as high as the level measured on the least compliance asset within the compliance scope. Logical zoning supports the inclusion of multiple information assets in any TrustZone. For any TrustZone with a compliance framework set, the security control software measures the compliance level for all supported compliance controls, for every asset within the TrustZone. The aggregate TrustZone level of compliance as displayed for any compliance control is calculated as the lowest measured compliance level for all assets within the TrustZone.

Figure 6:
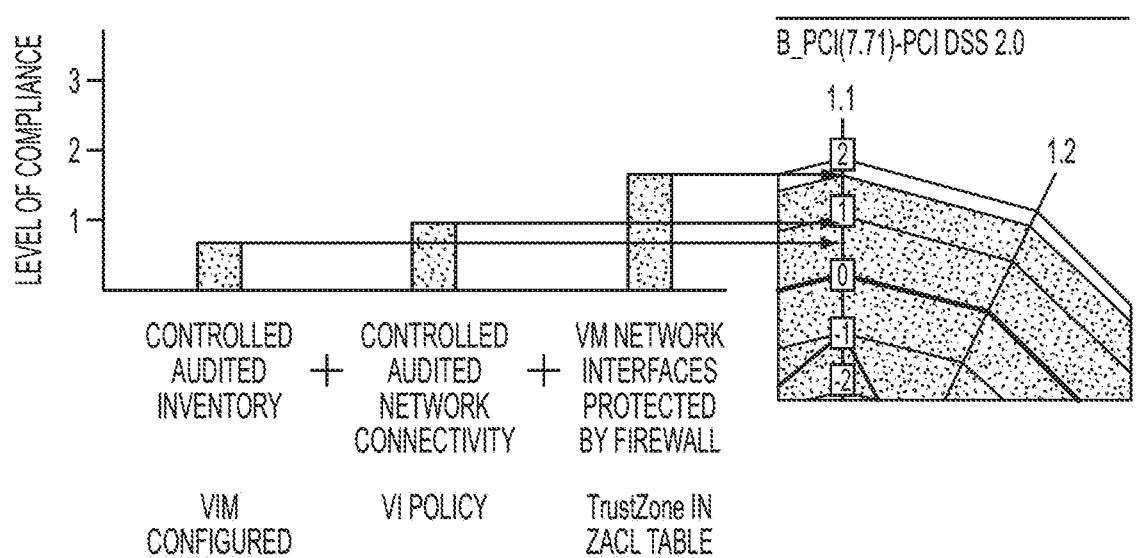

FIGS. 6 and 7 illustrate how an exemplary embodiment of the present disclosure, using a radial chart format, displays the compliance level for multiple compliance controls (455). In this example, the chart displays compliance for the PCI DSS 2.0 framework, but compliance levels may be graphically depicted for any number of different compliance standards in the same or different graphs.

With the radial chart 700 in FIG. 7, the aggregate compliance level for all compliance controls is displayed for all assets in a TrustZone named "Payment" based on calculation method described above. For each compliance control, the calculated compliance level is displayed as a radial element of the radial chart and is identified with the section number from the compliance framework.

Embodiments of the present disclosure may contain multiple compliance mappings for which the compliance levels for each TrustZone are calculated and displayed based on the specific and unique compliance framework set for that TrustZone. For example, a computing environment may contain data subject to multiple compliance frameworks. Among other things, logical zoning with TrustZones allows for the grouping of assets based on these compliance frameworks and the reporting of the compliance levels for those specific and distinct frameworks simultaneously, including the ability to measure compliance levels for an asset within the context of multiple compliance frameworks through the process of adding that asset to multiple TrustZones with different compliance framework settings.

Figure 8:
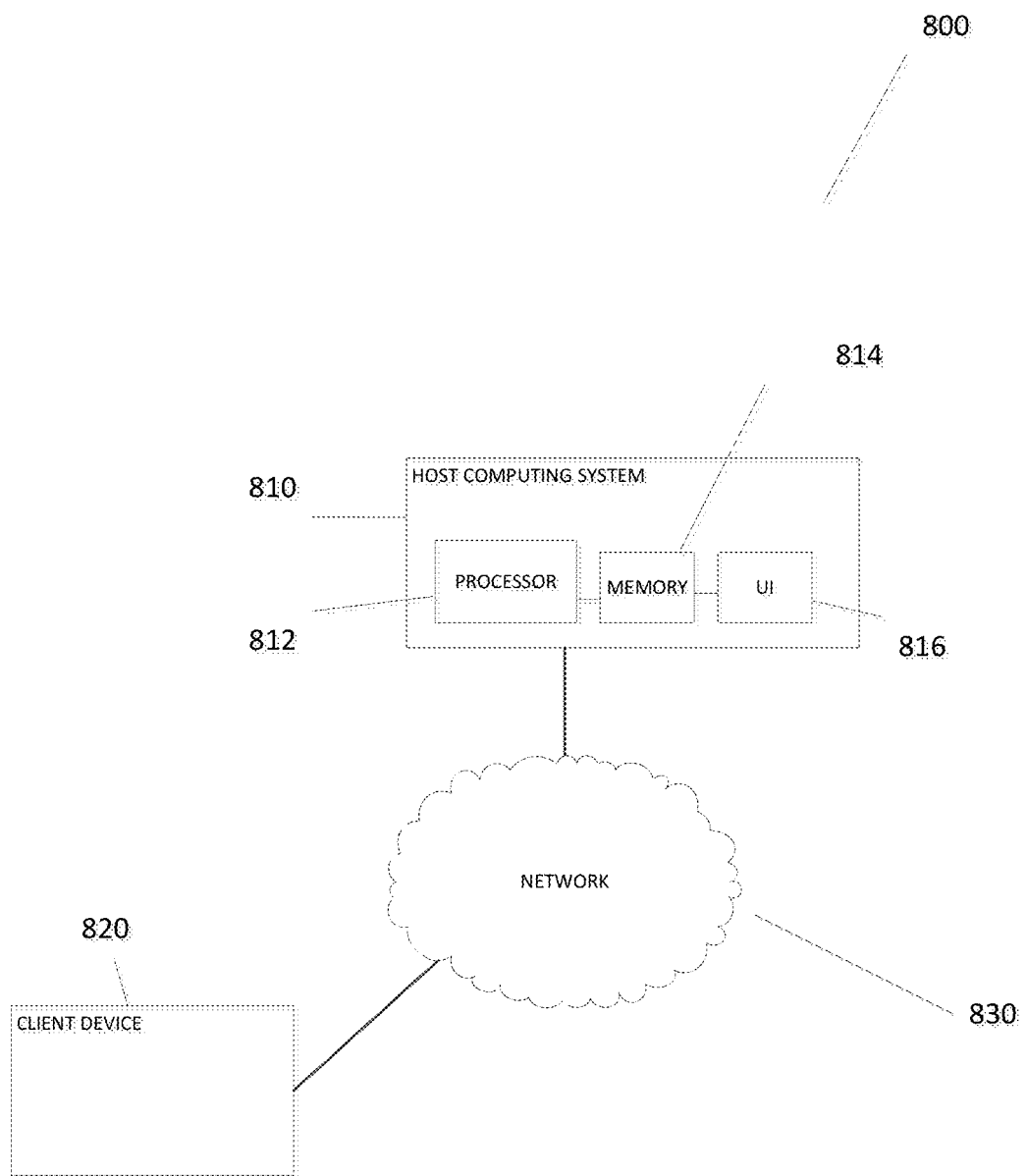
FIG. 8 is a block diagram of an exemplary system according to various aspects of the present disclosure.

FIG. 8 shows a block diagram of system which may be used in conjunction with various embodiments. While FIG. 8 illustrates various components of a computer system, it is not intended to represent any particular architecture or manner of interconnecting the components. Other systems that have fewer or more components may also be used.

In FIG. 8, the system 800 includes a host computer system 810 comprising a processor 812, memory 814, and user interface 816. Host computer system 810 may include any number of different processors, memory components, and user interface components, and may interact with any other desired systems and devices in conjunction with embodiments of the present disclosure.

Figure 9:
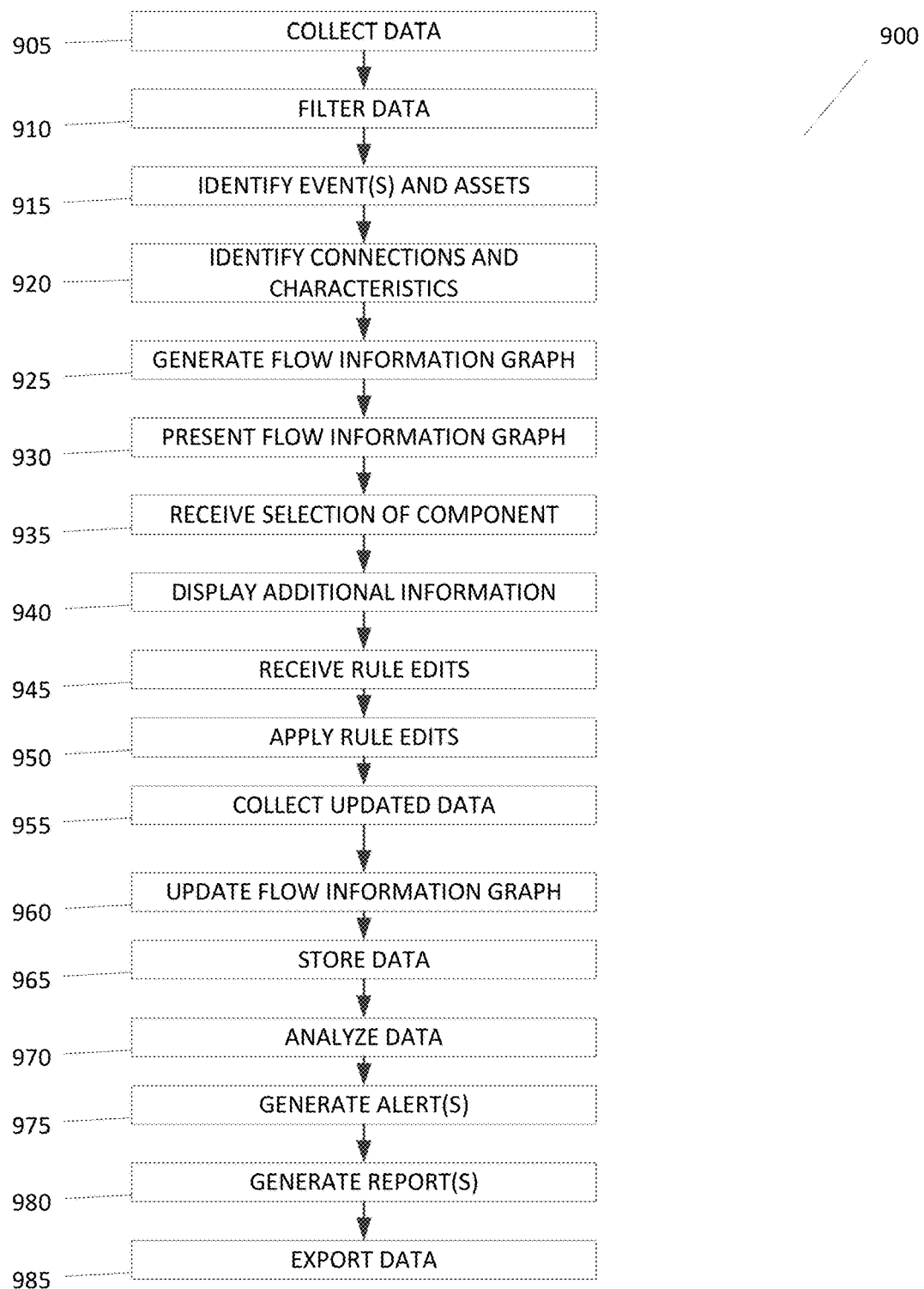
FIG. 9 is a flow diagram of an exemplary method according to various aspects of the present disclosure.

The functionality of the host system 810, including the methods depicted in FIGS. 4 and 9, (in whole or in part), may be implemented through the processor 812 executing computer-readable instructions stored in the memory 814 of the system 810. The memory 814 may store any computer-readable instructions and data, including software applications and embedded operating code.

The functionality of the host system 810 or other system and devices operating in conjunction with embodiments of the present disclosure may also be implemented through various hardware components storing machine-readable instructions, such as application-specific integrated circuits (ASICs), field-programmable gate arrays (FPGAs) and/or complex programmable logic devices (CPLDs). Systems according to aspects of certain embodiments may operate in conjunction with any desired combination of software and/or hardware components. The processor 812 retrieves and executes instructions stored in the memory 814 to control the operation of the system 810. Any type of processor, such as an integrated circuit microprocessor, microcontroller, and/or digital signal processor (DSP), can be used in conjunction with embodiments of the present disclosure. A memory 814 operating in conjunction with embodiments of the disclosure may include any combination of different memory storage devices, such as hard drives, random access memory (RAM), read only memory (ROM), FLASH memory, or any other type of volatile and/or nonvolatile memory. Data can be stored in the memory 814 in any desired manner.

The host system 810 includes a user interface 816 may include any number of input devices (not shown) to receive commands, data, and other suitable input from a user, as well as any number of output devices (not shown) to provides the user with data, notifications, and other suitable information.

Typical I/O devices may include mice, keyboards, modems, network interfaces, printers, scanners, video cameras and other devices.

The host system 810 may communicate with one or more client devices 820 and other systems and devices in any desired manner, including via network 830. The client device 820 may include any computing device that operates in conjunction with systems and methods of the present disclosure. The client device 820 may be, or include, a laptop computer, a desktop computer, a mobile subscriber communication device, a mobile phone, a personal digital assistant (PDA), a tablet computer, an electronic book or book reader, a digital camera, a video camera, a video game console, and/or any other suitable computing device.

The network 8300 may include any electronic communications system or method. Communication among components operating in conjunction with embodiments of the present disclosure may be performed using any suitable communication method, such as, for example, a telephone network, an extranet, an intranet, the Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Systems and devices of the present disclosure may utilize TCP/IP communications protocols as well as IPX, Appletalk, IP-6, NetBIOS, OSI, any tunneling protocol (e.g. IPsec, SSH), or any number of existing or future protocols.

Systems and Methods for Network Flow Analysis and Reporting

Many conventional systems for network monitoring, network control, and network security typically use network flow data from from routers, switches, or other hardware configured to collect network traffic statistics using a standard known as "IP Flow Information Export" (IPFIX), which is also known as "Netflow." IPFIX allows for the monitoring (e.g., auditing) of network exchanges between assets and, to some degree, qualifies information exchanges based on network connection attributes, such as IP address, source and destination port numbers, as well as byte count and other packet or connection attributes defined in the IPFIX protocol and implemented by the IPFIX sending device or software. However, conventional systems may not be capable of contextualizing the network connections represented with IPFIX with data from other sources, such as data from an intrusion detection system (IDS), intrusion prevention system (IPS), vulnerability scan data, configuration data, anti-virus/anti-malware data, policies applied to security technical controls, operating system configuration data, application configuration data, processes running on the asset (application or operating system processes), process initiating user identification, binary digital signatures, and/or data from firewalls.

Additionally, conventional systems may not be able to correlate and provide contexts and causal or resultant relationships between these data elements and the actions performed in the computing environment by their perspective generating components. Embodiments of the present disclosure, by contrast, can collect and analyze asset and network data from multiple sources, and use such data to present a more complete and accurate representation of security posture and security relevant phenomena compared to conventional systems by, for example, supporting and performing complex combinatoric analyses for the correlation of events, network connections, asset operational states, and the states of security technical controls.

FIG. 9 depicts an exemplary process according to various embodiments of the present disclosure. Any combination and/or subset of the elements of the method in FIG. 9 may be practiced in any suitable order and in conjunction with any suitable system, device, and/or process, including the process shown in FIG. 4 and the system shown in FIG. 8. In FIG. 9, method 900 includes collecting data (e.g., asset and/or network data) from different sources (905), filtering the data (910), identifying one or more events and assets associated with such events from the data (915), identifying connections between assets and characteristics thereof from the data (920), and generating (925) and presenting (930) a flow information graph. Method 900 further includes receiving a selection of a component in the flow information graph (935), displaying additional information in response to the selection (940), receiving edits to network traffic rules (945) and applying such rules to the network (950). Method 900 additionally includes collecting updated data (955) and updating the flow information graph with the updated data (960). Method 900 also includes storing data (965), analyzing data (970), generating one or more alerts (975), generating one or more reports (980), and exporting data (985).

Embodiments of the present disclosure may collect data (905) from any number of different sources and/or different types of sources, including data regarding asset, network events, and system operation attributes. Such collected data may include, for example, network flow attributes, information on a user of an asset, information regarding an asset as well as hardware and/or virtual components associated with an asset, information on software applications, attributes of different network nodes, security vulnerabilities, attributes of a network of assets, information on the content of data packets, as well as any other desired information. In one example, a system implementing method 900 may collect network flow data (e.g., information pertaining to message exchanges and attempted message exchanges) between virtual and physical assets in a network from hardware components (such as routers and switches or their virtual analogues) collecting "Netflow" data. Additionally or alternatively, data may be collected from one or more other sources, such as an intrusion detection system (IDS), an intrusion prevention system (IPS), and/or a firewall. Data that is collected may also include security technical control configuration attributes or policies defining allowed and blocked traffic between specific assets, groups of assets, and/or logical zones. In some embodiments, a list of allowed and blocked traffic may be defined for various logical zones, and may be referred to herein as a "zone access control list" (ZACL).

Data may be received or collected (905) in any suitable manner, such as by polling and/or receiving data streams (as in IPFIX streams, system logs, APIs, etc.). Data can be collected from multiple sources, normalized and combined into a list of records for the purpose of associating all "attributes" with network flow data, thus allowing the embodiments of the disclosure to create and present correlations in various methods including graphs as described further herein.

Data collected from different sources may be filtered (910) in a variety of ways. For example, data from different sources may be used to populate a data structure, with data that is redundant to data from another source removed so as to produce a data structure with unique network flow attributes and characteristics collected from the different sources. Vulnerability data received from a scan can be associated (e.g., through the normalization and correlation processes described herein) with a specific network flow, thereby allowing the user of a system to identify relationships between various asset operational states and network connections from or to the asset or a plurality of assets. The collected data may also be filtered according to user preference. For example, user may be interested in a particular network event (such as a security breach) and thus the system implementing method 900 may automatically (or in response to specific user input) filter out data unrelated to a specific breached asset or compromised application service running on one or more assets.

Embodiments of the present application can identify various network traffic events, and network assets related to such events, based on the collected data (910). An event may include, for example, the exchange of data packets between two assets in a network, an attempted or actual security breach, a software update, a failure (e.g., hardware and/or software) associated with an asset, as well as other events. An event may be defined over one or more periods of time, and embodiments of the present disclosure may operate on data received in real-time (or near-real-time) or on data previously recorded and stored. For example, a user of a financial network may wish to review network traffic between four specific network assets recorded over a three-hour period to investigate a possible wire fraud attempt. In this example, a system implementing the present disclosure may retrieve the network data for the defined time period, filter out data unrelated to the four assets or the three-hour window, and automatically identify events and assets associated with the potential fraud.

Embodiments of the present disclosure are likewise able to identify various connections between assets (920), as well as characteristics of such connections and assets. For example, data collected by the system (905) may be used to identify: data regarding one or more assets, data regarding one or more network events, and/or data regarding one or more system operational attributes. The characteristics of assets and/or the connections between assets may be defined or limited based on the filtering of the collected data (910). Characteristics of connections between assets may include, for example, the size of data communicated, times when data is communicated, the source(s) and destination(s) of data, the rate at which data is communicated, and other characteristics.

Figure 10:
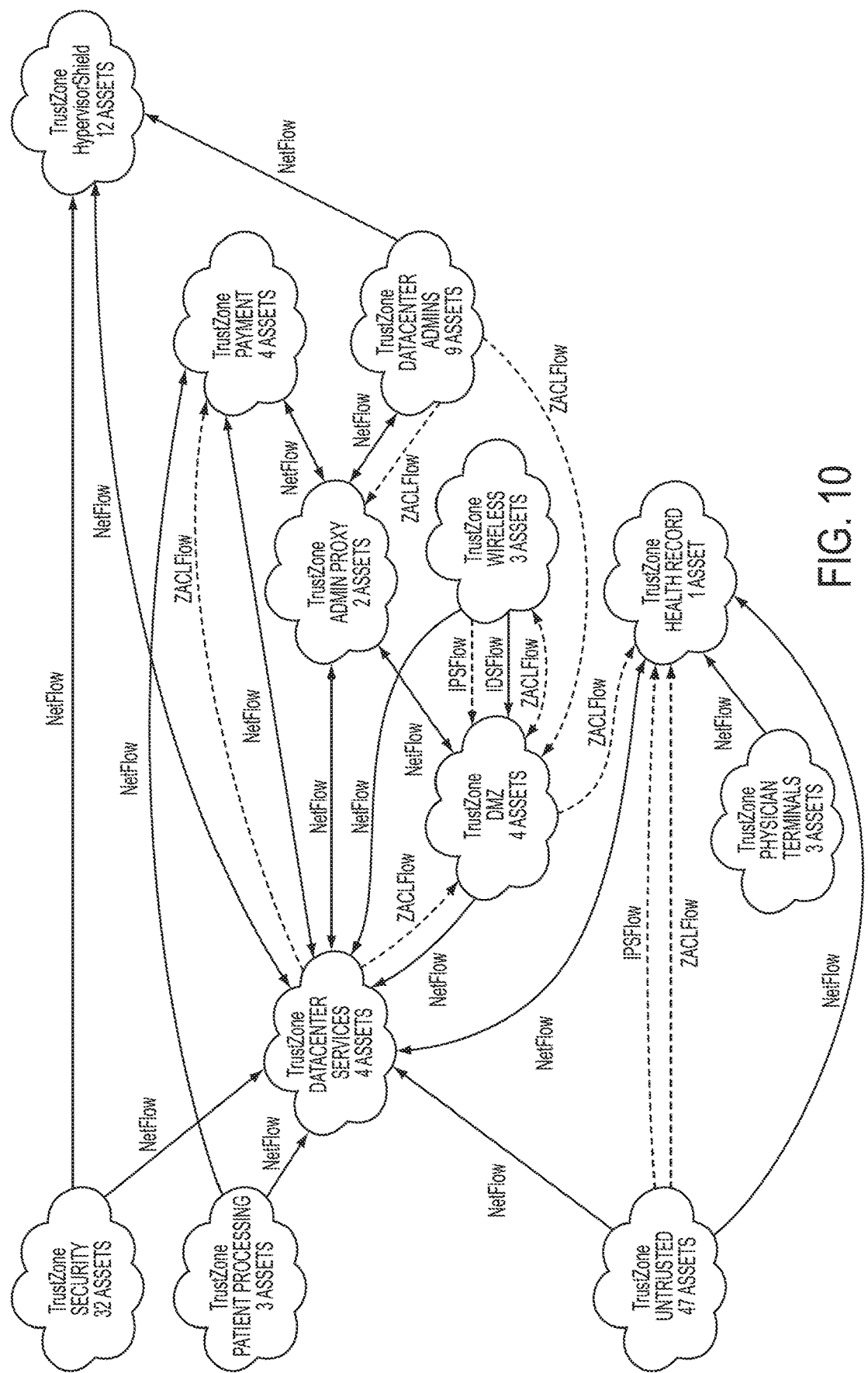
FIG. 10 is an exemplary flow information graph according to various aspects of the present disclosure.

In exemplary method 900, a flow information graph is generated (925) to visually show various network assets and the connections between such assets. The flow information graph is then presented (930) to a user, such as via a user interface display of a client device operated by the user (e.g., client device 820 in FIG. 8). FIG. 10 illustrates an example of a flow information graph. In this example, network traffic between multiple TrustZone assets is shown via selectable directional flow lines. The flow information graph depicts network traffic that is allowed between network assets (i.e., via the solid flow lines) and traffic that is blocked (i.e., via the dashed flow lines). Additionally, each flow line is labeled to indicate the type of the source of the data used to identify the connection (i.e., "Netflow," "IDS Flow," "IPS Flow," "ZACL Allowed," and "ZACL Denied").

A selection of a component (e.g., a network asset or connection between assets) may be received (935) from a user. For example, in a case where the flow information graph is presented on a display screen of client device 820 controlled by a user, the user can select (e.g., using a mouse) a flow line to perform various actions. For example, selection of the flow line may display additional information associated with the connection (940), such as by presenting the user with characteristics (e.g., identified in step 920) of the connection associated with the flow line. Selection of the flow line may also allow the user to view and edit (945) rules for allowing and blocking traffic over the connection. Rules edited in this manner can then be applied to the connection (950).

The flow information graph may be presented in conjunction with network flow information, rules, and other data, in a table format, an example of which is depicted in FIG. 11. Among other things, the table in FIG. 11 allows a user to search and/or filter the data in the table using different fields (such as based on timestamp, source asset name, or other attribute) and to create and edit rules by, for example, double-clicking an entry on the table.

Figure 12:
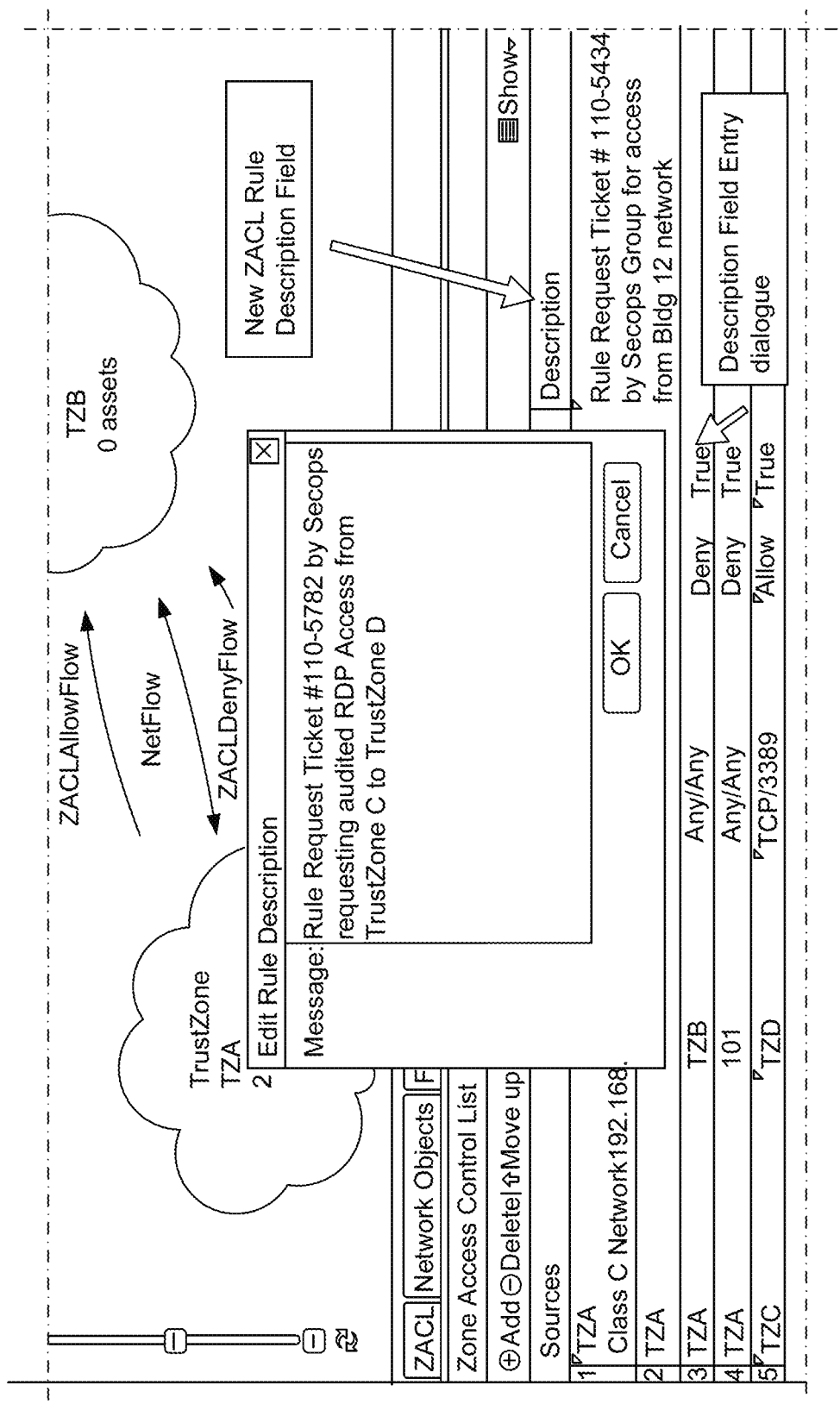
FIGS. 12-24 are screenshots showing examples of interaction with a flow information graph and data table according to various aspects of the present disclosure.

FIG. 12 illustrates an exemplary screenshot showing a ZACL rule description field that may be presented in a data table (such as the data table in FIG. 11) as well as in response to selection of a component in the flow information graph by a user. As shown, the "description field entry dialogue" can be used by a user to edit a rule to be applied to a connection between assets.

Figure 13:
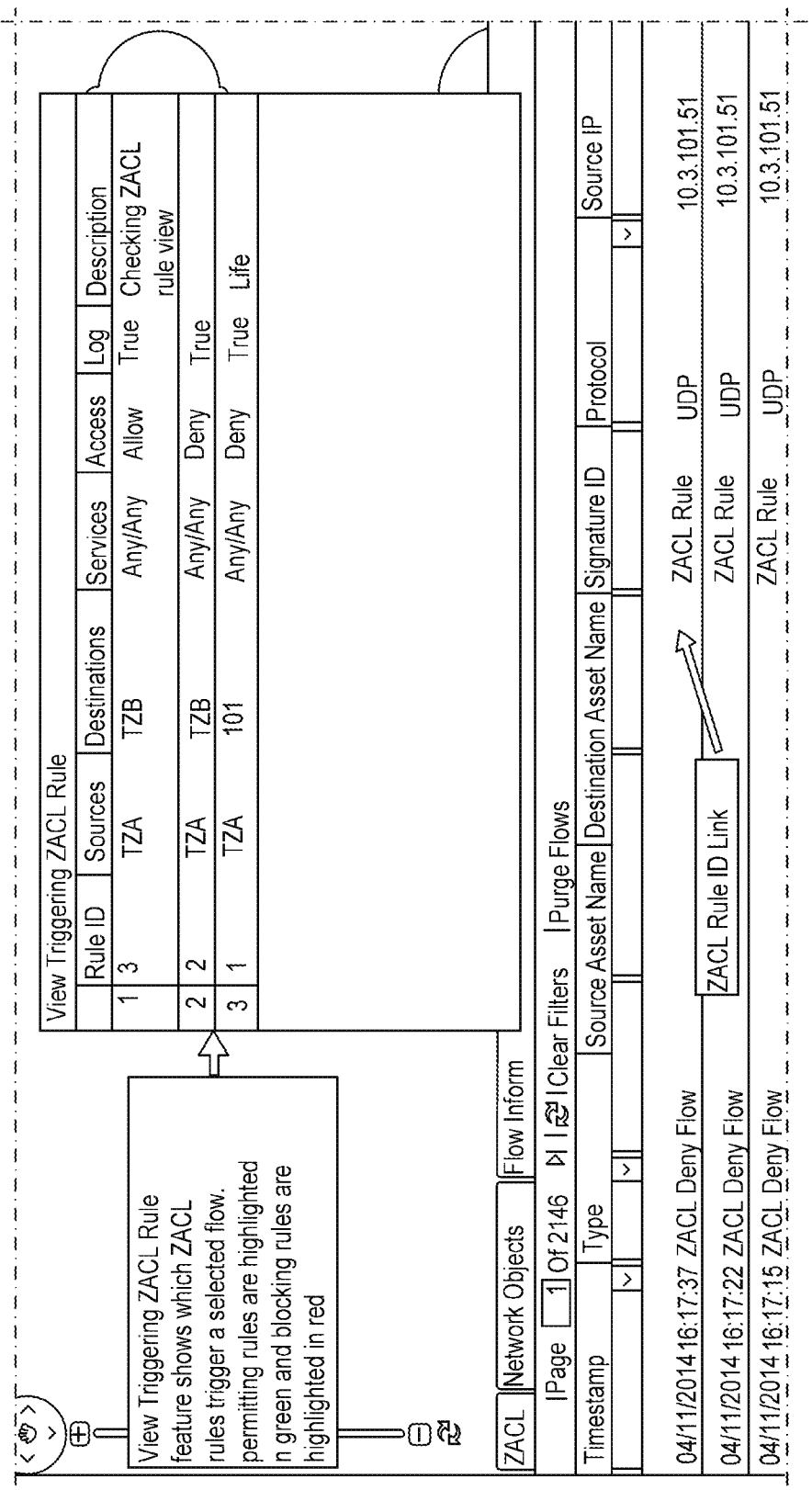

FIG. 13 illustrates another exemplary screenshot showing ZACL rules being triggered. In this example, events where traffic is allowed by a ZACL rule cause the rule to be highlighted in green, while events where traffic is blocked cause the ZACL rule to be highlighted in red. Other visual indicators for showing allowed/blocked traffic may also be used.

Figure 14:
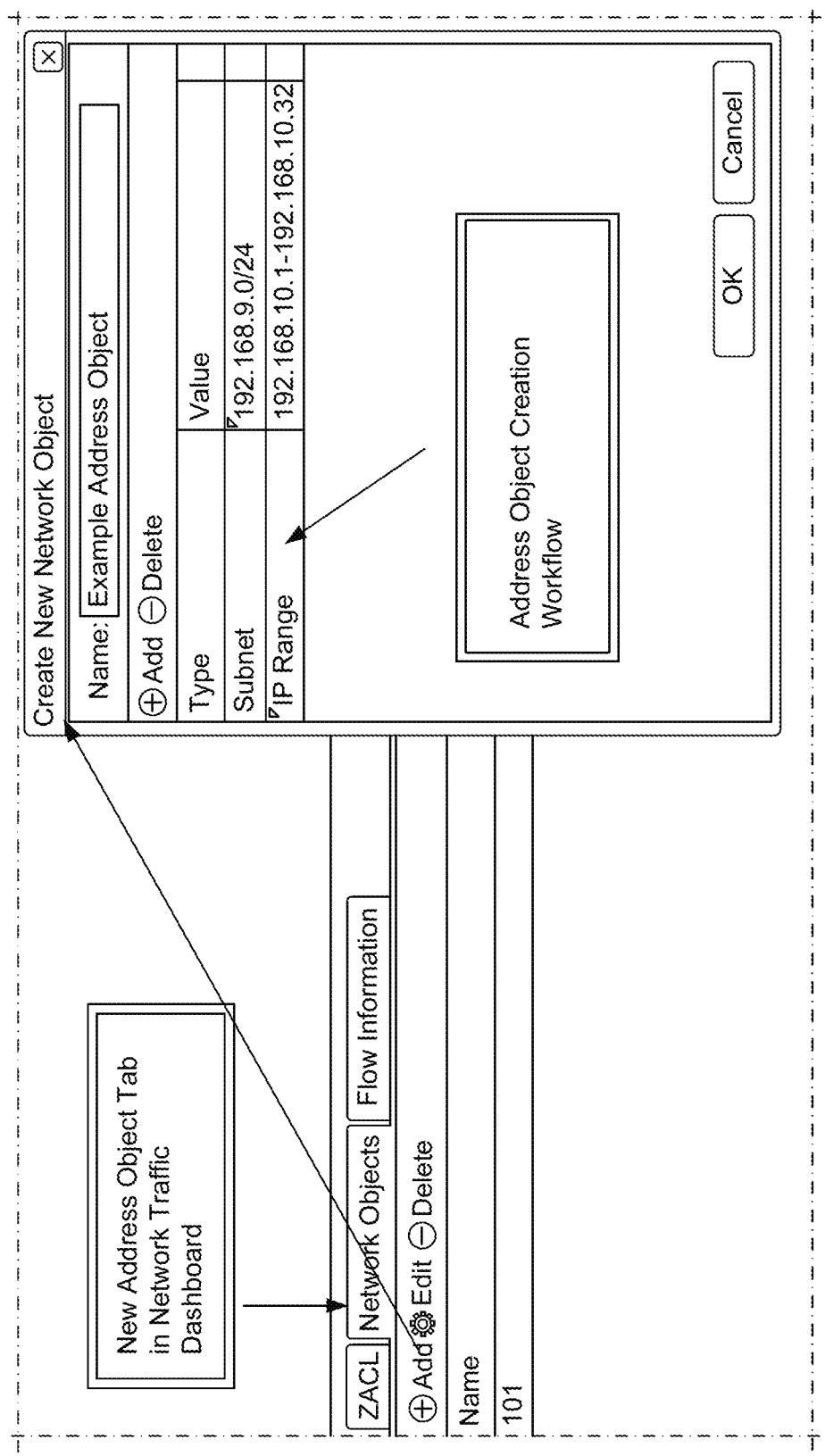
Figure 15:
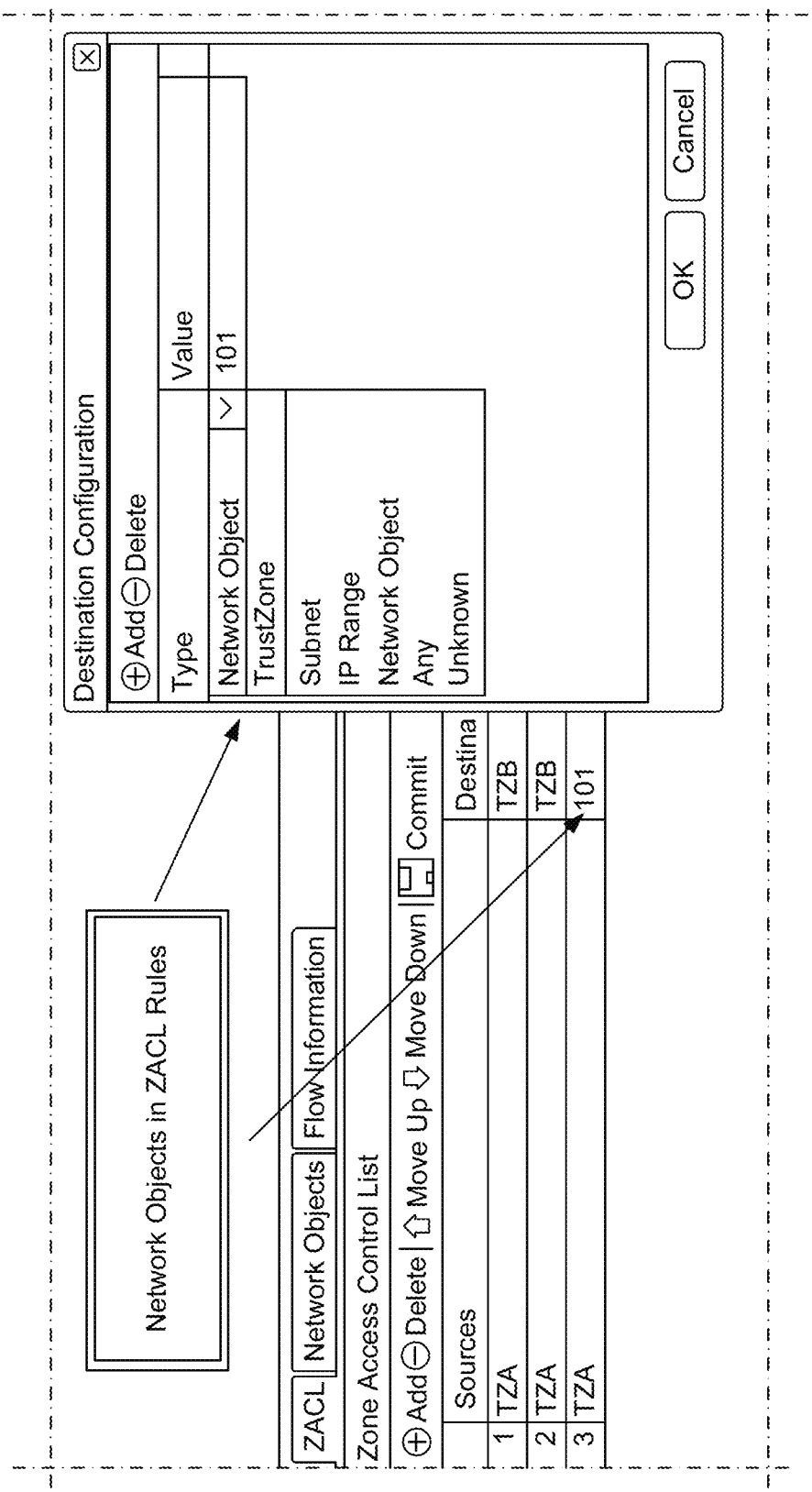
Figure 16:
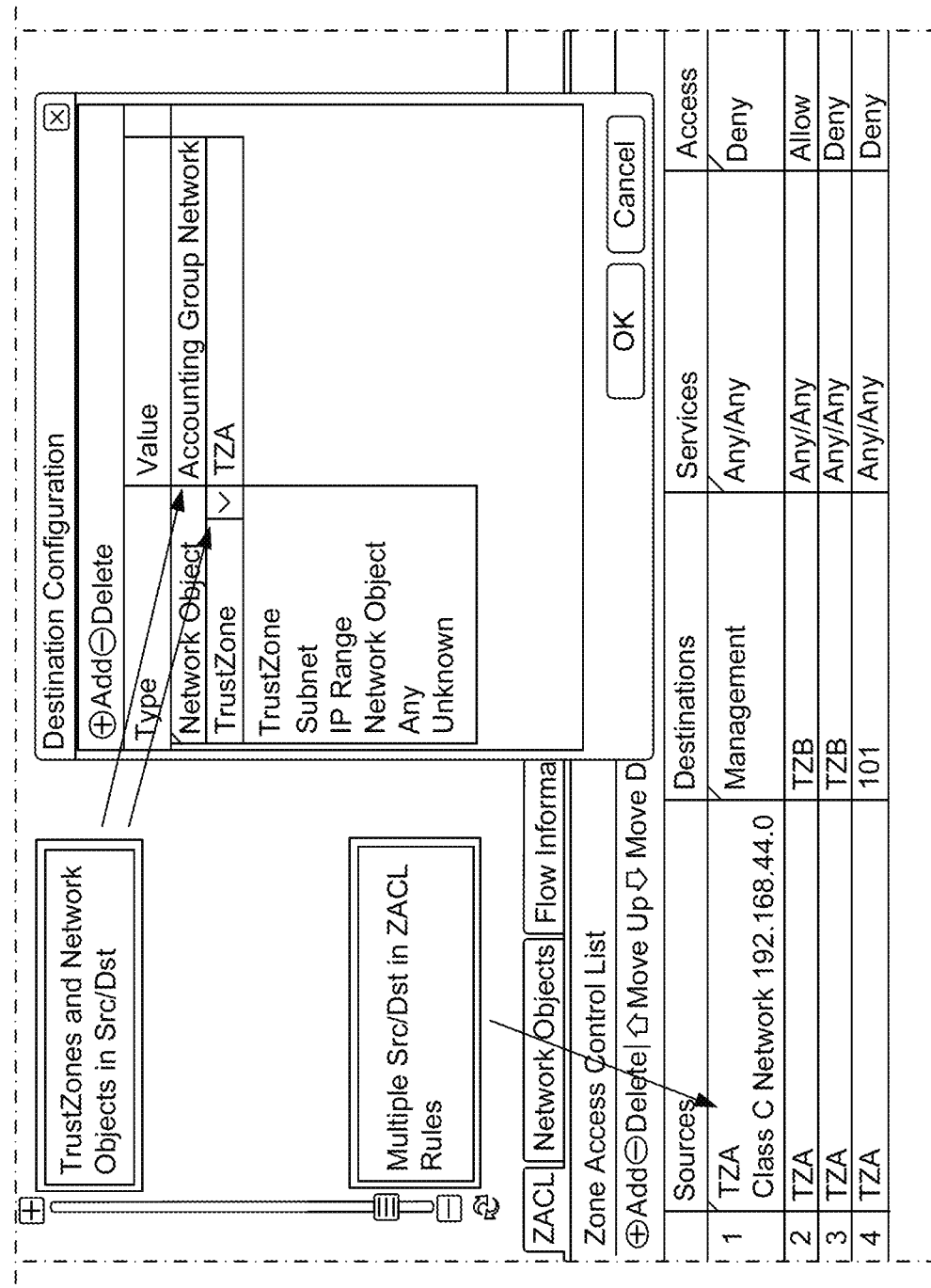

FIGS. 14 and 15 illustrate the creation of network objects (FIG. 14) and the use of network object in ZACL rules (FIG. 15). FIG. 16 illustrates a ZACL rule having multiple sources and destinations.

Figure 17:
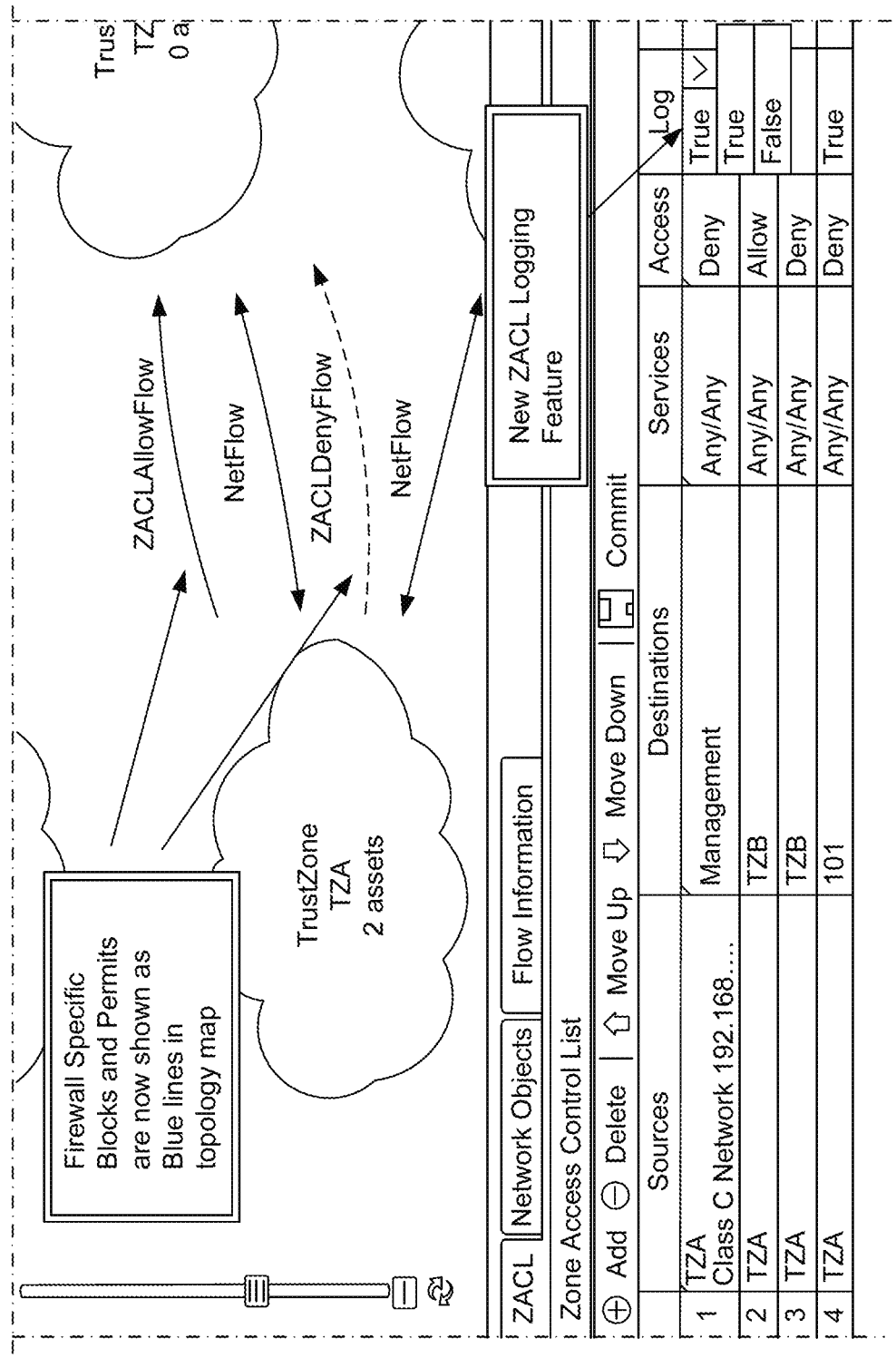

FIG. 17 illustrates blocked and allowed traffic via solid and dashed lines (respectively) on the flow information graph, as well as a pulldown on a data table associated with the flow information graph allowing the user to select "ZACL logging." Selection or de-selection of logging within a ZACL rule allows a user to include or remove (respectively) rule hits from the rule on the flow information graph.

Figure 18:
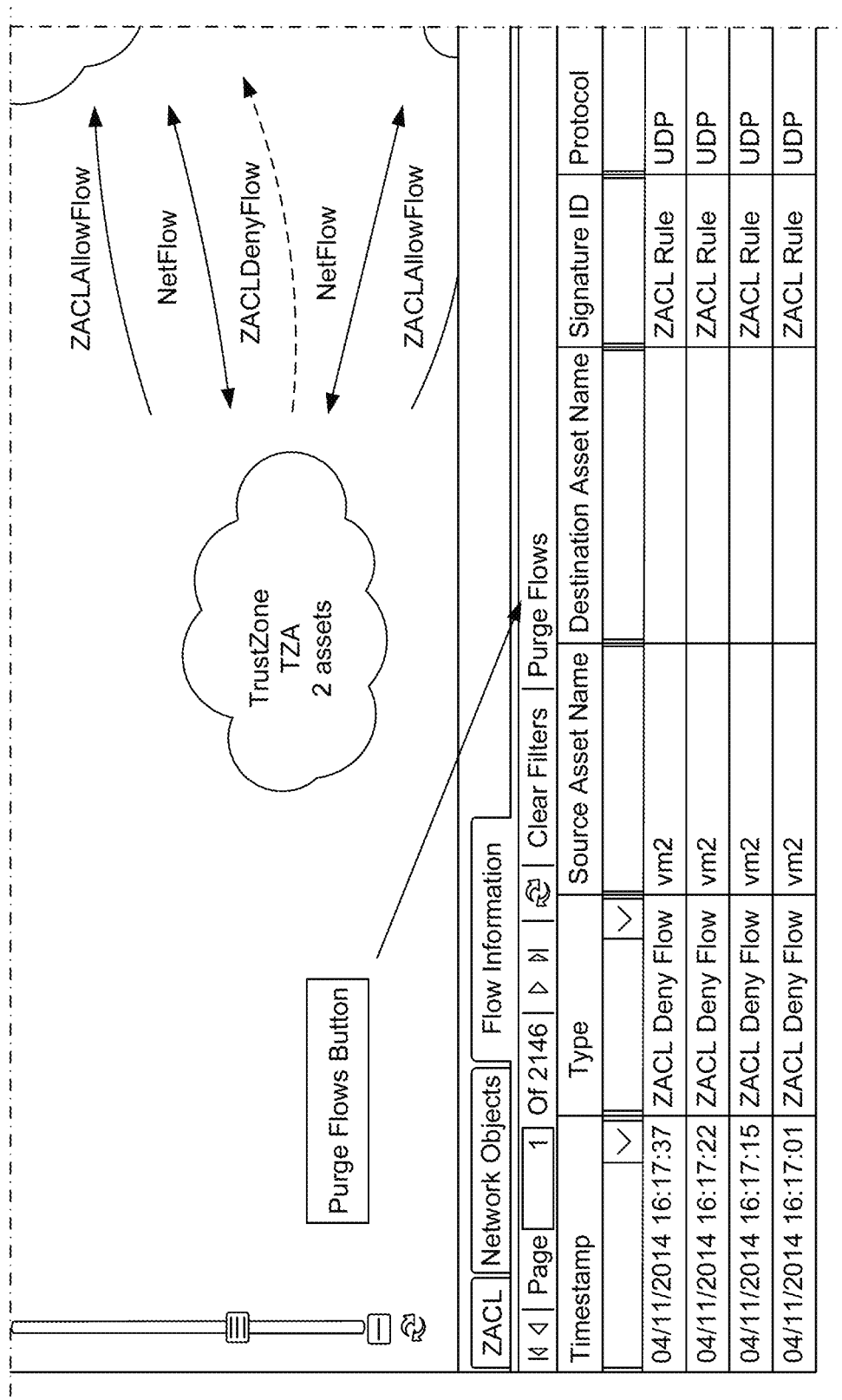

FIG. 18 illustrates a "purge flows" feature of an exemplary embodiment, whereby specific flows may be selected and removed from the flow information graph, thereby allowing a user to focus more precisely on a desired set of connections.

Figure 19:
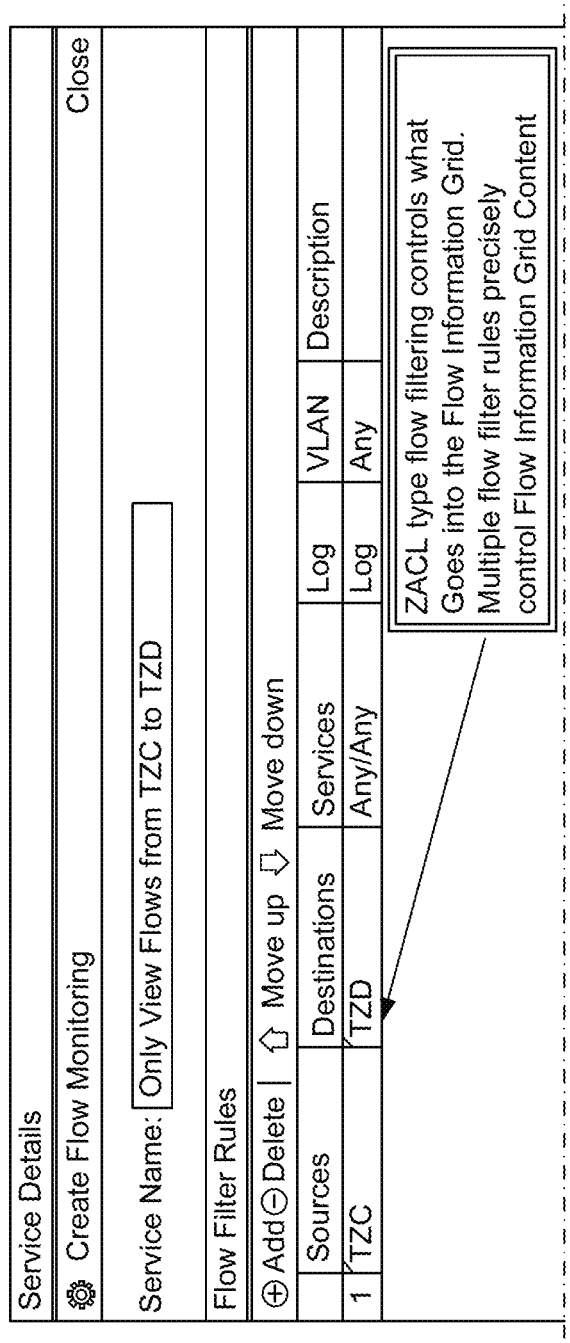

FIG. 19 illustrates the filtering of flows before they are displayed on the flow information graph (FIG. 10) or data table (FIG. 11). This further assists a user in selecting the specific flows of interest to the user.

Figure 20:
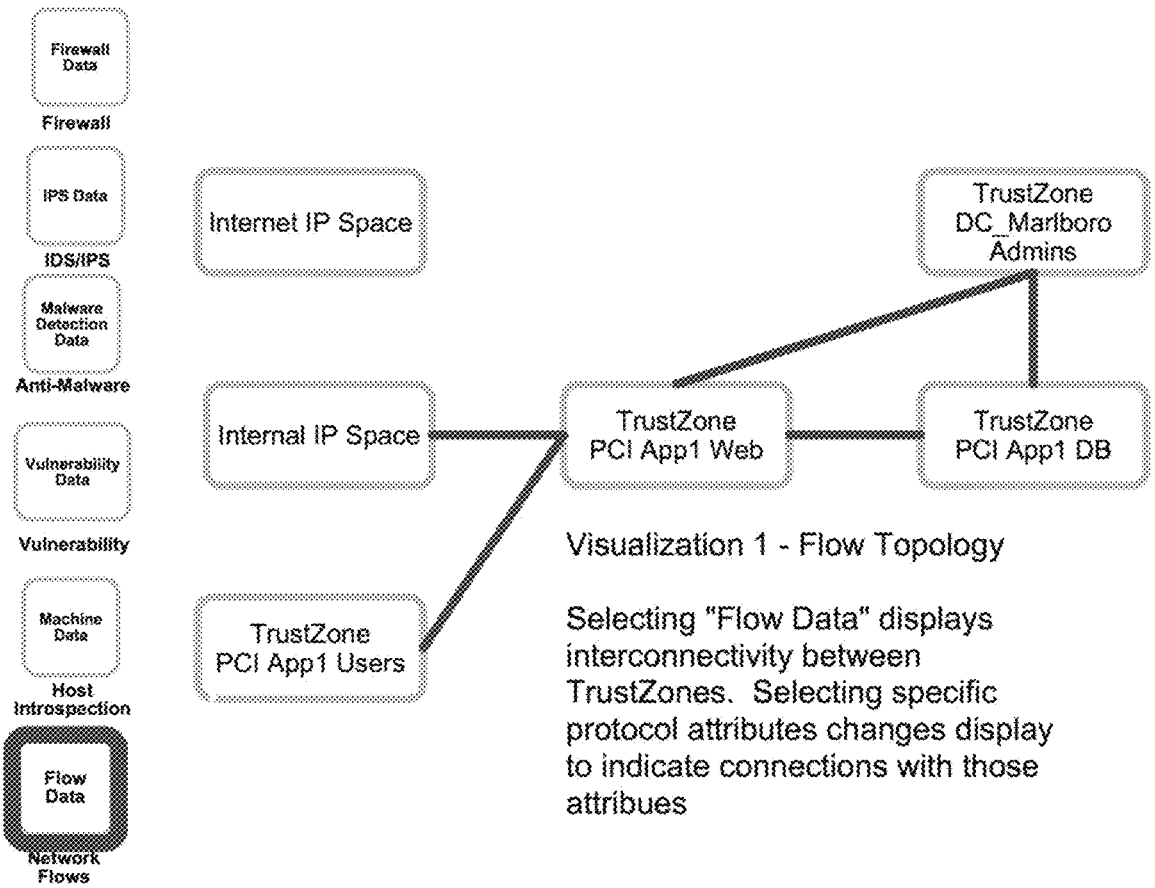
Figure 21:
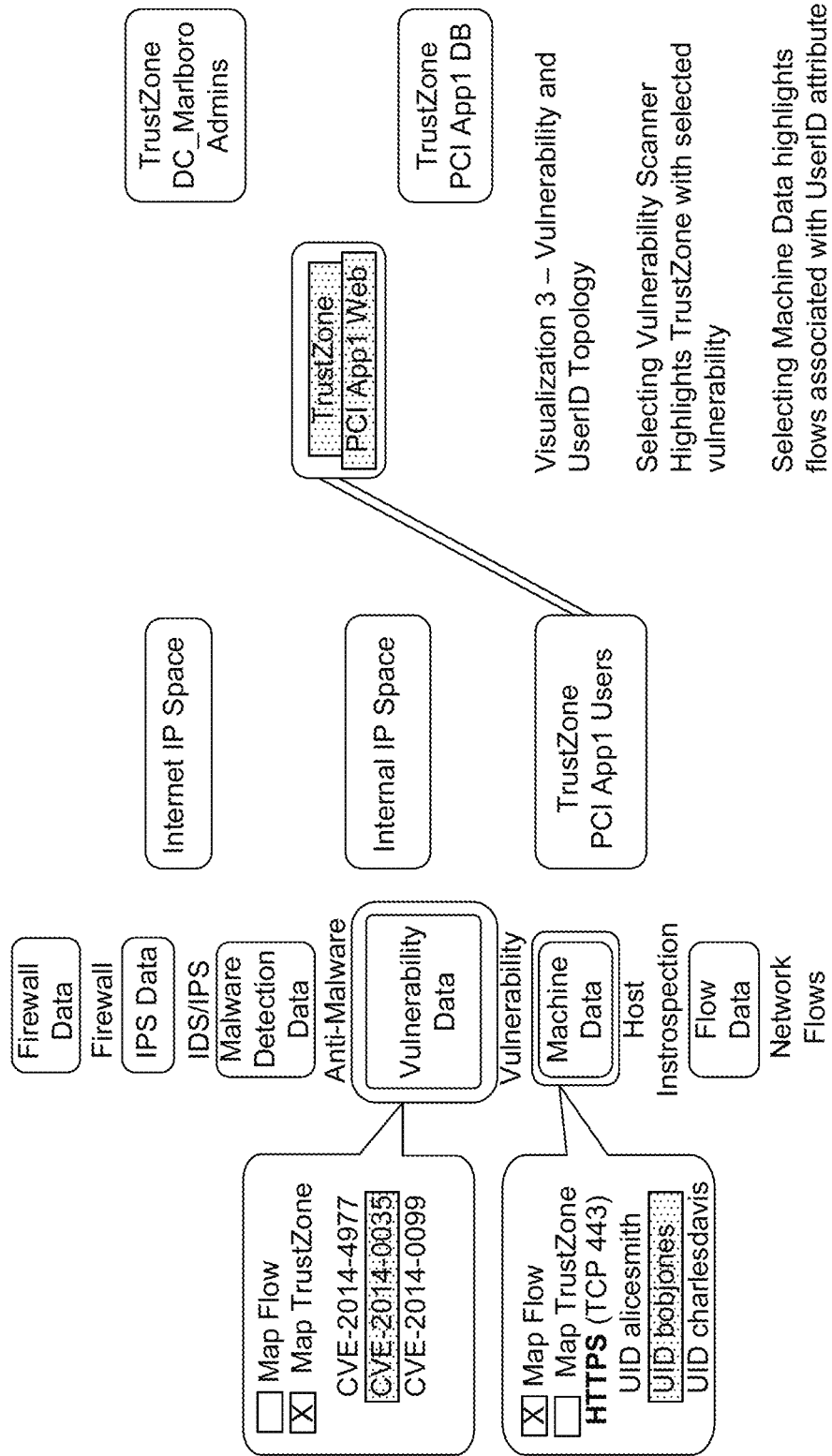
Figure 22:
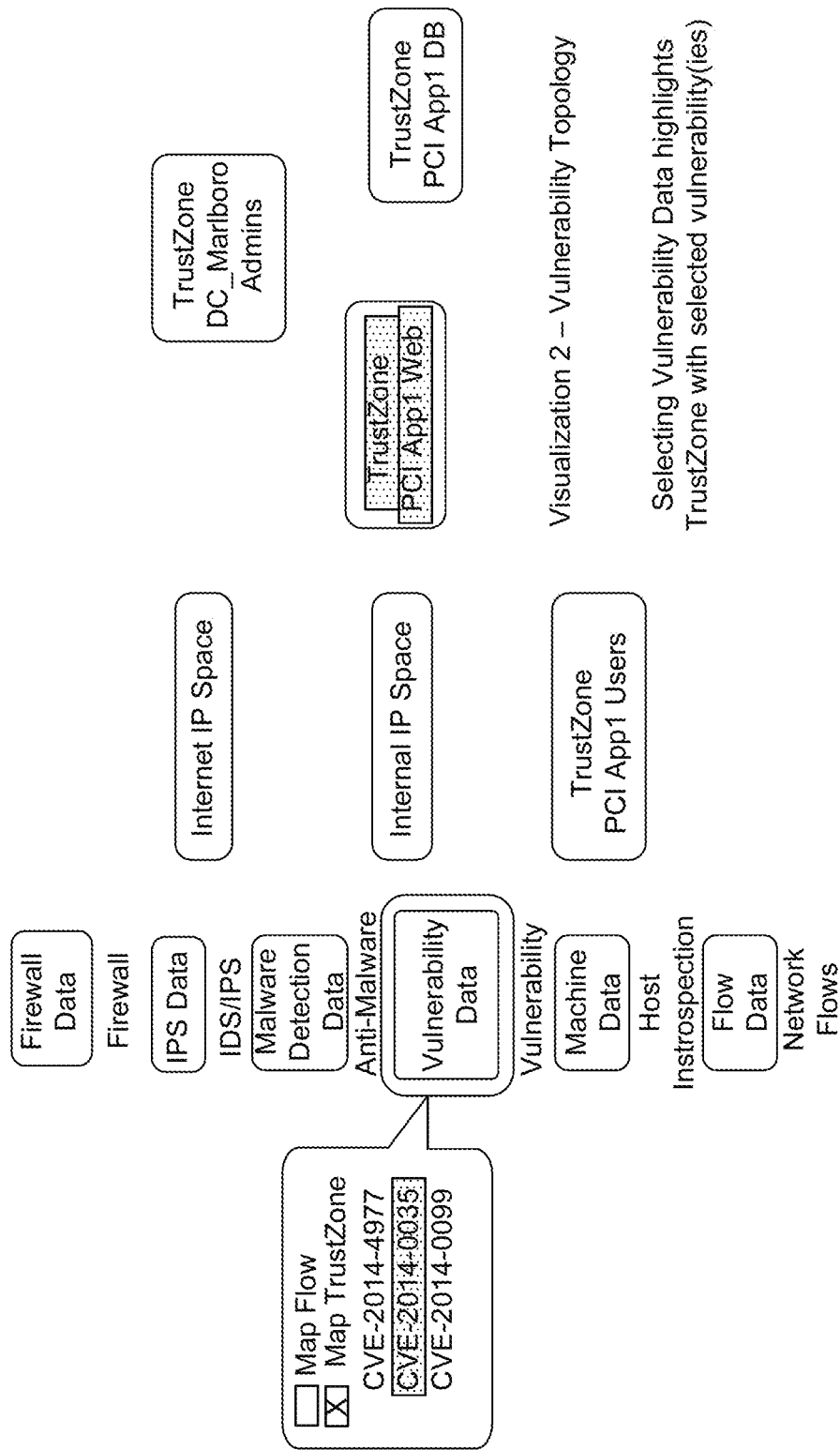

As described above, the flow information graph can depict a variety of different information regarding network assets and network connections between such assets. FIGS. 20-22 illustrate examples of flow information graphs that identify characteristics of connections between network assets and/or characteristics of assets. Identification of such characteristics may occur in response to selection of an attribute or other user input from a user via a user interface and/or based on automatic selection of characteristics by systems implementing the embodiments of the present disclosure.

FIG. 20 illustrates an exemplary flow information graph where a user has selected "flow data" from among a list of attributes in a set of collected data. In this example, the "flow data" icon on the left of the screen is highlighted, and bolded flow lines are drawn between each of the five network assets (i.e., TrustZones in this example) to show their respective connectivity based on the selected "flow data" attributes. In addition to bolding and highlighting, characteristics of assets and network connections may be visually indicated in a flow information graph using various combinations of text, fonts, icons, shading, and the like.

Any number of different attributes may be used to visually depict information regarding network connections and assets in a flow information graph. In FIG. 21, for example, A particular vulnerability from the "vulnerability data" menu on the left of the screen is selected. Here, the system has identified an asset in the flow information graph (i.e., the "TrustZone PCI App1 Web" asset) as being associated with the vulnerability (e.g., having the vulnerability due to out-of-date software) to be highlighted. Additionally, a user identifier ("bobjones") from the "machine data" attribute menu is also selected, and the connection between the "TrustZone PCI App1 Users" asset and the "TrustZone PCI App1 Web" asset is identified by the system as being associated with the selected user identifier and highlighted on the flow information graph accordingly. FIG. 22 depicts the appearance of the flow information graph in response to de-selection of the "machine data" attribute from FIG. 21, leaving only the "TrustZone PCI App1 Web" asset highlighted to correspond to the selected security vulnerability.

Figure 23:
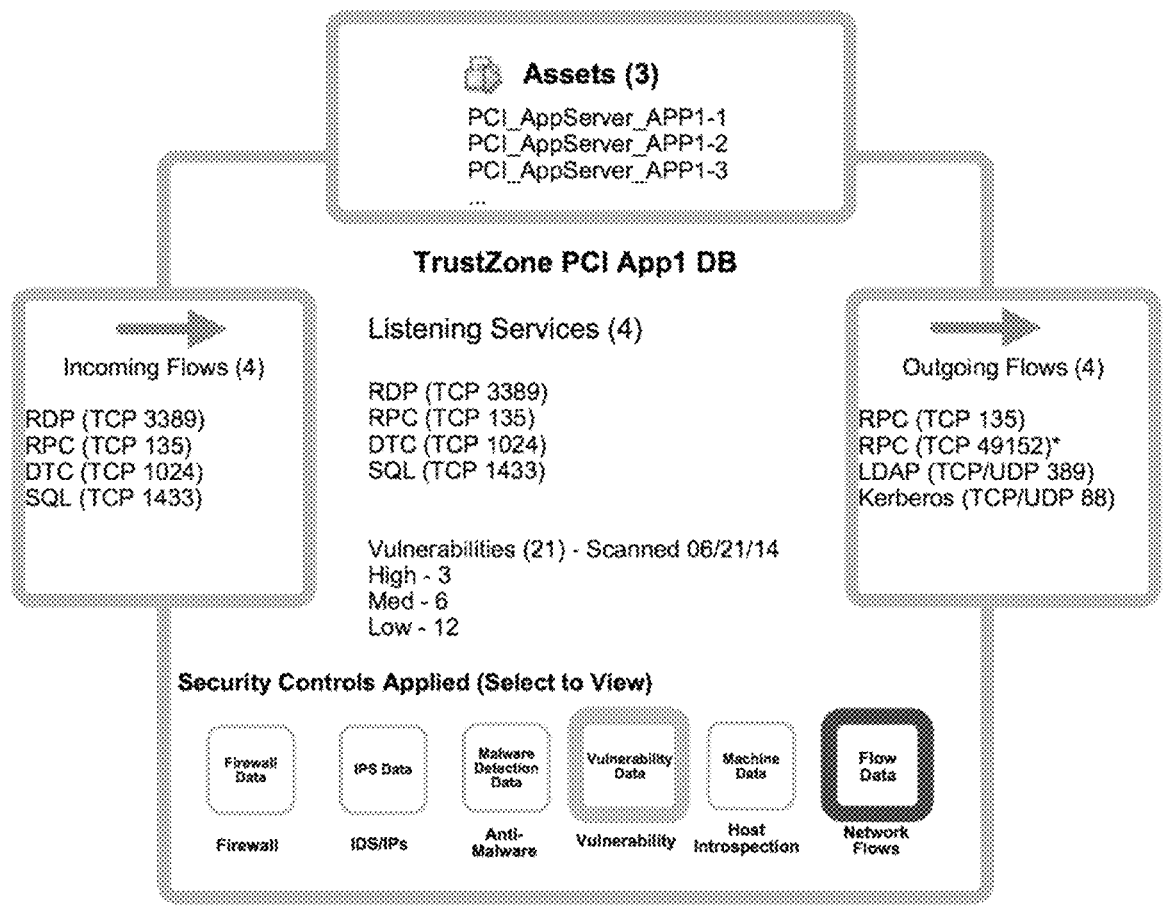
Figure 24:
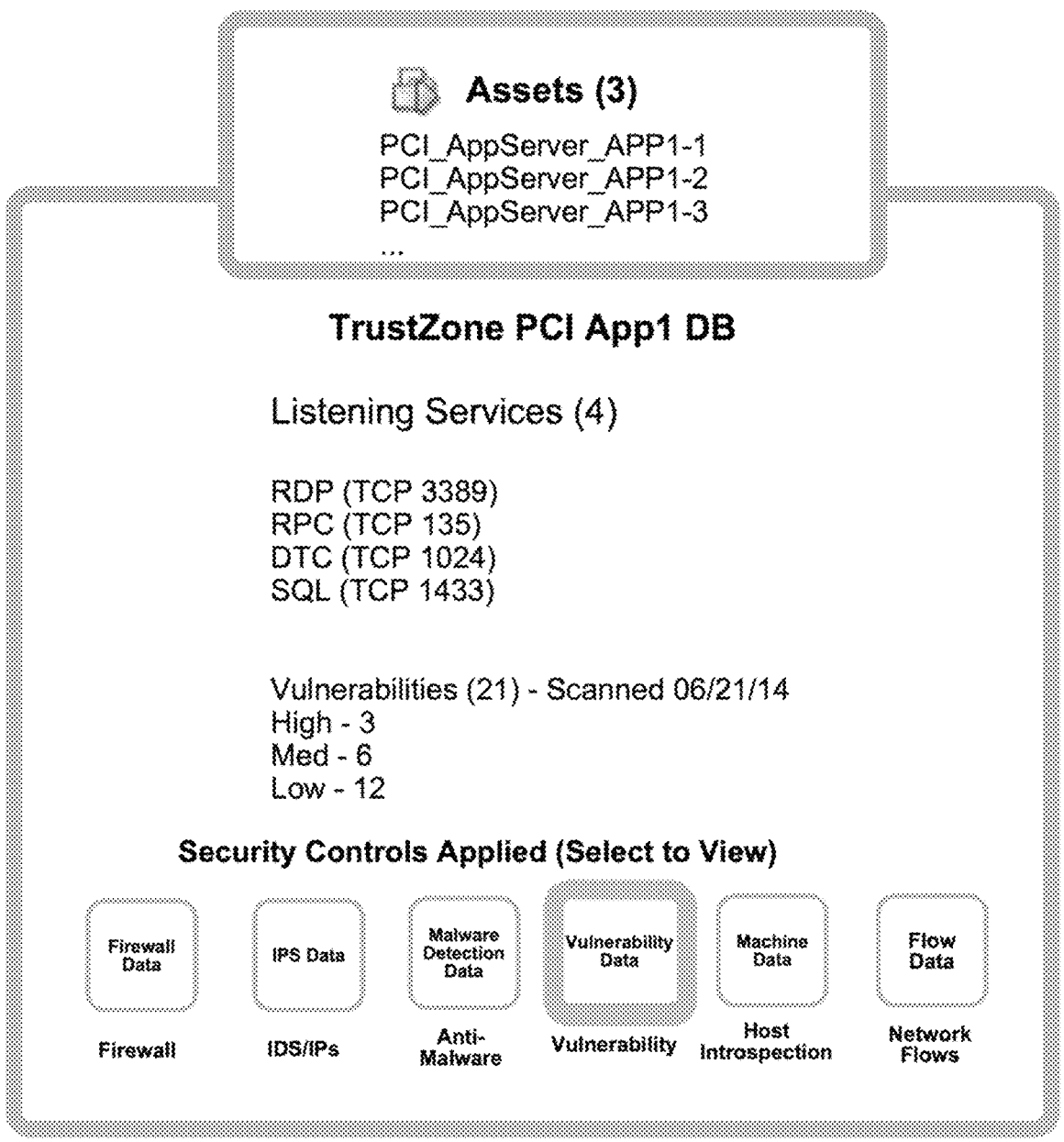

FIGS. 23 and 24 depict additional examples of information that may be depicted by flow information graphs. In FIG. 23, both the "vulnerability data" and "flow data" attributes are selected, as shown by their respective highlighting. At the top of the graph, information on three assets in the network is displayed, while the graph shows network data associated with the assets in the form of "incoming" flow data on the left of the graph and "outgoing" flow data on the right of the graph. System operational attributes are additionally shown in the middle of the graph. FIG. 24 illustrates the flow information graph of FIG. 23 without the "flow data" attribute being selected.

Updated data may be collected (955) on a periodic or real-time/near-real-time basis. The flow information graph displayed to a user may likewise be updated (960) and presented to show changes to assets and/or connections on a periodic or real-time/near-real-time basis.

Embodiments of the application may store (965) and analyze (970) the collected data, data related to the generation and/or presentation of the flow information graph, and other information. For example, the system implementing method 900 may store data collected and used to generate a flow information graph, as well as a snapshot of a particular flow information graph at a particular point of time or during a particular time period, thus enabling a user to retrieve a desired graph without having to re-create it from scratch. Any desired data may be analyzed for a variety of purposes. For example, the collected data may be analyzed (e.g., comparing it to a security policy, standards compliance policy, and/or a performance standard) and generating one or more alerts (975) based on the analysis.

Various reports may also be generated (980) and presented to users of the system and/or third parties. A report may be included in an electronic document, and may provide a summary of state, status, and/or history of some aspect of a network, TrustZones, and/or individual assets. In one exemplary embodiment, a report may be created that details the compliance state of all the assets in a TrustZone at the time the report is run. In another example, a report may be created to detail the detected vulnerabilities of all assets in a TrustZone or a particular asset. Reports may also be generated to provide a summary of information at a particular point in time (e.g., a "snapshot") or a summary of information over a period of time (e.g., showing trends in data) for TrustZones and/or assets. Exemplary embodiments may also generate a report that details the Zone Access Control List (ZACL), and all assets with their asset IP address(es) and TrustZone membership.

Method 900 further includes exporting information (985) to a third party. Any such information may be exported, such as the collected data, the flow information graph, and other information, thereby allowing the third party to perform its own analysis and processing of such data. Data may be exported to a third party in any desired manner, such as via an application program interface (API), through a real-time or near-real-time data stream, or via any other desired interface.

Creating and Modifying Access Control Lists

As discussed previously, embodiments of the present disclosure may be used to depict a wide variety of information regarding network assets and network connections between such assets. As also discussed, such information may be provided to users in a variety of ways, such as via the flow information graph described above. Various embodiments may also be adapted to present information on services hosted and used by various assets on a network, and to allow users to control access to such services. In particular, embodiments of the disclosure may be used to present one or more services hosted by a network asset, and control access to such services by other network assets based on user input.

Figure 25:
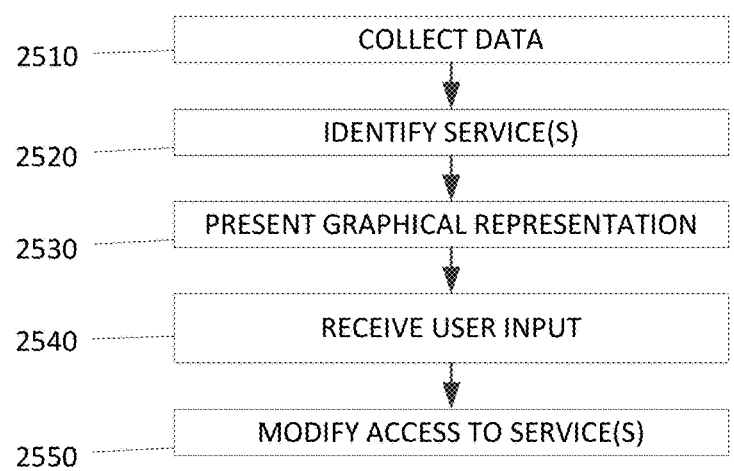
FIG. 25 depicts an exemplary method according to various aspects of the present disclosure.

FIG. 25 depicts an exemplary method 2500 according to various aspects of the present disclosure. As with the other processes described herein, the steps of process 2500 may be performed in whole, in part, in any suitable order, and in conjunction with any other methods and systems. For example, some or all of the steps in method 2500 may be performed by a computer system in communication with a network, such as by the host computing system 810, shown connected to network 830 in FIG. 8.

In this example, method 2500 includes collecting data from one or more sources on a network (2510), identifying one or more services based on the collected data (2520), presenting a graphical representation that includes a representation of the one or more identified services (2530), receiving user input (2540), and modifying access to the one or more services (2550) based on the user input.

Any amount and type of data may be collected (2510) from any desired source and in any manner, as described, for example, in conjunction with step (905) shown in FIG. 9 above, including network data and asset data. The collected data may include, for example, characteristics of one or more host network assets (which may also be referred to herein as "hosts" or "host assets") and one or more services provided by such host assets, as well as characteristics of one or more client network assets (which may also be referred to herein as "clients" or "client assets") who use (or simply have access to) the service(s) provided by a host asset. Host assets and client assets may also be referred to herein as "trustzones," and trustzones may be referred to specifically as "incoming trustzones" (e.g., for client assets) or "outgoing trustzones" (e.g., for host assets) based upon the direction of network connections between trustzones. Additionally, trustzones may represent a collection of assets, and host assets may operate as client assets and vice versa.

Based on the collected data, one or more services provided by a host asset are identified (2520). As referred to herein, a "service" provided by a host network asset may include any functionality provided by a software application, hardware system, or combination of the two. A service may also include any network based computer communications and/or protocol. Services that may be provided by host assets may include, for example, a remote desktop protocol (RDP) service to provide a graphical interface to connect one computer system to another, a remote procedure call (RPC) service to provide functionality performed by a host process to a client process, a distributed transaction coordinator (DTC) service for coordinating transactions across multiple resource managers, and/or a structured query language (SQL) service for providing access to a database. A service may refer to any host or application communication occurring at any layer of the OSI Model or other network protocol model including IP, TCP, FTP, SMTP, HTTP, and others. A service may also include any protocols or services referred to in the art as a service, including services commonly depicted in ports lists and Services File (e.g., "/etc/services").

Services may be identified in any desired manner. In some cases, for example, services may broadcast their availability over the network. In other cases, embodiments of the present disclosure may query a particular host network asset for information on the services provided by the host asset. For example, services may be identified based on the observation and decomposition of network traffic for the purpose of extracting service related data from aggregated collected network traffic, packet sniffing, NetFlow (IPFix) collectors, routers, switches, and network taps, and other sources.

Method 2500 further includes presenting a graphical representation (2530) that includes a representation of the identified services. As used herein, a "graphical representation" may include any visual display of information, such as information related to host assets, client assets, and services hosted by the host assets. The graphical representation may be displayed in conjunction with any other information such as, for example, displaying the identified services for a host asset in conjunction with the flow information graph discussed above.

For example, as shown in FIG. 10, the client network assets and host network assets may be displayed, along with attributes of the various assets (as shown within the respective "cloud" icons) as part of the flow information graph. The presentation of such attributes may include, for example, identifying one or more security vulnerabilities associated with the host network asset and/or the client network asset, and visually indicating the identified security vulnerability in the flow information graph (e.g., within each respective "cloud" icon for the respective asset). An example of such security vulnerability information is shown in the representation of the collection of host network assets 2650 in FIG. 26 showing collective vulnerabilities, which indicates nine security vulnerabilities associated with these assets, as described in more detail below.

Additionally, the connections between the host assets and client assets may, as shown in FIG. 10, be depicted via selectable directional flow lines. Selection of the directional flow lines (and/or selection of the respective assets) may present a list of services that are permitted to be accessed between a host network asset and a client network asset, as well as a list of services that are not permitted to be accessed between a host network asset and a client network asset. Selection of the directional flow lines flow (and/or selection of the respective assets) may also display attributes of the connections between the assets. As described above, such attributes may include, for example, the size of data communicated, times when data is communicated, the source(s) and destination(s) of data, the rate at which data is communicated, detected vulnerable service communications, detected attack signatures, and other attributes. The flow information graph may also display the network data and/or system operational attribute(s) associated with the client network asset(s) and/or host network asset(s).

The graphical representation may also be presented separately from the flow information graph. The graphical representation may include any desired user interface features (e.g., tables, charts, graphs, scroll bars, layered windows, tabbed windows, menus, etc.) and may be displayed in any suitable manner, such as on a display screen of a computing device. Among other things, embodiments of the present disclosure allow users to interactively view services hosted by various host network assets and used by various client network assets, and to control access to such services via the graphical representation. Embodiments of the present disclosure may be adapted to display information related to, and modify access for, any number of host assets, client assets, and services.

Figure 26:
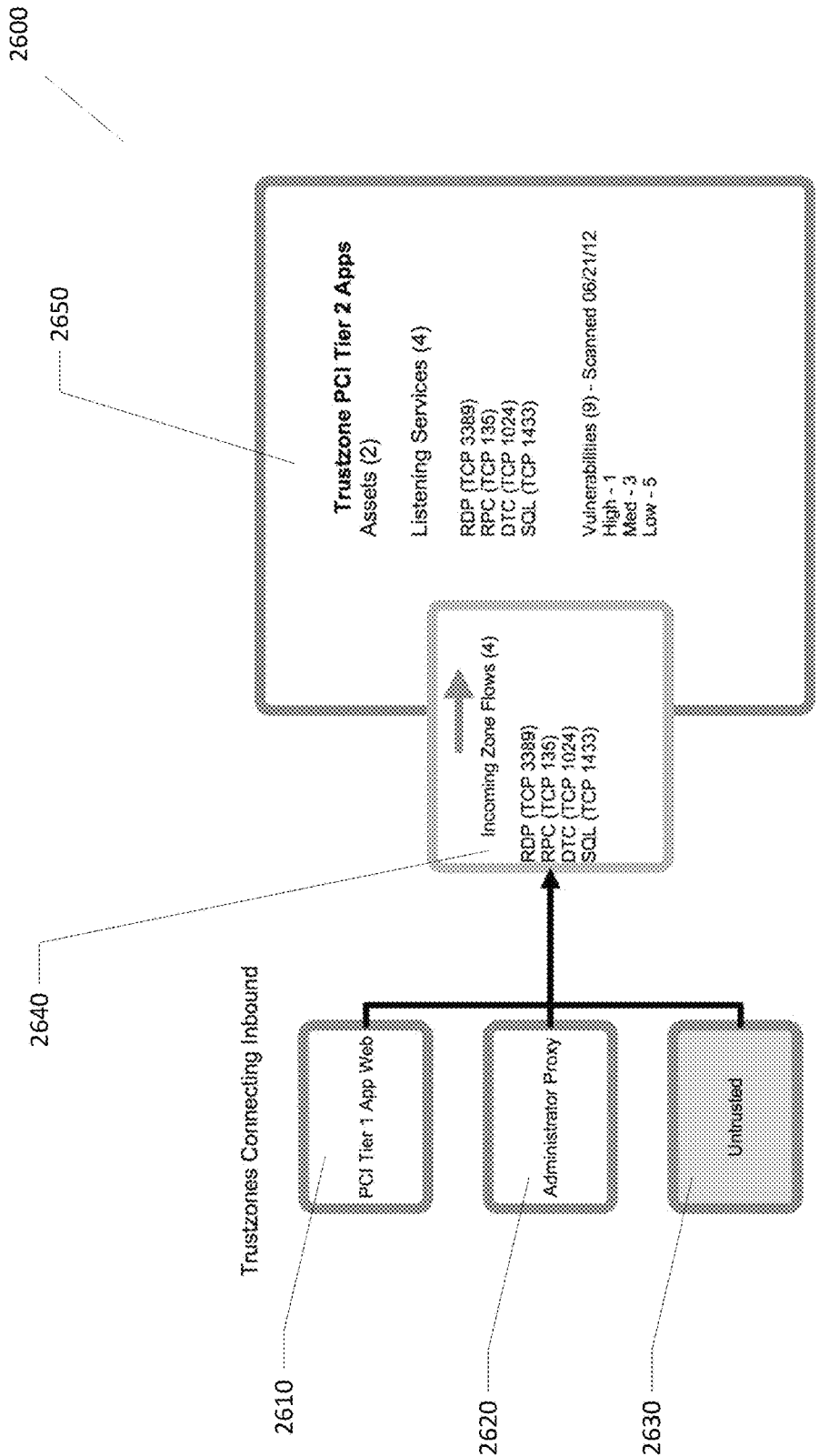
FIGS. 26-33 are screenshots showing exemplary graphical representations according to various aspects of the present disclosure.

FIG. 26 is an exemplary graphical representation 2600 depicting representations of three collections of client assets 2610, 2620, and 2630 who have access to a set of services 2640 provided by host asset collection 2650. As described herein, each collection of assets may include one or more assets, and each collection may be referred to as a single asset itself. In this example, the representations of each of the client asset collections 2610, 2620, and 2630 are displayed in conjunction with identification information associated with each respective client asset. For example, client asset collection 2610 is described as "PCI Tier 1 App Web," client asset collection 2620 is described as "Administrator Proxy," and client asset collection 2630 is described as an "Untrusted" asset. Any other desired information may be displayed in conjunction with the client assets as well.

The representation of the set of services 2640 provided by the collection of host assets 2650 may likewise be displayed in conjunction with any desired information. In FIG. 26, for example, the set of services 2640, detected by the collection and observation of network traffic, includes four services: a remote desktop protocol (RDP) service, a remote procedure call (RPC) service, a distributed transaction coordinator (DTC) service, and a structured query language (SQL) service. Next to each service is an indicator of the transport protocol used by the service, transmission control protocol (TCP) in each case here, along with a port associated with each service.

Similarly, the representation of the collection of host network assets 2650 may be displayed in conjunction with any desired information, such as the number of host assets currently providing services, detected through network port and vulnerability scanning (indicated by the "Assets (2)" notation), the number of distinct services provided by the host assets ("Listening Services (4)"), and the list of services as determined by network observation and related information shown in representation 2640. Additionally, the representation of the host network asset 2650 includes information on a number of security vulnerabilities (nine total in this example) along with a date the host asset was last scanned for security issues and a breakdown of the severity of the security issues (i.e., one high-risk vulnerability, three medium-risk vulnerabilities, and five low-risk vulnerabilities).

Figure 27:
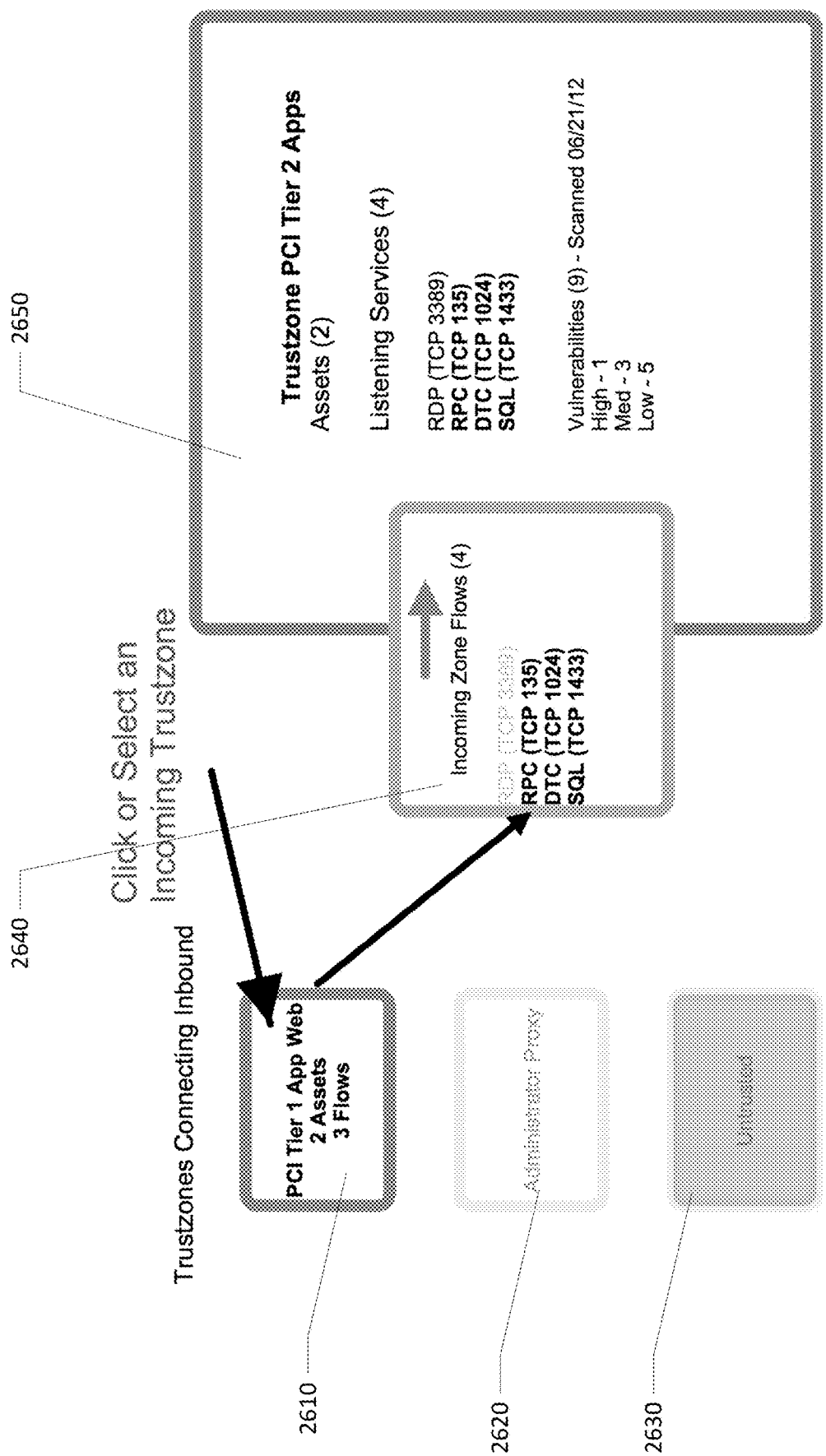

Referring again to FIG. 25, embodiments of the present disclosure may receive any type of user input (2540). As shown in FIG. 27, for example, a user may select one of the client assets (asset 2610 in this example) to display additional information about asset 2610. In the example shown in FIG. 27, the representation displays the number of assets within the client asset collection 2610 (two in this case) that have been detected as making connections to the assets in host collection 2650, as well as the number of services (or "flows") used by the asset 2610, though any other information may also be displayed, such as a quantitative summary of detected flows as depicted in FIG. 27. Selection of asset collection 2610 also results in the representation of asset collection 2610 being highlighted in comparison to asset collections 2620 and 2630, as shown. Likewise, selection of asset 2620 in FIG. 28 results in the representation of asset 2620 being highlighted and displaying the number of assets within asset collection 2620 that are is connecting to asset collection 2650 (one) and the number of services ("flows") used by asset 2620 (one) in making these connections. As shown in both FIGS. 27 and 28, the respective services (or "flows") used by a selected asset may also be highlighted in comparison to services not used by the selected asset.

Figure 29:
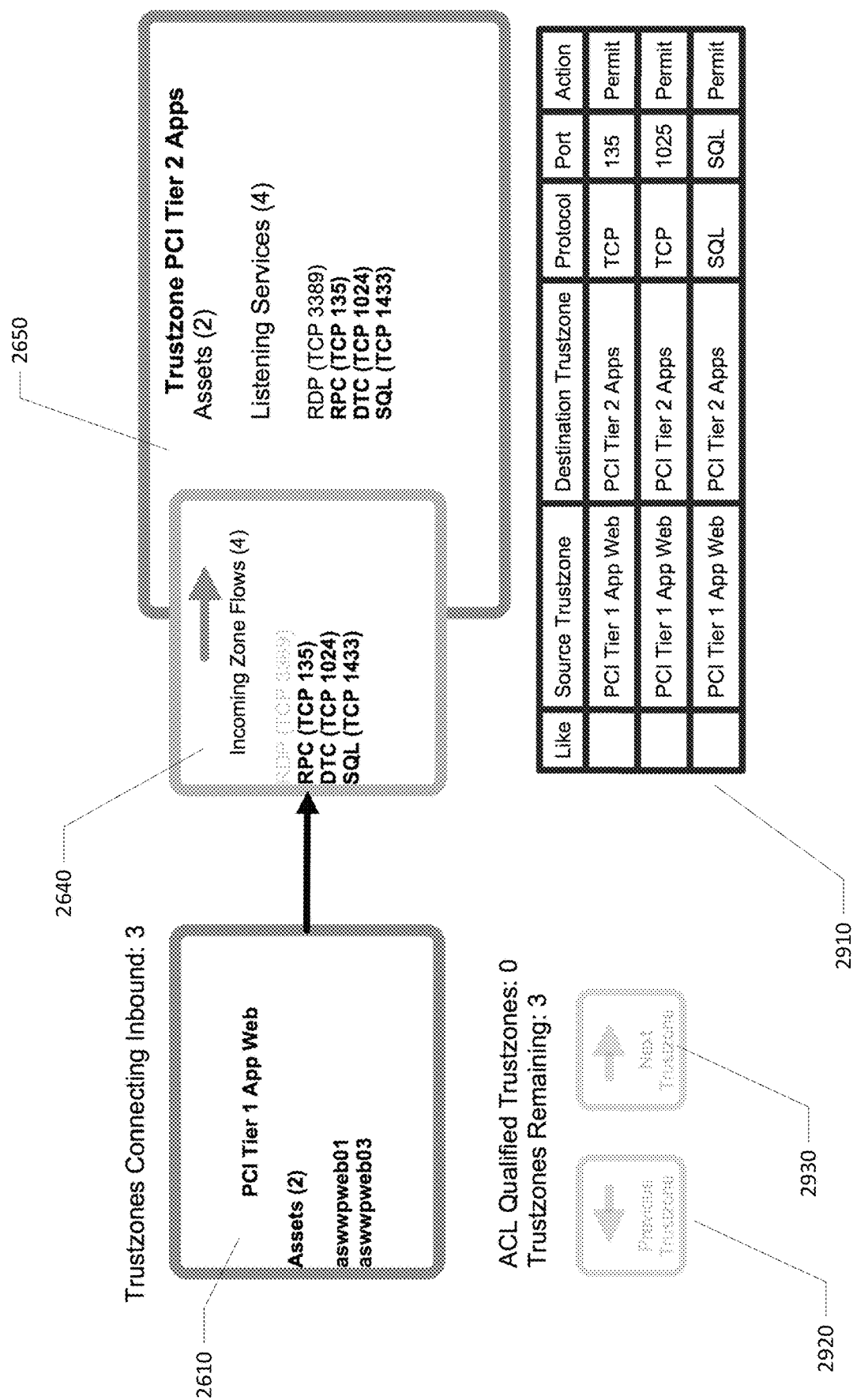

Input from the user (2540) may also include the selection of one or more services and a selection permitting or rejecting access to a selected service by a client network asset. FIGS. 29 through 33 illustrate graphical representations (a workflow) displayed to a user as the user qualifies (i.e., permits or restricts) access to the services hosted by host asset 2650. FIG. 29, for example, depicts representations of client asset 2610, services 2640, and host asset 2650, along with a table 2910 showing that the three services currently used by client asset 2610 (shown in bold in the services list in 2640) are currently selected for qualification through invocation of the workflow. The list of services 2640 indicates the services that have been previously used by client asset 2610 in bold, and the service that has not previously been used by client asset 2610 is grayed out. Navigations buttons 2920 and 2930 allow the user to switch from viewing the services used by client asset 2610 to another asset (or "trustzone").

Figure 28:
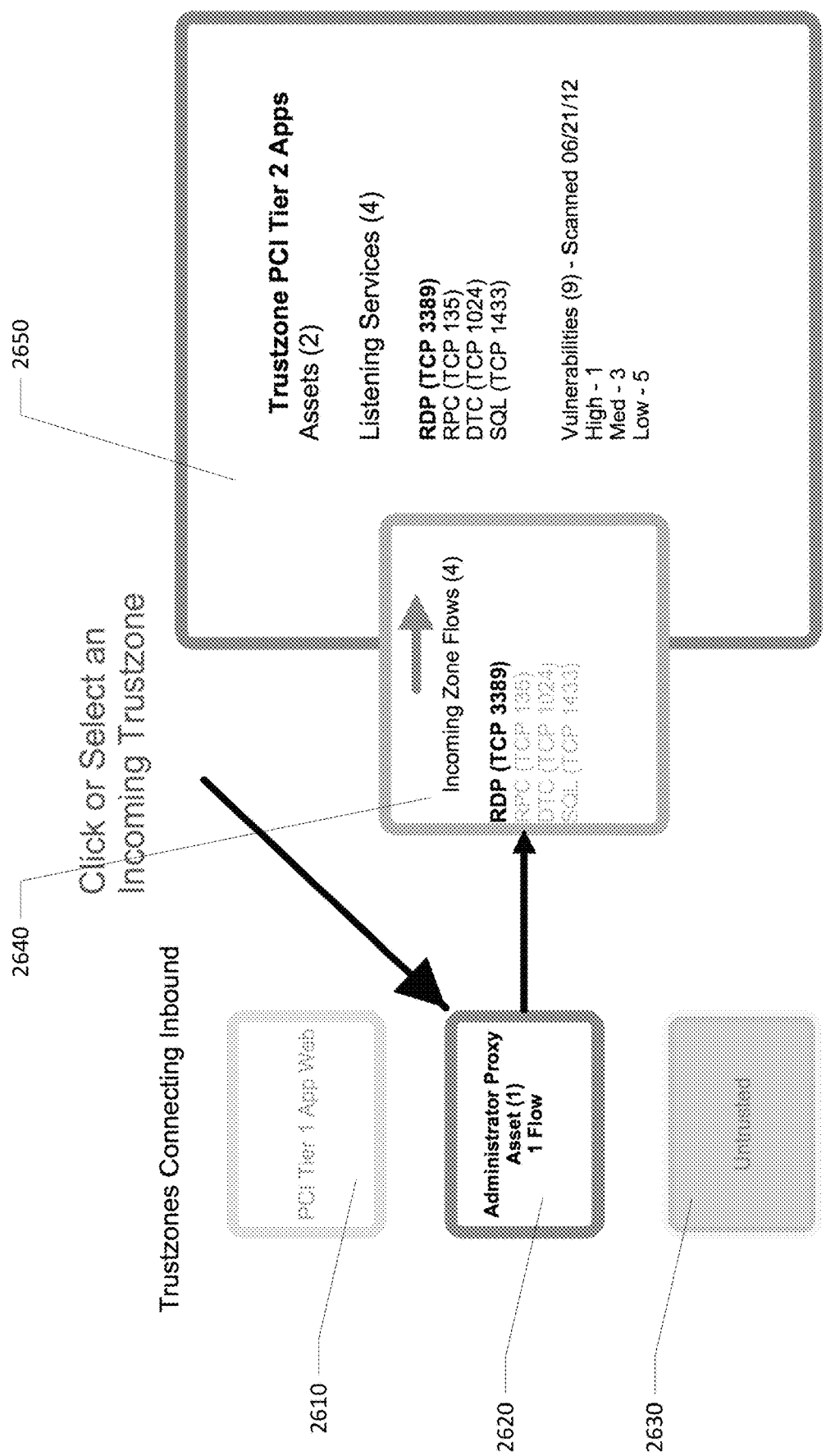

In the present example, the client asset collections 2610, 2620, and 2630 from FIG. 28 are included in the workflow based on collected information indicating these collections of assets have previously made incoming connections to host asset collection 2650. Selection of asset collections for the workflow can be based on any data source and temporal attributes. For example, a user may specify a time frame for detecting and analyzing network traffic, such as a window of two hours or other time frame. Additionally asset attributes that further identify the assets in any collection may be displayed such as host names, IP addresses, DNS information, and/or virtual machine names (depicted as "aswwpweb01" and "aswwpweb03" in 2610 in FIG. 29).

Input from the user may further include an annotation associated with one or more selected services. Such annotations may be presented along with the other information associated with a service in the list of services shown in representation 2640, the list of services described within the representation of host network asset 2650, and/or an entry for the service within table 2910. The annotation may include any desired information, such as comments from the user as to why access to a particular service was permitted or denied.

FIG. 29 indicates there are three "Trustzones Connecting Inbound" corresponding to the three client assets ("trustzones") 2610, 2620, and 2630. FIG. 29 depicts the graphical representation prior to the user qualifying (i.e., confirming access to) any services (or "flows") for any of client assets 2610, 2620, or 2630, so the "ACL Qualified Trustzones" field shows zero client assets ("trustzones") have been qualified, and that three client assets remain to be processed in the "Trustzones Remaining" field. Services may be identified in a variety of different ways. For example, referring to FIG. 29, a service may be identified by it transport protocol definition, such as the "TCP port 1433" identifier shown in collection 2650. Additionally, a service may be identified by it's service definition that defines one or more port/protocol pairs, such as the "SQL(TCP 1433)" identifier in representation 2640. The system may expand service definitions as desired.

Figure 30:
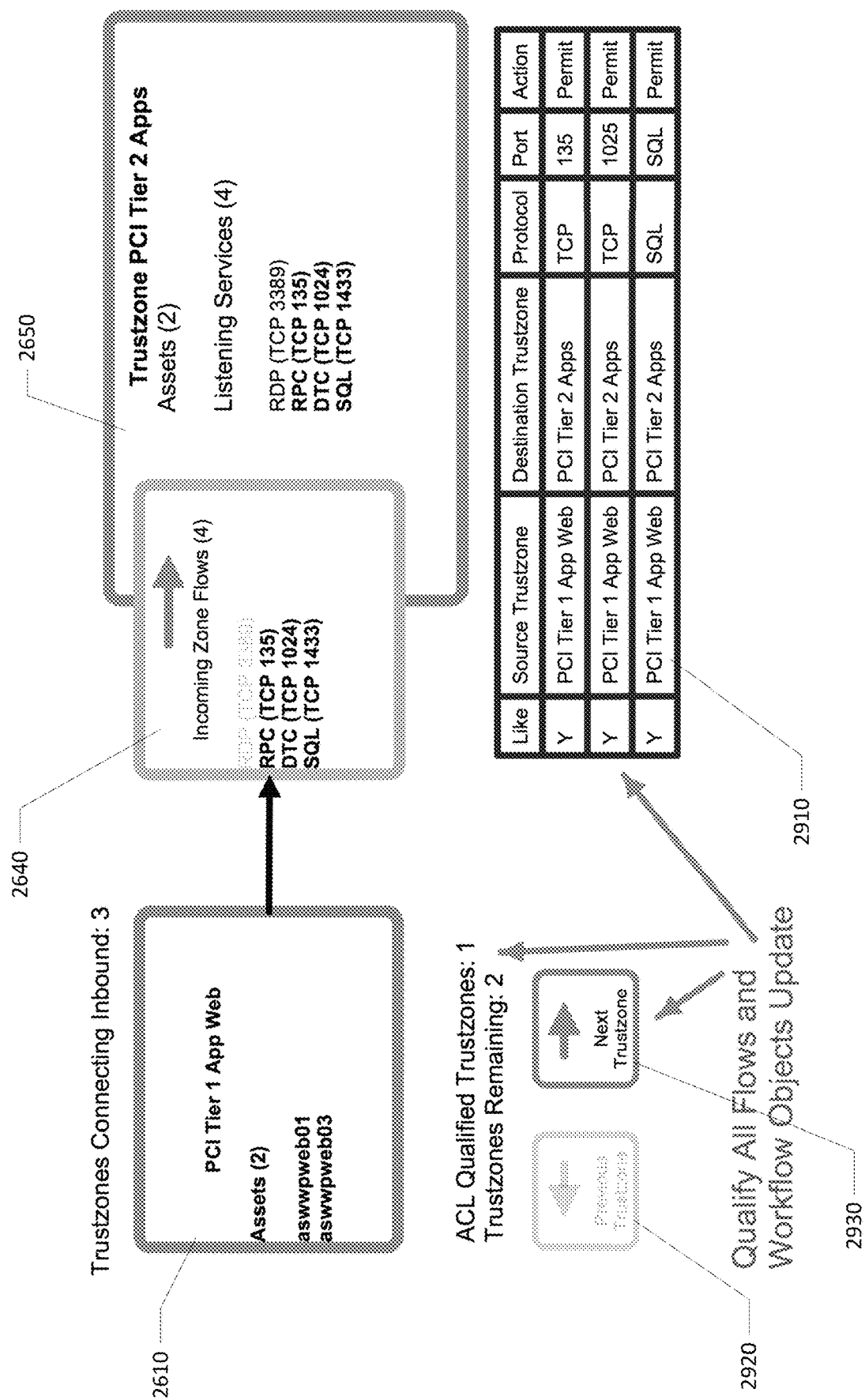

In FIG. 30, the user makes a selection permitting access by the client asset 2610 to each of the three services hosted by the host asset 2650 and shown in table 2910. In this example, the user's selection includes entry of a "Y" (yes) in the "Like" column for each service. Alternatively, the user could modify the "Action" field for each service (e.g., selecting either a "permit" option or a "deny" option from a pulldown menu). Other embodiments of the present disclosure may allow the user to permit or reject access to the selected services in any desired manner and using any user interface features. In the graphical representation shown in FIG. 30, table 2910 only includes the services previously-used by client asset 2610. However, embodiments of the disclosure may allow the user to permit/deny access by a client asset to services hosted by a host asset based on any collected host or network attribute, regardless of whether the client asset has ever used any particular service.

Upon qualifying each of the services ("flows") in the table 2910 for asset 2610, the graphical representation shown in FIG. 30 updates to indicate that one incoming client asset has been qualified (i.e., "ACL Qualified Trustzones" is now 1) and that there are two "Trustzones Remaining" to be processed by the user. The user selects the "Next Trustzone" button 2930 to proceed to qualify the services used by the next client asset 2620, as shown in FIG. 31.

Figure 31:
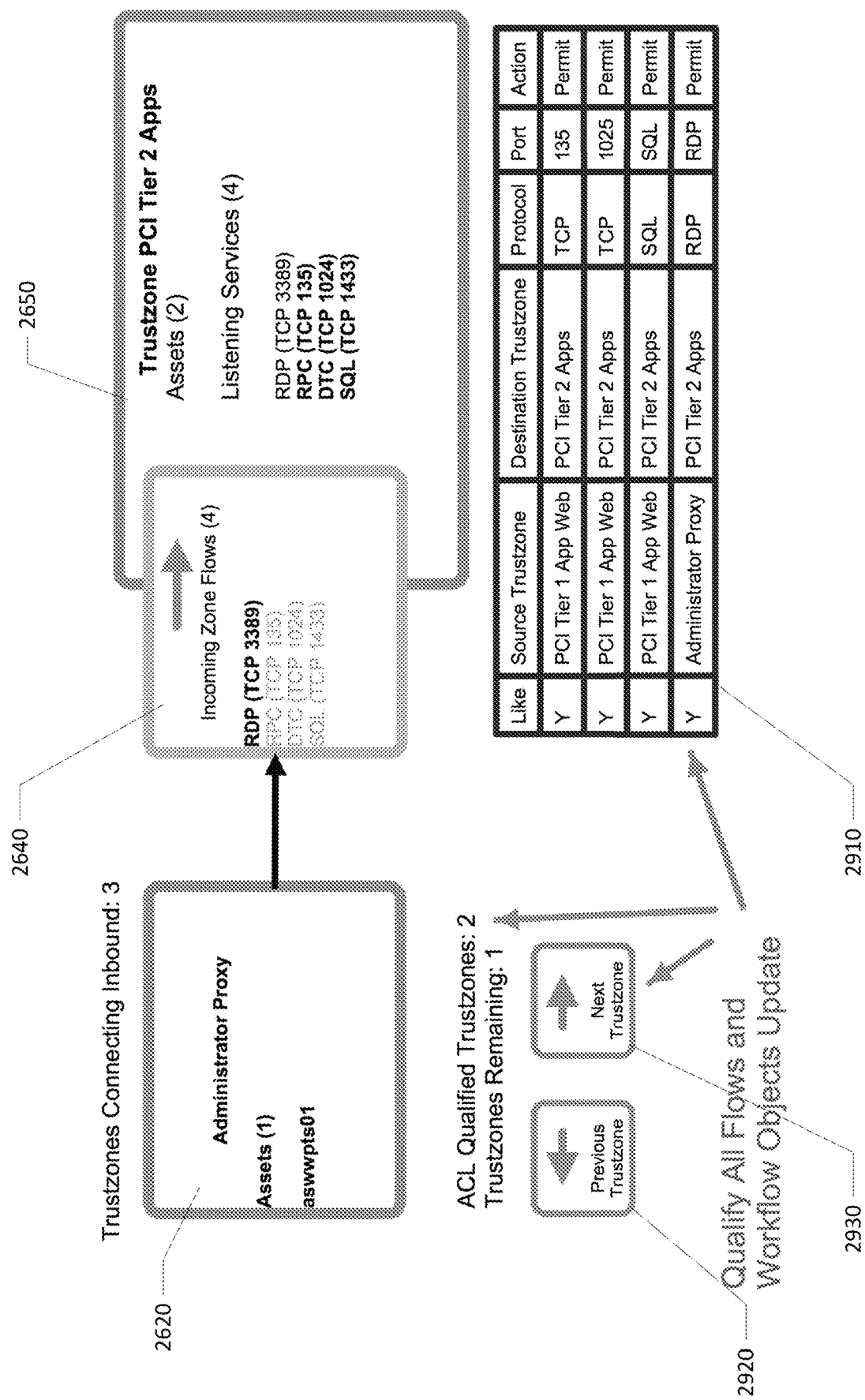

In FIG. 31, the graphical representation now shows a representation for client network asset 2620, with the single service used by client asset 2620 bolded in the services list 2640. Furthermore, client asset 2620 in this case represents an asset collection with one member named aswwpts01 as based on a virtual machine name, but any asset attribute or attributes could be displayed. While client network asset 2620 uses services from the same host client 2650 as client asset 2610, selection of client asset 2620 could also display a second host network asset (and associated services) hosting services the client asset 2620 accessed or had access to. Any number of client assets and host assets may be simultaneously viewed or highlighted indicating associations between assets based on collected data such as network flows, detected vulnerabilities, firewall rule hits, IDS data, and other data.

Table 2910 includes the three services previously-qualified for client asset 2610, as well as the single service used by client asset 2620. In this example, the user again permits access to the service used by client asset 2620. In response, the graphical representation updates to show there are now two "ACL Qualified Trustzones" with one "Trustzones Remaining," and the user navigates to the next trustzone (i.e., client asset 2630, shown in FIG. 32) using the "Next Trustzone" button 2930. Alternatively, the user could select the "Previous Trustzone" button 2920 to go back to review the services for client asset 2610.

Figure 32:
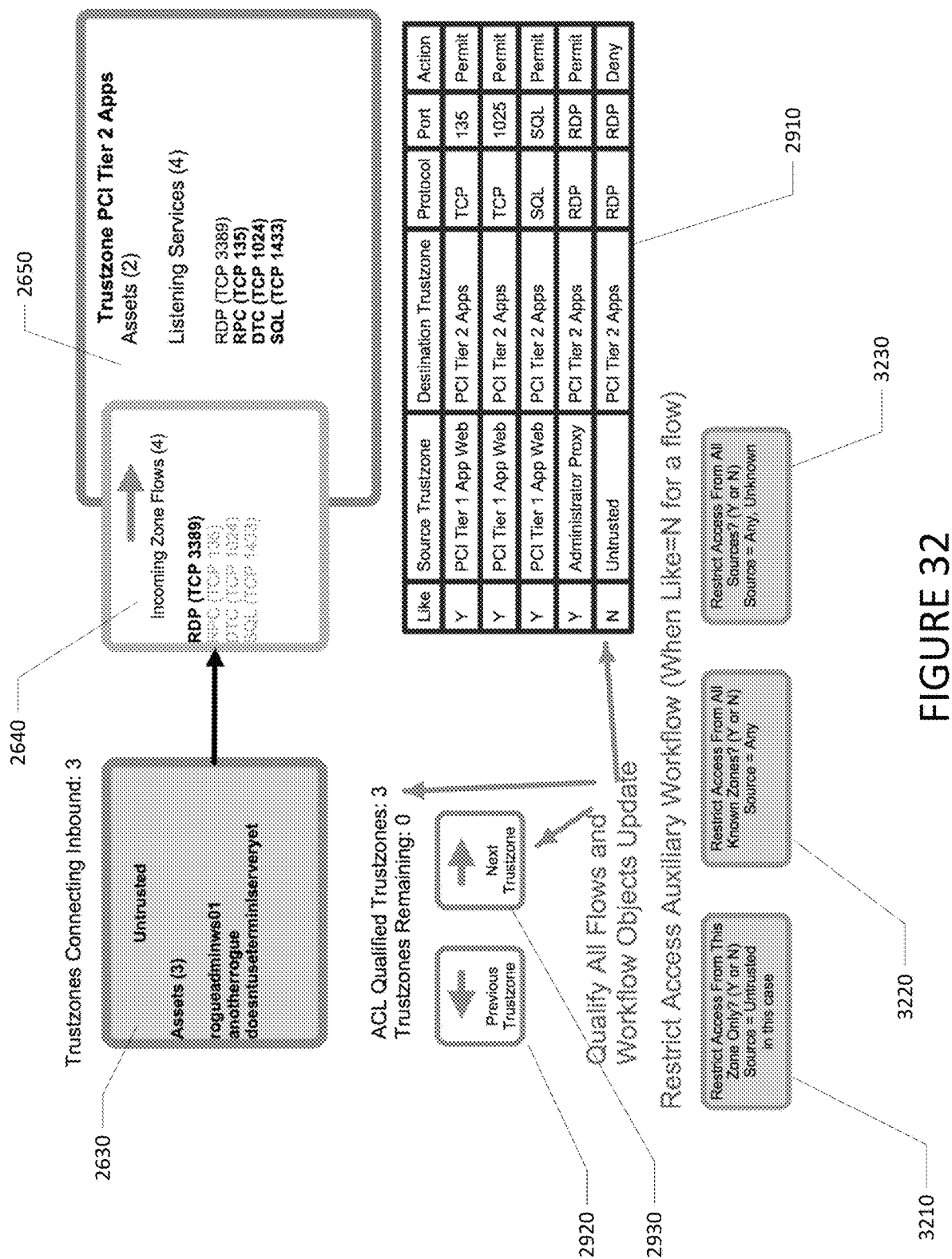

In FIG. 32, the table 2910 is updated to include the single service accessed by "Untrusted" client asset collection 2630 with three members named rogueadminwis01, another-rogue, and doesntuseterminalserveryet, respectively (names derived from VM names). In this example, however, the user provides a selection to deny access by client asset 2630 to the RDP service.

In the exemplary workflow shown in FIGS. 29-31, a set of detected network flows 2640 is qualified between a set of originating client asset collections 2610, 2620, and 2630 and a destination collection of host assets 2650, and the resulting access control list (ACL) is built in a format acceptable for an enforcing firewall. The ACL can then be sent to one or more firewalls for access control enforcement. For every source asset collection, destination asset collection, and detected network traffic, the tuple is qualified by the user as good (like=y) or bad (like=n) to indicated the desired behavior of the enforcing firewall control. This exemplary workflow is built up from data collected and is focused on qualifying flows inbound to host asset collection 2650 because the user selected 2650 and Inbound flows, and entered the workflow. Alternate embodiments may also present workflows that would qualify network traffic in any direction, such as: inbound, outbound or both simultaneously, for any arbitrary set of network asset collections.

Referring again to FIG. 32, because the user indicates they want to restrict access, the user is given three options for restricting access to the services hosted by host asset 2650 from client asset 2630. In option 3210, the user is given the option to restrict access only from client asset 2630, meaning the RDP access would be restricted only from asset 2630 to asset 2650. Access by all other client assets (including assets 2610 and 2620) would be permitted as indicated previously during the workflow.

Option 3220 allows the user to additionally restrict access from all known asset collections, not just those presented in the workflow that were derived from observed network traffic associations and not in contradiction to any contrary permitting qualifications that occurred in the workflow. Among other things, this allows a user to preemptively deny access by a client asset to services without waiting for the client asset to attempt to access (or access) a service first, which can be particularly useful in cases where a client asset is known to be, or suspected of being, associated with a malicious actor such as a hacker. In this example, the user may opt to deny access by any "known" client asset ("trustzone") to the services provided by host asset 2650. In this context, a "known" trustzone may include any asset collection previously defined by the user.

Selecting option 3220 essentially completes a black list for the service based on the known assets universe defined by the union of all asset collections (TrustZones) and associated IP Addresses. Option 3230 allows the user to restrict access to services by all IP addresses (the entire IP address universe not just those contained in asset collections or trustzones), thus changing the default to deny access to a service unless otherwise allowed. For example, access by a plurality of client network assets to one or more services may be selectively restricted or allowed based on a common attribute of each of the plurality client assets. Such common attributes may include, for example, whether the asset adheres to a particular security protocol, whether the asset has installed a particular software update (e.g., security patch), and/or whether the asset complies with one or more standards or any other associations used to define a collection.

Figure 33:
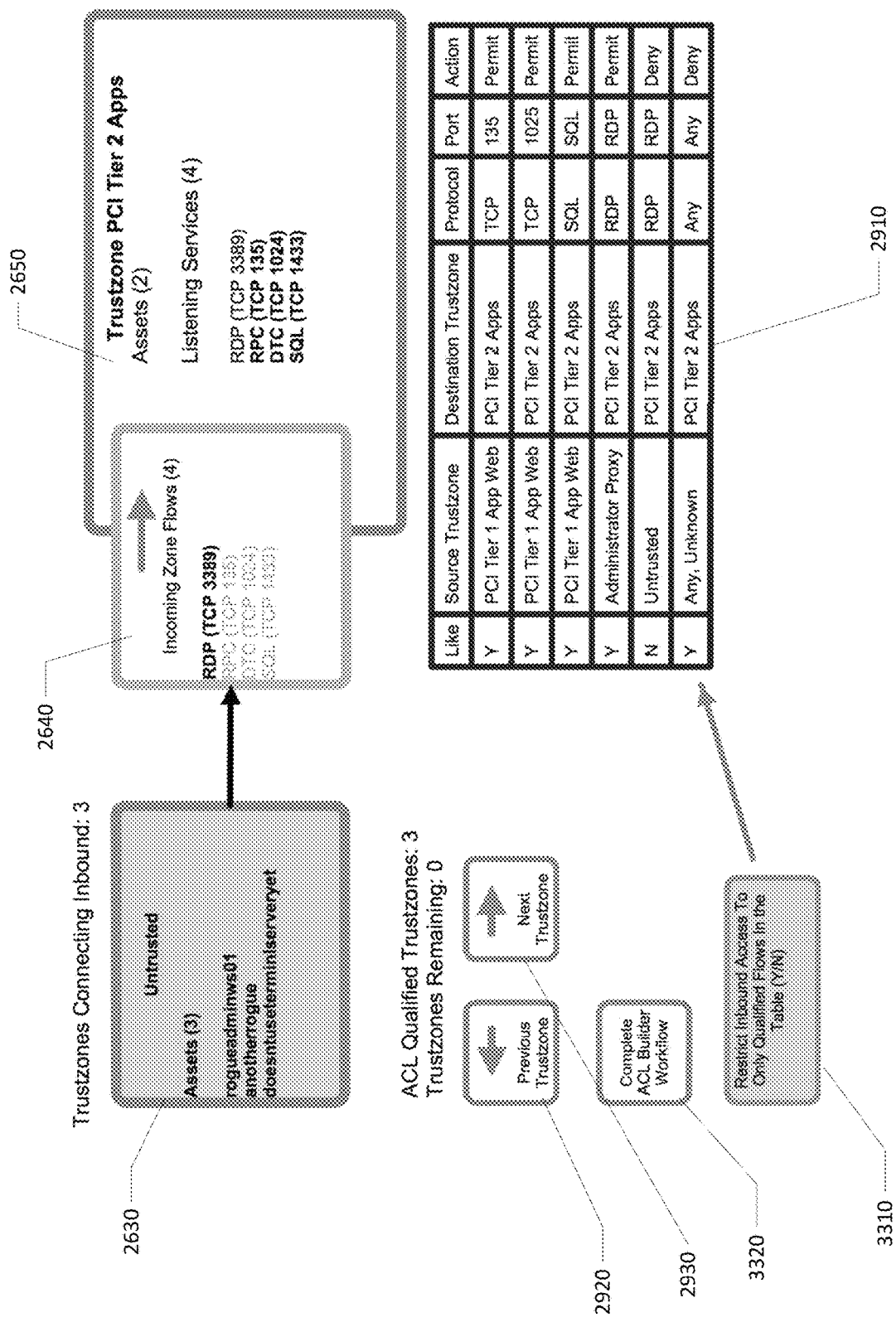

In alternate embodiments, any collection of one or more client assets may be likewise restricted. FIG. 33 depicts an additional option 3310 that allows the user to allow access to those services qualified in table 2910 only from those client assets defined within the workflow and denying access from all other IP addresses. In this example, the user selects option 3310, which adds an entry to table 2910 corresponding to this rule and completing a fully qualified whitelist for the services qualified during the workflow. Other rules may likewise be added, modified, or removed by the user, thereby allowing the user to control the manner in which access is allowed or denied by systems implementing embodiments of the present disclosure.

Referring again to FIG. 25, in response to the input from the user, access to the selected services (e.g., the services listed in table 2910) may be modified (2550). In some embodiments, access to various services may be modified as soon as the user enters a selection permitting or denying such access. In other embodiments, as depicted in FIG. 32, modifications to service access is not performed until the user indicates he/she has completed configuring the access rules in table 2910. In FIG. 32, for example, the user indicates configuration of the access rules is complete by selecting the "Complete ACL Builder Workflow" button 3220.

Network Data Flow Aggregation

As described above (see FIGS. 10-24 and related disclosure), embodiments of the present disclosure can collect network flow data and generate a flow information graph to visually show various network assets and the connections between such assets. As discussed in more detail above, the flow information graph can be used to view the state, status, and/or history of some aspect of a network, TrustZones, and/or individual assets.

However, in many applications, particularly networks with large numbers of assets, a large volume of network flow data is generated in a relatively short period of time. Storing raw network flow data to allow the historical presentation of network information in the flow information graph is thus problematic due to the size of the data, and systems relying on the presentation of flow information based on the raw data flows may be severely limited in how far back they can present information (e.g., to less than an hour in some cases).

Embodiments of the present disclosure may be adapted to address this issue by aggregating network flow data over various periods of time, and presenting a graphical representation of the network flow information based on the aggregated data instead of (or in addition to) the raw network flow data.

Figure 34:
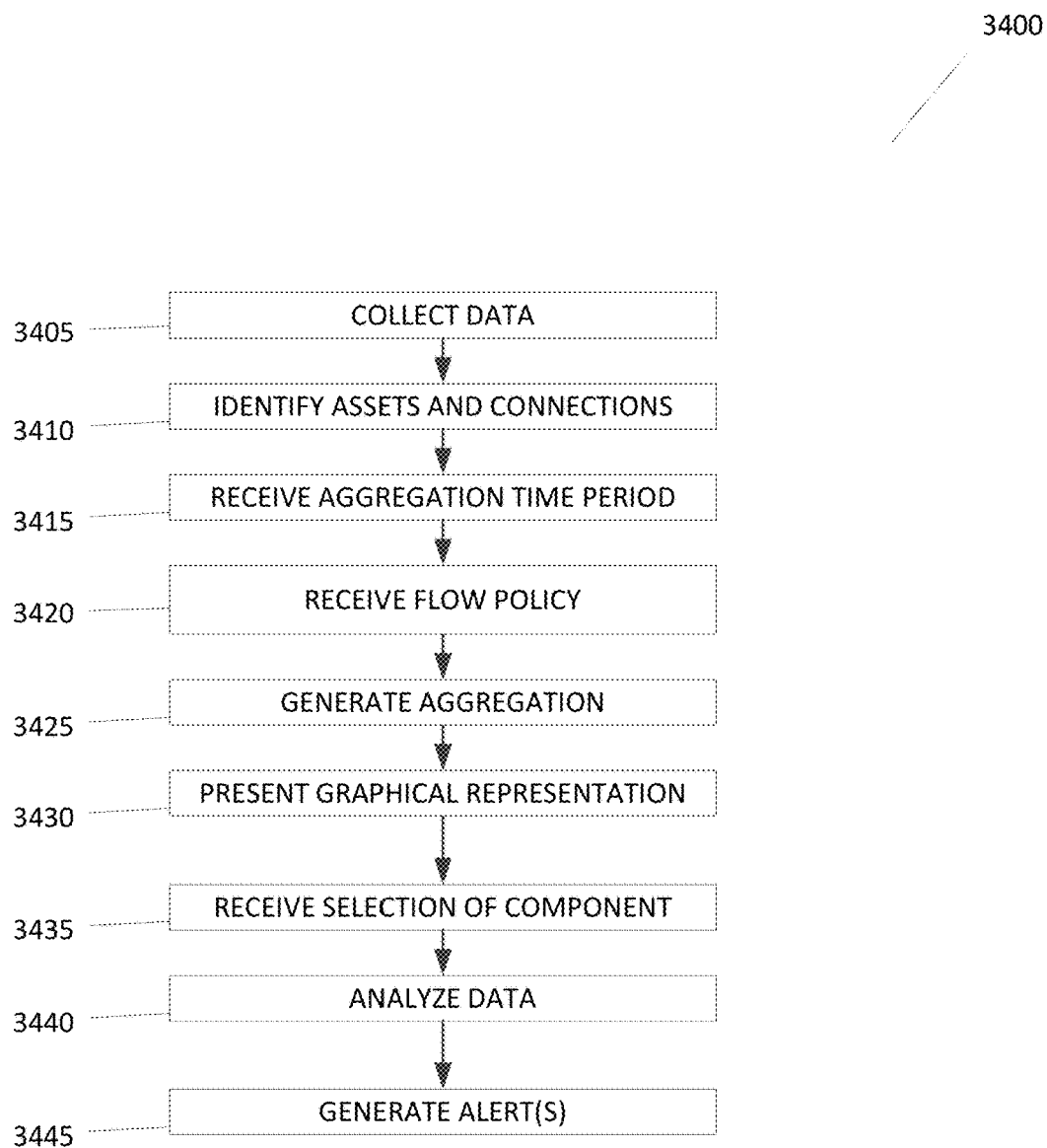
FIG. 34 is a flow diagram of an exemplary method according to various aspects of the present disclosure.

FIG. 34 depicts an exemplary method 3400 according to various aspects of the present disclosure. As with the other processes described herein, the steps of method 3400 may be performed in whole, in part, in any suitable order, and in conjunction with any other methods and systems. For example, some or all of the steps in method 3400 may be performed by a computer system in communication with a network, such as by the host computing system 810, shown connected to network 830 in FIG. 8.

In this example, method 3400 includes collecting data (e.g., asset and/or network data) from different sources (3405), identifying network assets and connections between such assets (3410), receiving a selection of a time period over which to aggregate the collected data (3415), receiving a flow policy (3420), generating an aggregation of the collected data (3425), and presenting a graphical representation of the network assets and their associated connections (3430). Method 3400 further includes analyzing data (3435) and generating one or more alerts (3440) based on the analysis.

Embodiments of the present disclosure may collect data (3405) from any number of different sources and/or different types of sources as described above with reference to step (905) in FIG. 9. Likewise, embodiments may identify network assets and connections (3410), as well as characteristics of such connections and assets as described above with reference to steps (915) and (920) in FIG. 9.

The method 3400 shown in FIG. 34 also includes generating an aggregation of the collected data (3425) which may be based on a received aggregation time period configuration (3415) and/or a received flow policy (3420). The aggregation of the collected data may be of any desired length and format, and may include any desired information. In various exemplary embodiments, the aggregation comprises a data structure with fields that describe network traffic at a higher (i.e., less detailed) level than the underlying network data packets upon which the aggregation is based. An example of one such data structure is as follows:

| Field | Type |
| --- | --- |
| Tenant ID | uint32 |
| Flow Type | uint8 |
| Source Asset ID | uint64 |
| Destination Asset ID | uint64 |
| Source IP | IP Address |
| Destination IP | IP Address |
| Protocol | uint8 |
| Destination Port | uint16 |
| First Seen | uint64 |
| Last Seen | uint64 |
| Flow Count | uint64 |
| Byte Count | uint64 |
| Agent ID | uint32 |

The aggregation data structure in the preceding paragraph includes a number of fields (in the left column) with each field having a type descriptor (in the right column). The type "uintXX" refers to an unsigned integer having "XX" bits, thus "uint32" is a 32-bit unsigned integer, "uint64" is a 64-bit unsigned integer, etc. The "Tenant ID," also referred to as a "Tenant Network Identifier" or "TNI" is a unique identifier that is associated with a particular network tunnel. The "Flow Type" is an indicator of the type of network flow, such as NetFlow, IDS, IPS, ZACLAllow, or ZACLDeny, each of which are described in more detail above.

The aggregation data structure also includes asset metadata, including a unique identifier associated with the Trust-Zone membership information, for both the source asset from which network traffic originates (i.e., the "Source Asset ID") and destination asset to which network traffic is directed (i.e., the "Destination Asset ID"), as well as the respective Internet Protocol (IP) addresses for the source and destination assets (i.e., the "Source IP" and "Destination IP"), and the type of network protocol ("Protocol") and the port of the destination asset ("Destination Port") used to transfer the data. The aggregation data structure also includes fields for other information pertaining to the network traffic, such as a time and/or date when an asset was "First Seen" and "Last Seen" on a network, the number of data packets exchanged between the source asset and destination asset ("Flow Count"), the number of bytes transferred ("Byte Count") and the identifier of an agent ("Agent ID") handling the network traffic between the source asset and the destination asset.

Embodiments may present a graphical representation of network assets, connections between such assets and other information (3430). For example, such information may be displayed via a flow information graph as described above with reference to FIGS. 10-24. This graphical representation may be customized, based on user input, to show network flow information based on different received flow policies (3420) and time configurations (3415).

Among other things, the aggregation of the network data allows embodiments of the present disclosure to present historical network traffic information at a customized level of granularity based on input from a user that selects a flow policy defining which network flows the user wishes to track, and at what time granularity. For example, a user may select (e.g., via the graphical presentation on the user interface) a flow policy to track a particular type of flow (e.g., NetFlow, IDS, etc.) using raw (un-aggregated) flow data, thus allowing the user a highly-detailed view of the network traffic and to view the collected data in its entirety. However, view using the raw network data may only provide a limited historical view given the volume of data that must be stored and processed, therefore the user may only be provided with a short (e.g., 1 hour) view of the traffic.

If the user wishes to see a longer historical view of the network flow, the user may select a flow policy to track the network flow based on the aggregated data, thereby tracking the flow on a subset of the collected data. The user may also select a policy to track the network flow based on both the raw flow data and the aggregated data, thereby giving the user a very detailed view of the network traffic for short durations, as well as giving the user visibility into the network traffic for longer durations with less detail. The flow policy selected by the user may thus be used in generating the graphical presentation of the data (e.g., the flow information graph described above).

Similarly, embodiments of the present disclosure may aggregate and present the collected data based on different aggregation time periods, including periods configured by the user via the user interface. For example, the system may receive input from the user to configure the time period(s) over which data is aggregated to increments of five minutes, one hour, twenty-four hours, and/or any other desired time period.

Embodiments of the present disclosure may also aggregate data across multiple time periods simultaneously. For example, the system may generate a first aggregation of collected data for a first period of time (e.g., five minutes). At the end of five minutes, the first aggregation of data may in turn be used to generate (or update) a second aggregation of collected data for a longer time period, such as on hour. In this example, every five minutes the first aggregation of collected data is used to generate/update the second aggregation of collected data until one hour (twelve iterations) of the five-minute data has been collected. The second aggregation of collected data thus will include a subset of the data collected for each of the shorter (5-minute) time periods.

Similarly, the one-hour data may be used to update a third aggregation of collected data for a third period of time (e.g., twenty-four hours). Additional (longer) time periods may also be configured. In this manner, embodiments of the present disclosure can give users historical information for network traffic over periods far longer than would be possible using un-aggregated data.

While the examples above describe time periods of uniform length, embodiments of the present disclosure may aggregate data from time periods of different lengths as well. For example, an aggregation of collected data having a one-hour period could be generated and updated based on aggregations from two different aggregation periods for the same data, such as a 5-minute period and a 10-minute period. Among other things, the aggregation of the 5-minute data would allow users a more detailed level of visibility into the network traffic, while the data from the 10-minute period may be used to validate and error-check data received from the 5-minute aggregation.

Figure 35:
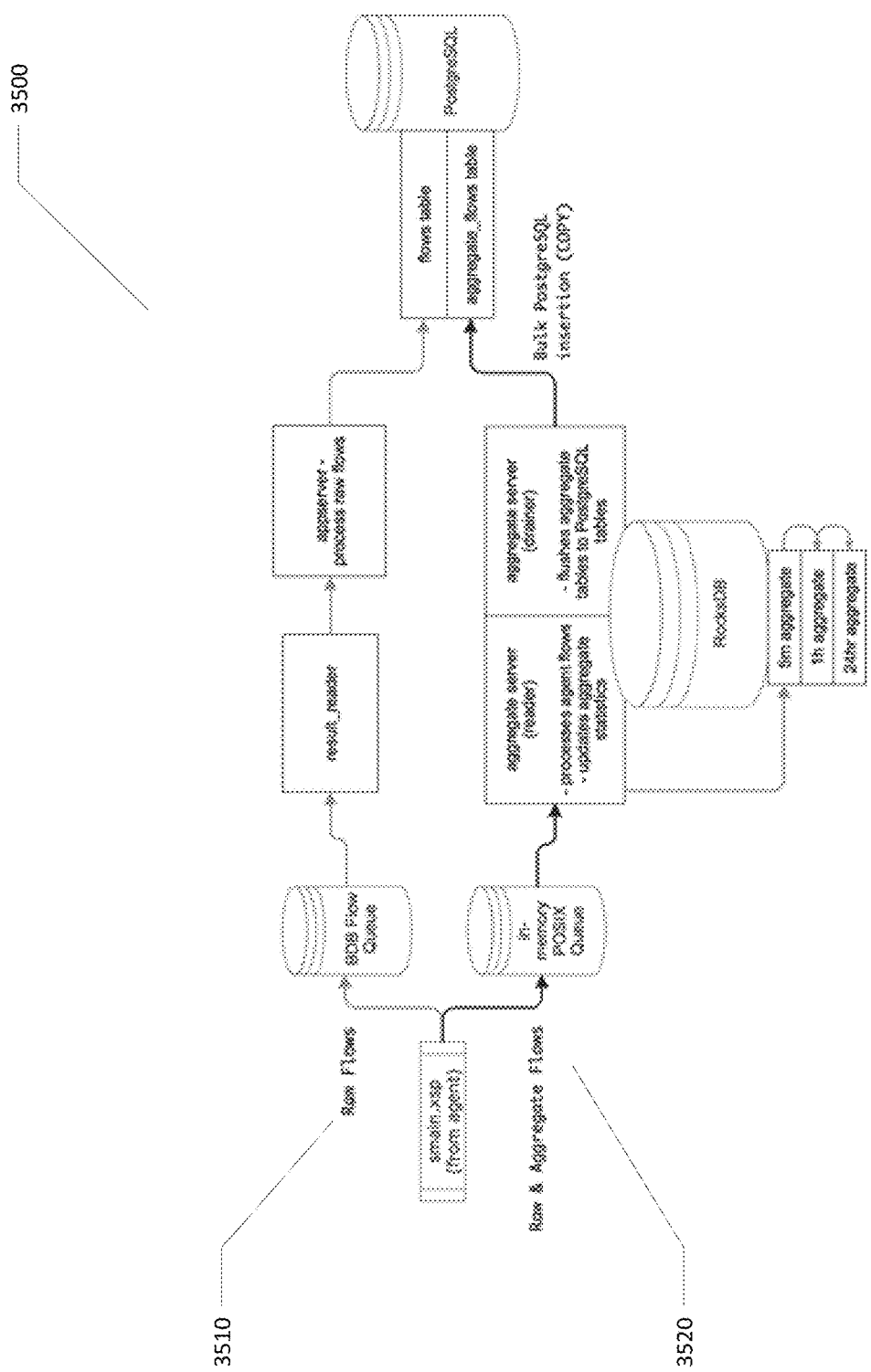
FIG. 35 is a block diagram showing the processing of network flow data according to various aspects of the present disclosure.

FIG. 35 illustrates an example of processing raw network flow data (3510) and combined raw and aggregated flow data (3520). The processing of the raw flow data across the top of the 3500 diagram includes retrieving the flow data from the "BDB Flow queue" for processing by the result_reader and appserver to generate the "flows table" stored in the "PostgreSQL" database. In this example, the "flows table" contains one million entries, which, on large deployments, may be filled by network traffic in less than an hour.

The processing of the combined raw and aggregated flow data (3520) across the bottom of the diagram 3500 includes maintaining a three periods of data aggregation (5 minute, 1 hour and 24 hour) and storing the aggregated data in a key-value database ("RocksDB"). At the completion of each aggregation period the data is bulk-loaded into a dedicated partition in the "PostgreSQL" database.

The processing of the combined raw and aggregated flow data (3520) allows the data in the "aggregate_flows_table" to contain a much larger period of data compared to the "flows_table," and therefore some embodiments utilizing data filtering (see step 910—"FILTER DATA" in FIG. 9 and the associated description above) may include a date filter configured by default and/or based on user input. In some embodiments, data for partial aggregation periods stored in RocksDB may not be available for viewing by users via the flow information graph (or other graphical representation). Instead, the aggregation periods may be made available once they complete and are dumped into PostgreSQL.

In the exemplary process (3520), messages are passed via the in-memory POSIX queue rather than the Berkeley DB (BDB) queue used in processing the raw flows in (3510). In this example, three separate databases are maintained in the "RocksDB" key-value database, with one for each of the three time periods (5 minute, 1 hour, 24 hour), though more or fewer databases could be used. In this example, all aggregates will have the same data schema, namely the aggregate data structure depicted above.

The example 3500 in FIG. 35 utilizes a "drain" process that runs when an aggregation period expires. In this example, the drain process bulk-loads all the data in the expired period into the PostgreSQL aggregate_flows partition and updates the values in the next larger period (e.g., draining 5 minute aggregate updates the values in the 1 hour aggregate). Additionally, when a drain process runs it creates a new database to replace the expired aggregate period to be able to immediately store new data. Among other things, this helps ensure that updates that occur while the drain process is running are not blocked and do not interfere with the statistics gathered by the system for the flow information graph. The drain process also creates a new PostgreSQL child partition for the period, iterates over all the flows in the period, updates the statistics in the table for the next-larger aggregate period, and dumps the flows into Postgres. The drain process further adds indexes and constraints to the PostgreSQL partition and rolls the active partition set. When the longest (24-hour period) elapses, the system drains the 5 minute, 1 hour, and 24 hour periods simultaneously.

The functionality of various embodiments may be performed via a web browser and/or application interfacing utilizing a web browser, as well as any type of client software. Such browser applications may comprise Internet browsing software installed within a computing unit or a system to perform various functions. These computing units or systems may take the form of a computer or set of computers, and any type of computing device or systems may be used, including laptops, notebooks, tablets, hand held computers, personal digital assistants, set-top boxes, workstations, computer-servers, main frame computers, mini-computers, PC servers, pervasive computers, network sets of computers, personal computers and tablet computers, such as iPads, iMACs, and MacBooks, kiosks, terminals, point of sale (POS) devices and/or terminals, televisions, or any other device capable of receiving data over a network. Various embodiments may utilize Microsoft Internet Explorer, Mozilla Firefox, Google Chrome, Apple Safari, or any other of the myriad software packages available for browsing the internet.

Various embodiments may operate in conjunction with any suitable operating system (e.g., Windows NT, 95/98/2000/CE/Mobile, OS2, UNIX, Linux, Solaris, MacOS, PalmOS, etc.) as well as various conventional support software and drivers typically associated with computers. Various embodiments may include any suitable personal computer, network computer, workstation, personal digital assistant, cellular phone, smart phone, minicomputer, mainframe or the like. Embodiments may implement security protocols, such as Secure Sockets Layer (SSL), Transport Layer Security (TLS), and Secure Shell (SSH). Embodiments may implement any desired application layer protocol, including http, https, ftp, and sftp.

Various components, modules, and/or engines may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, the Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Systems may utilize TCP/IP communications protocols as well as IPX, Appletalk, IP-6, NetBIOS, OSI, any tunneling protocol (e.g. IPsec, SSH), or any number of existing or future protocols. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, satellite networks, ISDN, Digital Subscriber Line (DSL), or various wireless communication methods. It is noted that the network may be implemented as other types of networks, such as an interactive television (ITV) network.

The system may be partially or fully implemented using cloud computing. "Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

Various embodiments may be used in conjunction with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically.

Any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems.

Embodiments may connect to the Internet or an intranet using standard dial-up, cable, DSL or any other Internet protocol known in the art. Transactions may pass through a firewall in order to prevent unauthorized access from users of other networks.

The computers discussed herein may provide a suitable website or other Internet-based graphical user interface which is accessible by users. For example, the Microsoft Internet Information Server (IIS), Microsoft Transaction Server (MTS), and Microsoft SQL Server, may be used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In another example, an Apache web server can be used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL and an IP address. The web server retrieves the appropriate web pages and sends the data or applications for the web pages to the IP address. Web services are applications that are capable of interacting with other applications over a communications means, such as the Internet.

Various embodiments may employ any desired number of methods for displaying data within a browser-based document. For example, data may be represented as standard text or within a fixed list, scrollable list, drop-down list, editable text field, fixed text field, pop-up window, and the like. Likewise, embodiments may utilize any desired number of methods for modifying data in a web page such as, for example, free text entry using a keyboard, selection of menu items, check boxes, option boxes, and the like.

The exemplary systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

What is claimed is:
1. A computer-implemented method comprising:
collecting, by a computer system, network flow data from a plurality of different types of sources on a network;
identifying, by the computer system based on the collected network flow data, a plurality of network assets and connections between the plurality of network assets;
generating, by the computer system, a first aggregation of the collected network flow data that includes a subset of the collected network flow data over a first predetermined period of time;
generating, by the computer system, a second aggregation of the collected network flow data that includes a subset of the collected network flow data over a second predetermined period of time;

storing, by the computer system, the aggregations in a first database during at least one of the first predetermined period of time or the second predetermined period of time;

loading, by the computer system, the aggregations from the first database to a second database after the first and second predetermined periods of time; and presenting, by the computer system based on the aggregations of the collected network flow data, a graphical representation that includes the plurality of network assets and the connections between the plurality of network assets, wherein the graphical representation is presented via a display of a user interface in communication with the computer system, wherein the plurality of network assets includes a host network asset and a client network asset, wherein presenting the graphical representation includes presenting a flow information graph that depicts the host network asset, the client network asset, connections between the host network asset and the client network asset, and services that are permitted to be accessed between the host network asset and the client network asset, wherein the flow information graph visually indicates an attribute of the host network asset, an attribute of the client network asset, and attributes of a connection between the host network asset and the client network asset, and wherein the attributes of the connection between the host network asset and the client network asset include sizes of data communicated, times when the data is communicated, and rates at which the data is communicated, detected vulnerable service communications, and detected attack signatures;

analyzing the aggregations of the collected network flow data based on a security policy, wherein the security policy is a collection of security technical control configuration policies that specify a specific operation of a security technical control;

dynamically assigning the security policy to the host network asset or the client network asset based on a trust zone to which the host network asset or the client network asset is assigned; and generating an alert in response to the analysis of the aggregations of the collected network flow data.

2. The method of claim 1, wherein each of the aggregations includes a unique identifier associated with a network asset from the plurality of network assets.

3. The method of claim 2, wherein each of the aggregations includes a unique identifier associated with a source asset from the plurality of network assets from which network traffic originates and a unique identifier associated with a destination asset from the plurality of network assets to which network traffic is directed.

4. The method of claim 1, further comprising:
receiving a selection, via the user interface, of a flow policy associated with a particular type of network flow, wherein the flow policy is one of:
a policy to track network flow based on at least one of the aggregations; and
a policy to track network flow based on both the at least one of the aggregations and the collected network flow data in its entirety; and
generating the aggregations of the collected network flow data based on the received flow policy.

5. The method of claim 4, further comprising receiving a selection, via the user interface, to configure at least one of the predetermined time periods.

6. The method of claim 5, wherein the second period of time is longer than the first period of time and the second aggregation of collected network flow data includes a subset of the first aggregation of collected network flow data.

7. The method of claim 6, wherein generating the second aggregation of collected network flow data includes updating one or more of the following in the second aggregation of network flows based on the first aggregation of collected network flow data: a count of network flows between assets on the network, and a number of bytes transmitted between assets on the network.

8. The method of claim 6, wherein generating the second aggregation of collected network flow data includes a subset of collected network flow data from each of a plurality of aggregations of collected network flow data for a respective plurality of time periods, and wherein each of the respective plurality of time periods is shorter than the second period of time.

9. The method of claim 8, wherein each of the plurality of time periods is of equal length.

10. The method of claim 8, wherein at least two of the plurality of time periods are of different length.

11. The method of claim 1, wherein:
the flow lines indicate a type of the source of the collected network flow data used to identify the connection, and/or the flow information graph depicts connections between the host network asset and the client network asset using selectable directional flow lines.

12. The method of claim 1, wherein presenting the flow information graph includes:
identifying a security vulnerability associated with one or more of the host network asset and the client network asset; and
visually indicating the identified security vulnerability in the flow information graph.

13. The method of claim 1, wherein the collected network flow data is obtained from a source selected from the group consisting of: a network tap, a router, a switch, a firewall, an intrusion detection system, an intrusion protection system, and combinations thereof.

14. The method of claim 1, further comprising:
analyzing the aggregations of the collected network flow data by comparing the aggregations of the collected network flow data to one or more of: the security policy, a standards compliance policy, and a performance standard; and
generating an alert in response to the analysis of the aggregations of the collected network flow data.

15. A tangible, non-transitory computer-readable medium storing instructions that, when executed, cause a computer system to:
collect network flow data from a plurality of different types of sources on a network;
identify, based on the collected network flow data, a plurality of network assets and connections between the plurality of network assets;
generate a first aggregation of the collected network flow data that includes a subset of the collected network flow data over a first predetermined period of time;
generate a second aggregation of the collected network flow data that includes a subset of the collected network flow data over a second predetermined period of time;

store the aggregations in a first database during at least one of the first predetermined period of time or the second predetermined period of time;
load the aggregations from the first database to a second database after the first and second predetermined periods of time; and
present, based on the aggregations of the collected network flow data, a graphical representation that includes the plurality of network assets and the connections between the plurality of network assets, wherein the graphical representation is presented via a display of a user interface in communication with the computer system;
wherein the plurality of network assets includes a host network asset and a client network asset,
wherein presenting the graphical representation includes presenting a flow information graph that depicts the host network asset, the client network asset, connections between the host network asset and the client network asset, and services that are permitted to be accessed between the host network asset and the client network asset,
wherein the flow information graph visually indicates an attribute of the host network asset, an attribute of the client network asset, and attributes of a connection between the host network asset and the client network asset, and
wherein the attributes of the connection between the host network asset and the client network asset include sizes of data communicated, times when the data is communicated, and rates at which the data is communicated, detected vulnerable service communications, and detected attack signatures;
analyze the aggregations of the collected network flow data based on a security policy wherein the security policy is a collection of security technical control configuration policies that specify a specific operation of a security technical control;
dynamically assigning the security policy to the host network asset or the client network asset based on a trust zone to which the host network asset or the client network asset is assigned; and
generate an alert in response to the analysis of the aggregations of the collected network flow data.

16. A computer system comprising:
a processor; and
memory in communication with the processor and storing instructions that, when executed by the processor, cause the computer system to:
collect network flow data from a plurality of different types of sources on a network;
identify, based on the collected network flow data, a plurality of network assets and connections between the plurality of network assets;
generate a first aggregation of the collected network flow data that includes a subset of the collected network flow data over a first predetermined period of time;
generate a second aggregation of the collected network flow data that includes a subset of the collected network flow data over a second predetermined period of time;
store the aggregations in a first database during at least one of the first predetermined period of time or the second predetermined period of time;
load the aggregations from the first database to a second database after the first and second predetermined periods of time;
present, based on the aggregations of the collected network flow data, a graphical representation that includes the plurality of network assets and the connections between the plurality of network assets, wherein the graphical representation is presented via a display of a user interface in communication with the computer system;
wherein the plurality of network assets includes a host network asset and a client network asset,
wherein presenting the graphical representation includes presenting a flow information graph that depicts the host network asset, the client network asset, connections between the host network asset and the client network asset, and services that are permitted to be accessed between the host network asset and the client network asset,
wherein the flow information graph visually indicates an attribute of the host network asset, an attribute of the client network asset, and attributes of a connection between the host network asset and the client network asset, and
wherein the attributes of the connection between the host network asset and the client network asset sizes of data communicated, times when the data is communicated, and rates at which the data is communicated, detected vulnerable service communications, and detected attack signatures;
analyze the aggregations of the collected network flow data based on a security policy wherein the security policy is a collection of security technical control configuration policies that specify a specific operation of a security technical control;
dynamically assigning the security policy to the host network asset or the client network asset based on a trust zone to which the host network asset or the client network asset is assigned; and
generate an alert in response to the analysis of the aggregations of the collected network flow data.

17. The method of claim 1, wherein the loading of the aggregations from the first database to the second database includes:
loading the aggregations to a new version of the second database, wherein the new version of the second database is associated with at least one of the first and second predetermined periods of time; and
replacing a previous version of the second database entirely.

18. The method of claim 17, wherein the loading of the aggregations from the first database to the second database includes creating a new database partition for the new version of the second database.

19. The method of claim 1, wherein the first database is a non-relational database and the second database is a relational database.

20. The method of claim 1, wherein dynamically assigning the security policy to the host network asset or the client network asset based on a trust zone to which the host network asset or the client network asset is assigned comprises:
updating the security policy based on a movement of the host network asset or the client network asset from a first trust zone to a second trust zone.

* * * * *